United States Patent
Kim et al.

(10) Patent No.: US 10,171,994 B2
(45) Date of Patent: Jan. 1, 2019

(54) MOBILE DEVICE AND METHOD OF SHARING CONTENT

(71) Applicant: SAMSUNG ELECTRONICS CO., LTD., Suwon-si (KR)

(72) Inventors: Sun-kyung Kim, Busan (KR); Sergey Pometun, Ak. Kyiv (UA); Oleksii Mokhonko, Kyiv (UA); Andrii Marchenko, Brovary (UA); Vitalii Tymchyshyn, Ivano-Frankivsk (UA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 253 days.

(21) Appl. No.: 14/696,895

(22) Filed: Apr. 27, 2015

(65) Prior Publication Data

US 2015/0312759 A1   Oct. 29, 2015

Related U.S. Application Data

(60) Provisional application No. 61/984,229, filed on Apr. 25, 2014.

(30) Foreign Application Priority Data

Apr. 30, 2014  (KR) .......................... 10-2014-0052974

(51) Int. Cl.
*H04W 12/04* (2009.01)
*G06F 21/10* (2013.01)
(Continued)

(52) U.S. Cl.
CPC ............ *H04W 12/04* (2013.01); *G06F 21/10* (2013.01); *G06F 21/6218* (2013.01);
(Continued)

(58) Field of Classification Search
CPC ...... H04W 12/04; H04W 4/02; H04L 9/0888; H04L 9/0894; H04L 2209/60;
(Continued)

(56) References Cited

U.S. PATENT DOCUMENTS 6,636,968 B1 * 10/2003 Rosner ................. H04L 9/0833
713/178
8,561,211 B1   10/2013 Woodward
(Continued)

FOREIGN PATENT DOCUMENTS

CN   1578458 A   2/2005
WO   2004/075169 A2   9/2004
(Continued)

OTHER PUBLICATIONS

International Search Report for PCT/KR2015/004138 dated Jul. 7, 2015 [PCT/ISA/210].
(Continued)

*Primary Examiner* — Marcus Hammonds
(74) *Attorney, Agent, or Firm* — Sughrue Mion, PLLC

(57) ABSTRACT

A mobile device and methods for sharing content are provided. The mobile device includes a communicator configured to communicate with at least one external device; and a controller configured to control decryption of encrypted content that is shared with the at least one external device, in response to determining that the mobile device is located within a proximate spacing of the at least one external device.

28 Claims, 36 Drawing Sheets

(51) Int. Cl.
*G06F 21/62* (2013.01)
*H04W 4/02* (2018.01)
*H04L 9/08* (2006.01)

(52) U.S. Cl.
CPC ............ *H04L 9/085* (2013.01); *H04L 9/0894* (2013.01); *H04W 4/02* (2013.01); *G06F 2221/2111* (2013.01); *H04L 2209/60* (2013.01); *H04L 2209/80* (2013.01)

(58) Field of Classification Search
CPC . H04L 2209/80; G06F 21/10; G06F 21/6218; G06F 2221/2111
USPC ........................................................ 455/411
See application file for complete search history.

(56) References Cited

U.S. PATENT DOCUMENTS

| | | |
|---|---|---|
| 2005/0027993 A1 | 2/2005 | Yanagisawa |
| 2009/0111378 A1 | 4/2009 | Sheynman et al. |
| 2009/0276439 A1 | 11/2009 | Rosenblatt et al. |
| 2011/0169735 A1 | 7/2011 | Weber |
| 2011/0293093 A1 | 12/2011 | Sun et al. |
| 2013/0239135 A1 | 9/2013 | Parker et al. |
| 2013/0268774 A1 | 10/2013 | O'Hare et al. |
| 2014/0113549 A1 | 4/2014 | Beg et al. |
| 2014/0189785 A1* | 7/2014 | Castro ............... H04L 63/105 726/1 |
| 2015/0134949 A1* | 5/2015 | Baldwin ............ H04W 4/021 713/153 |
| 2016/0300070 A1* | 10/2016 | Durham ............ G06F 21/6209 |

FOREIGN PATENT DOCUMENTS

| | | |
|---|---|---|
| WO | 2007/049267 A1 | 5/2007 |
| WO | 2011/064760 A1 | 6/2011 |
| WO | 2014/036689 A1 | 3/2014 |

OTHER PUBLICATIONS

Written Opinion for PCT/KR2015/004138 dated Jul. 7, 2015 [PCT/ISA/237].
Communication from the European Patent Office dated Sep. 25, 2015 in a counterpart European Application No. 15165030.6.
Communication dated Oct. 22, 2018, issued by the State Intellectual Property Office of P.R. China in counterpart Chinese Application No. 201580022041.3.

* cited by examiner

FIG. 5
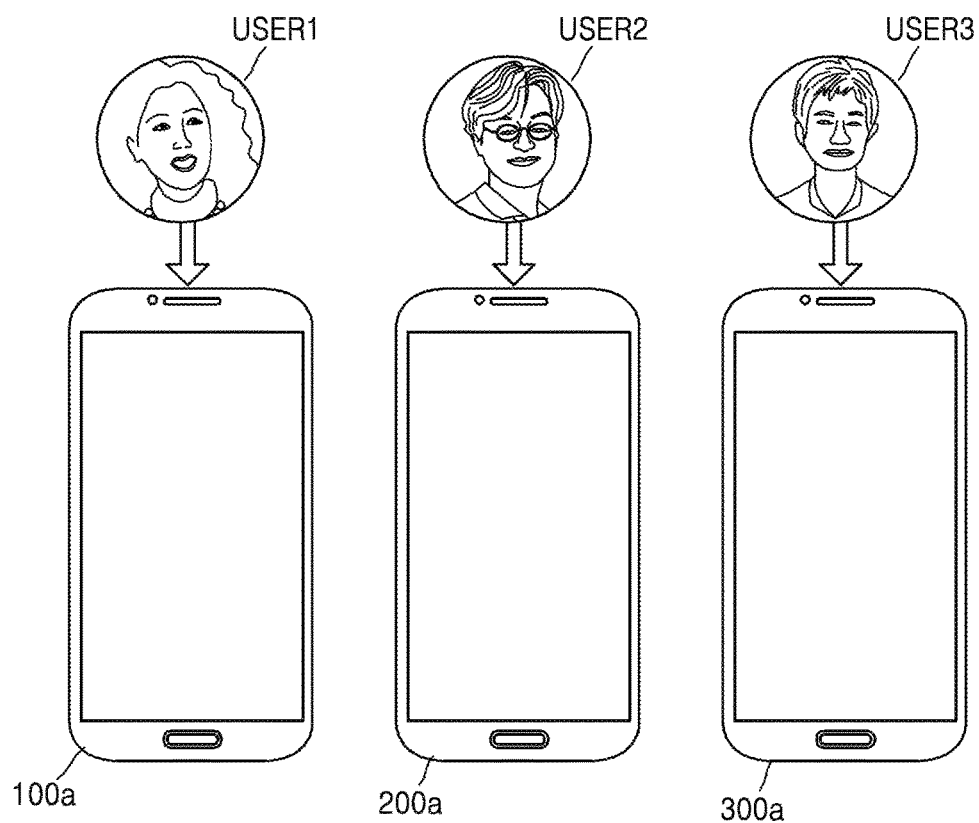
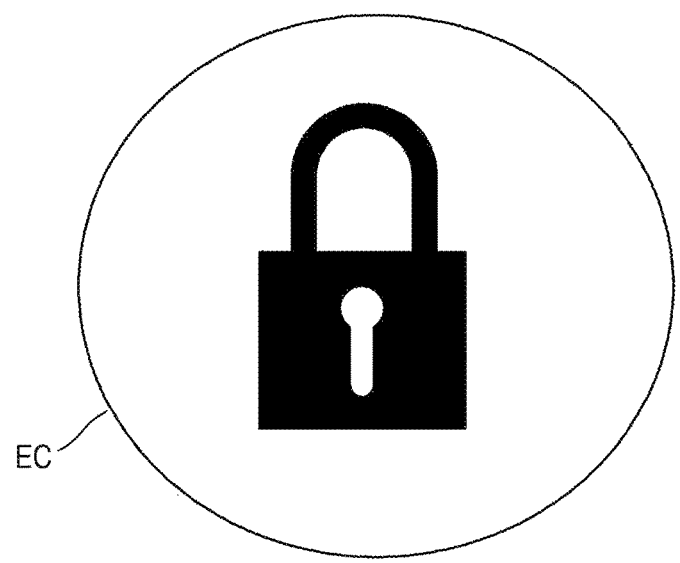

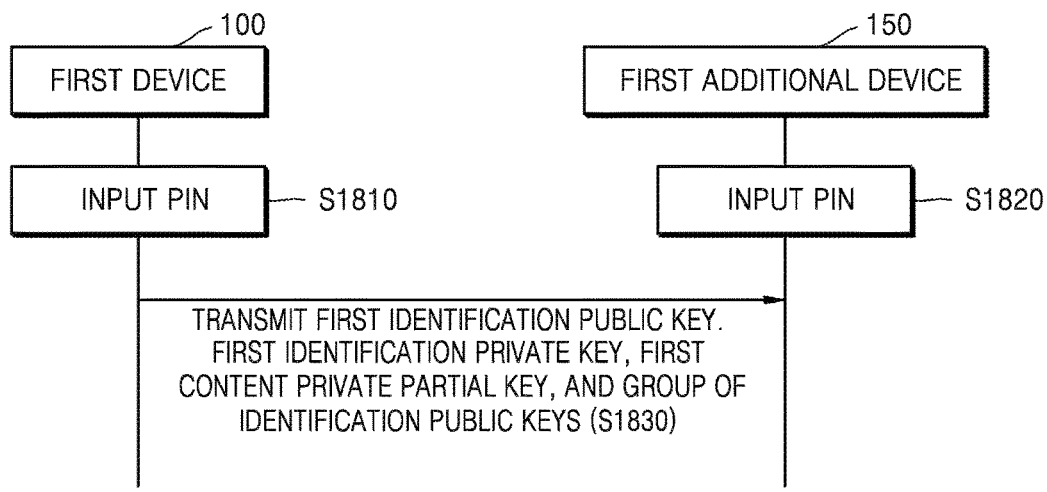
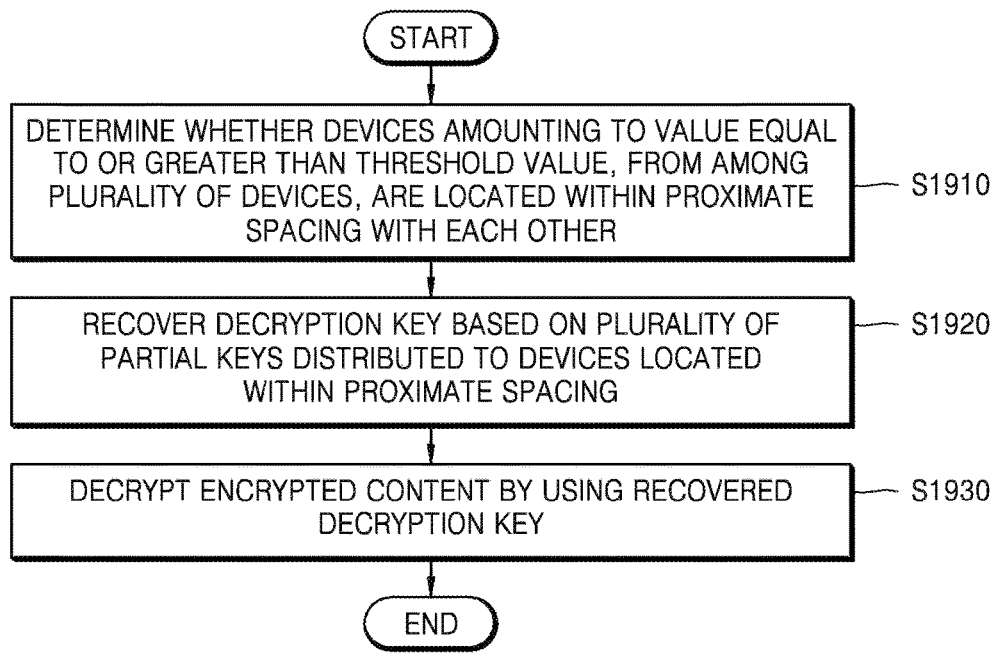

MOBILE DEVICE AND METHOD OF SHARING CONTENT

RELATED APPLICATION

This application claims the benefit of U.S. Provisional Application No. 61/984,229, filed on Apr. 25, 2014 in the U.S. Patent and Trademark Office, and Korean Patent Application No. 10-2014-0052974, filed on Apr. 30, 2014 in the Korean Intellectual Property Office, the disclosures of which are incorporated herein in their entireties by reference.

BACKGROUND

1. Field

One or more exemplary embodiments relate to content sharing, and more particularly, to a mobile device and a method of sharing content in a security group that includes a plurality of devices.

2. Description of the Related Art

As user terminal devices such as a smartphones and tablets are becoming more widely used, the ability to share content between a plurality of devices has expanded. However, if proper action is not taken to control content shared between a plurality of devices, content that is private may be recklessly or unintentionally distributed to the public.

For example, content that is considered private content to two or more users may be created, such as a video clip or a picture. However, if the relationship between the users that created the private content changes after the content was generated, there is a risk that one of the users may expose the private content to the public.

SUMMARY

One or more exemplary embodiments provide a mobile terminal for securely encrypting content, shared in a security group that includes a plurality of devices, in a short period of time and a method of sharing content.

One or more exemplary embodiments also provide a mobile terminal for securely decrypting encrypted content, shared in a security group that includes a plurality of devices, in a short period of time and a method of sharing content.

According to an aspect of an exemplary embodiment, there is provided a mobile device including: a communicator configured to communicate with at least one external device; and a controller configured to decrypt encrypted content that is shared by the mobile device and at least one external device in response to determining that the mobile device is located within a proximate spacing of the at least one external device.

The mobile device may further include a user input unit, and the controller may be configured to encrypt content in response to receiving a user input for sharing the content with the at least one external device.

The mobile device may further include a storage configured to store the encrypted content.

The controller may be configured to store the encrypted content in an external server.

The communicator may be configured to transmit the encrypted content to the at least one external device.

The controller may be configured to generate an encryption key for encrypting the content and a plurality of partial keys, and to distribute the generated plurality of partial keys to the at least one external device.

The controller may be configured to encrypt the plurality of partial keys, and distribute the encrypted plurality of partial keys to the at least one external device.

The mobile device may further include a storage configured to store at least one of a partial key allocated to the mobile device, from among the plurality of partial keys, and the encryption key.

The controller may be configured to recover a decryption key corresponding to the encryption key from the plurality of partial keys distributed to at least one external device and to decrypt the encrypted content by using the recovered decryption key in response to determining that the at least one external device is located within the proximate spacing from the mobile device.

The controller may be configured to re-encrypt the decrypted content in response to determining that the at least one external device is not located within the proximate spacing from the mobile device.

The mobile device may further include a user input, wherein the at least one external device includes a first device and a second device, and the controller may be configured to encrypt the content in response to receiving a user input for sharing the content with the first device and the second device is received via the user input, and to decrypt the encrypted content in response to determining that at least one of the first device or the second device is located within the proximate spacing from the mobile device.

The communicator may comprise a short-range wireless communication module that includes at least one of a near field communication (NFC) module, a Bluetooth module, a WiFi module, and a ZigBee module, wherein the communicator is configured to determine whether the mobile device is located within the proximate spacing of the at least one external device.

The mobile device may further include a detector that includes at least one of a touch sensor and a proximity sensor, wherein the detector is configured to determine whether the mobile device is located within the proximate spacing of the at least one external device.

The mobile device may further include a display or a speaker, and the controller may be configured to output the decrypted content via the display or the speaker.

According to an aspect of another exemplary embodiment, there is provided a method of sharing content in a security group that includes a plurality of devices including: determining whether a number of devices, from among the plurality of devices, is equal to or greater than a threshold value are located within a proximate spacing of each other; and decrypting encrypted content that is shared by the plurality of devices in response to determining that the number of devices located within a proximate spacing of each other is equal to or greater than the threshold value.

The method may further include encrypting the content in response to receiving a user input for sharing the content between the plurality of devices.

The method may further include storing the encrypted content in at least one of the plurality of devices.

The method may further include storing the encrypted content in an external server.

The encrypting of the content may include: generating an encryption key for encrypting the content and generating a plurality of partial keys; distributing the generated plurality of partial keys to the plurality of devices; and encrypting the content by using the encryption key.

The encrypting of the content may further include encrypting the plurality of partial keys, and the distributing of the generated plurality of partial keys may include distributing the encrypted plurality of partial keys to the plurality of devices.

The method may further include storing the encryption key and the distributed plurality of partial keys in at least one security zone of the plurality of devices.

The method may further include the decrypting of the encrypted content includes: recovering a decryption key corresponding to the encryption key from the plurality of partial keys distributed to the plurality of devices in response to determining that the number of devices located within the proximate spacing of each other is equal to or greater than the threshold value; and decrypting the encrypted content by using the recovered decryption key.

The encrypting of the content may include stopping the recovering of the decryption key and the decrypting of the encrypted content and re-encrypting the decrypted content in response to determining that the at least one external device is not located within the proximate spacing from the mobile device.

The determining whether the number of devices are located within a proximate spacing of each other is equal to or greater than a threshold value comprises determining whether the plurality of devices are located within the proximate spacing via a short-range wireless communication module that includes at least one of a near field communication (NFC) module, a Bluetooth module, a WiFi module, and a ZigBee module.

The determining of whether the number of devices are located within a proximate spacing of each other is equal to or greater than a threshold value comprises determining whether the plurality of devices are located within the proximate spacing via at least one of a touch sensor or a proximity sensor.

According to an aspect of another exemplary embodiment, there is provided a non-transitory computer-readable recording storage medium having stored thereon a computer program, which when executed by a computer, performs the method including: determining whether a number of devices, from among the plurality of devices, is equal to or greater than a threshold value are located within a proximate spacing of each other; and decrypting encrypted content that is shared by the plurality of devices in response to determining that the number of devices located within a proximate spacing of each other is equal to or greater than the threshold value.

BRIEF DESCRIPTION OF THE DRAWINGS

The above and/or other aspects will become apparent and more readily appreciated from the following description of exemplary embodiments, taken in conjunction with the accompanying drawings in which:

FIG. 5 illustrates an exemplary embodiment of the storing, included in the encrypting content described with reference to FIG. 3;

FIG. 18 illustrates a flowchart showing an example of operation of the security group shown in FIG. 1, according to a modified example of the method of encrypting content described with reference to FIG. 3;

FIG. 19 illustrates a flowchart of a method of decrypting content, according to an exemplary embodiment;

DETAILED DESCRIPTION

Figure 1:
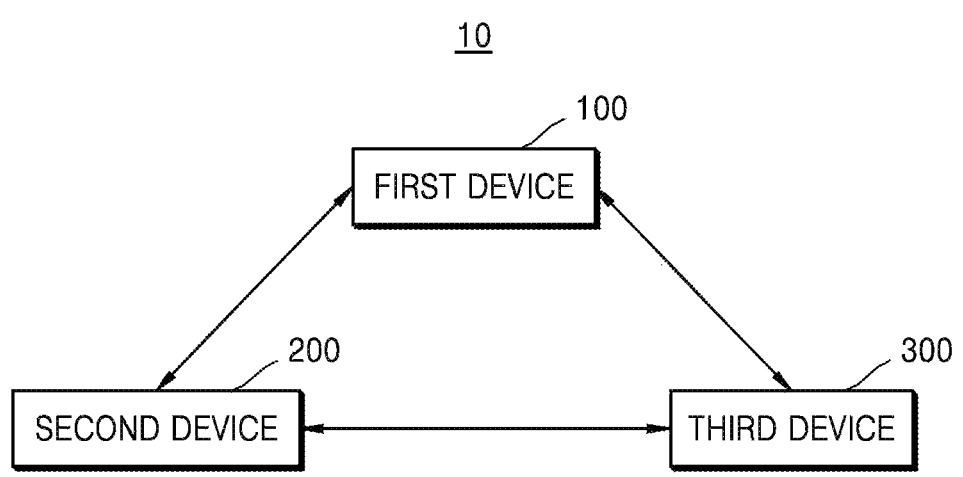
FIG. 1 illustrates a block diagram of a security group according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. In the description below, certain detailed explanations of the related art may be omitted where they may unnecessarily obscure the description. As used herein, the term "and/or" includes any and all combinations of one or more of the associated listed items. Expressions such as "at least one of," when preceding a list of elements, modify the entire list of elements and do not elements of the list individually.

General and widely-used terms have been employed herein, in consideration of functions provided of the exemplary embodiments, and may vary according to an intention of one of ordinary skill in the art, a precedent, or emergence of new technologies. Accordingly, It will be understood that the terms, used herein, should be interpreted as having a meaning that is consistent with their meaning in the context of the relevant art.

Additionally, terms used herein, such as 'unit' or 'module', refer to entities that may be implemented by hardware, software, or a combination of hardware and software.

FIG. 1 illustrates a block diagram of a security group 10 according to an exemplary embodiment.

Referring to FIG. 1, the security group 10 may include a plurality of devices, for example, first through third devices 100 through 300. In detail, the security group 10 may share content between the plurality of devices 100 through 300 and, for this, encrypt the content and decrypt the encrypted content. Accordingly, the security group 10 may be referred to as a content encryption system or an encrypted-content decryption system. Additionally, the security group 10 may also be referred to as a security system.

However, the elements, shown in FIG. 1, are not all essential elements. The security group 10 or the security system may be implemented by using more or less elements than those shown in FIG. 1. For example, the security group 10 may include two devices, or it may include four or more devices. As another example, the security group 10 or the security system may further include a plurality of devices and a server or a cloud server.

An operation of generating or initializing the security group 10 may be performed, and a device for performing the operation may be referred as a group leader. In the current exemplary embodiment, the first device 100 may be a group leader of the security group 10, and the second and third devices 200 and 300 may be group members. The first device 100 may be a device of a first user USER1, the second device 200 may be a device of a second user USER2, and the third device 300 may be a device of the third user USER3.

For example, the first through third devices 100 through 300 may be smartphones, but the devices are not limited to smartphones. One or more of the first through third devices 100 through 300 may be a tablet personal computer (PC), a PC, a smart TV, a cellular phone, a personal digital assistant (PDA), a laptop computer, a media player, a micro server, a global positioning system (GPS), an e-book terminal, a digital broadcasting terminal, a navigation system, a kiosk, a moving pictures expert group audio layer 3 (MP3) player, a digital camera, a wearable device, or other mobile or non-mobile computing devices.

One of the first through third devices 100 through 300 may generate and store content, and encrypt the stored content. The encrypted content may be copied and shared between the first through third devices 100 through 300. At least one of the first through third devices 100 through 300 may store the encrypted content in a security zone, for example, TrustZone, and thus, protect the encrypted content by using hardware. According to another exemplary embodiment, a server or a cloud server (not shown) may store encrypted content, and the stored content may be shared between the first through third devices 100 through 300.

The content may be video content (for example, a TV program, video on demand (VOD), user-created content (UCC), a music video clip, a YouTube video clip, or the like), still image content (for example, a photograph, a picture, or the like), text content (for example, an e-book for a poem or a novel, a letter, a work file, a web page, or the like), music content (for example, music, a musical program, a radio broadcast, or the like), or an application (for example, a widget, a game, a video phone call, or the like).

According to an exemplary embodiment, content may be selected manually according to a user input. For example, content may be selected while using an application such as a camera application or a photo album application. As another example, content may be selected by executing a particular application for sharing content in the security group 10.

According to another exemplary embodiment, content may be automatically determined according to state information about the first through third devices 100 through 300, that is, based on context. For example, content may be determined based on location information of the first through third devices and/or relation information about the first through third devices 100 through 300 in a social network service (SNS). As another example, one of the first through third devices may unilaterally determine content.

According to an exemplary embodiment, the content may be encrypted by at least one the first through third devices 100 through 300, and the encrypted content may be decrypted and shared between the first through third devices 100 through 300, only when the first through third devices 100 through 300 are near each other within a proximate spacing with each other. The proximate spacing of the devices is not restricted to an exact distance, and in different exemplary embodiments the spacing could be from several meters to actual contact of the devices. If all the first through third devices 100 through 300 consent, the content may become public or be changed.

In detail, the security group 10 that includes the first through third devices 100 through 300 may encrypt/decrypt content based on a secret sharing method (also referred as to a secret splitting method). The secret sharing method is performed by using encryption technology for securely maintaining and managing secret information, by splitting one piece of secret information, for example, an encryption key into a plurality of secret shares and storing the plurality of secret shares in each group member.

According to another exemplary embodiment, the content may be encrypted by at least one of the first through third devices 100 through 300. When some of the first through third devices 100 through 300 are near each other within a proximate spacing of each other, the encrypted content may be decrypted and shared among the devices. Accordingly, if some of the first through third devices 100 through 300 consent, the content may become public or modified.

In detail, the security group 10 that includes the first through third devices 100 through 300 may encrypt or decrypt content based on a threshold method. The threshold method is a modified method of a secret sharing method. In the threshold method, if t or more participants from among N participants are near each other, original secret information may be recovered. If less than t participants are near each other, the original secret information may not be recovered. For example, if N is 3 and t is 2, encrypted content may be decrypted and shared when two or more devices from among the first through third devices 100 through 300 are near each other (within a proximate spacing).

A method of encrypting content and a method of decrypting the encrypted content may be described in detail with reference to FIGS. 2 through 25.

Figure 2:
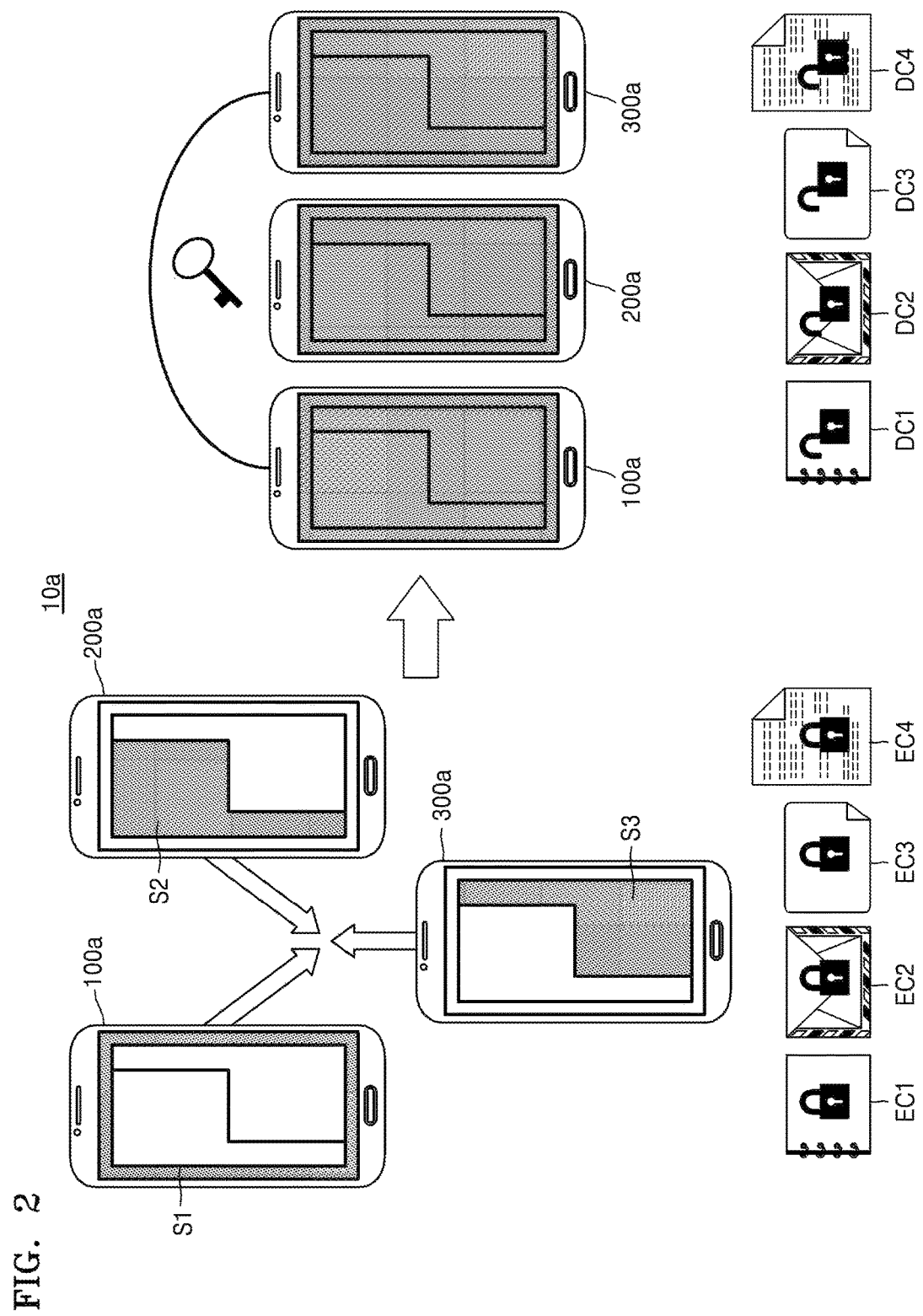
FIG. 2 illustrates a schematic diagram showing an example of the security group shown in FIG. 1.

FIG. 2 illustrates a schematic diagram showing a security group 10a as an example of the security group 10 shown in FIG. 1.

Referring to FIG. 2, the security group 10a includes first through third devices 100a through 300a. For example, the first through third devices 100a through 300a may store an encrypted memo EC1, an encrypted mail EC2, an encrypted photograph EC3, or an encrypted document EC4. In this case, it may be understood that the first through third devices 100a through 300a have respectively split secret shares S1 through S3. Accordingly, each of the first through third devices 100a through 300a may not recover original secret information.

However, if the first through third devices 100a through 300a are near each other, the original secret information may be recovered based on the split secret shares S1 through S3. Thus, the first through third devices 100a through 300a may obtain a decrypted memo DC1, a decrypted mail DC2, a decrypted photograph DC3, or a decrypted document DC4.

Figure 3:
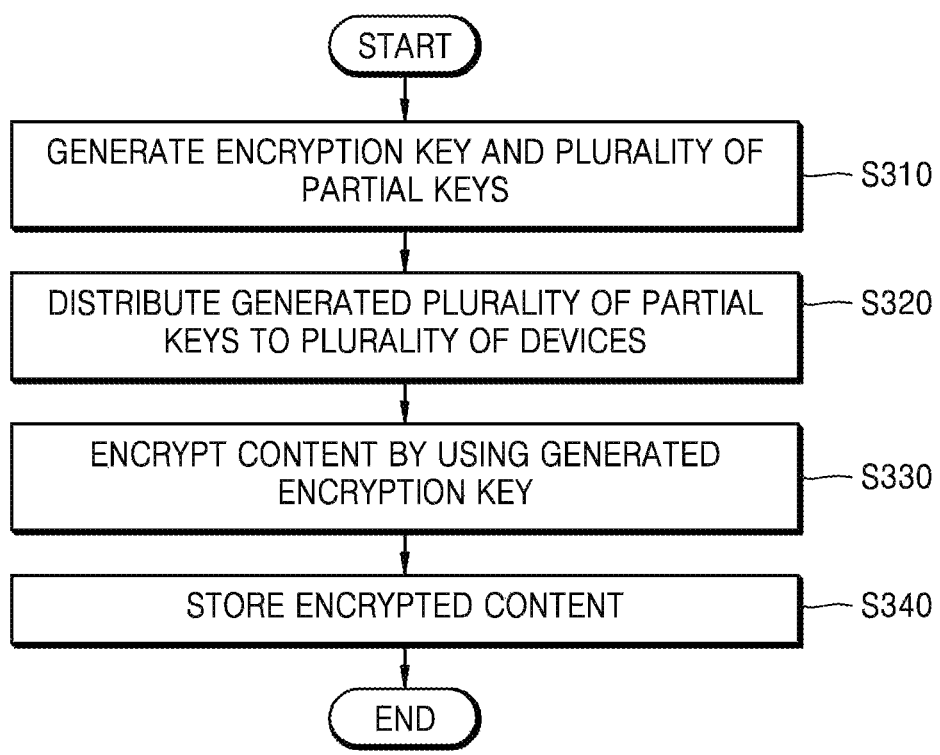
FIG. 3 illustrates a flowchart of a method of encrypting content according to an exemplary embodiment.

FIG. 3 illustrates a flowchart of the method of encrypting content according to an exemplary embodiment.

Referring to FIG. 3, in the current exemplary embodiment, the method of encrypting content refers to a method of encrypting content shared in a security group that includes a plurality of devices, and includes operations that are performed by one of the plurality of devices as described below. For example, in the current exemplary embodiment, the method of encrypting content may include operations processed in time series by the first device 100 included in the security group 10 shown in FIG. 1.

In operation S310, an encryption key and a plurality of partial keys are generated. In detail, the first device 100 may generate an encryption key and a plurality of partial keys that are to be distributed to the first through third devices 100 through 300. The encryption key may be used to encrypt content, and the plurality of partial keys may be used to decrypt the encrypted content.

According to an exemplary embodiment, in the method of encrypting content, content may be encrypted by using an asymmetrical encryption method. The encryption key may include a key pair that includes a public key and a private key. The public key may be used to encrypt content, and the private key may be used to decrypt content. For example, the first device 100 may split the private key into at least three parts, and thus, generate first through third partial keys. As another example, the first device 100 may split the public key into three parts to generate first through third partial keys.

According to another exemplary embodiment, in the method of encrypting content, the content may be encrypted by using a symmetrical encryption method. Since the encryption key may be used to encrypt or decrypt content, the encryption key may also be referred to as a symmetric key. For example, the first device 100 may split the encryption key into three parts to generate first through third partial keys.

In operation S320, the generated plurality of partial keys are distributed to the plurality of devices. In detail, the first device 100 may store the first partial key from among the generated first through third partial keys, and transmit the second and third partial keys each to the second and third devices 200 and 300. According to another exemplary embodiment, the method of encrypting content may further include encrypting a plurality of partial keys. In this case, the first device 100 may transmit each of the encrypted second and third partial keys to the second and third devices 200 and 300.

In operation S330, the content is encrypted by using the generated encryption key. In detail, the device 100 may encrypt content stored in the first device 100 or a server by using the generated encryption key. For example, in the asymmetric encryption method, the first device 100 may encrypt content by using the public key. As another example, in the symmetric encryption method, the first device 100 may encrypt content by using the encryption key that is a symmetric key.

In operation S340, the encrypted content is stored. In detail, the first device 100 may store the encrypted content. According to an exemplary embodiment, the first device 100 may store the encrypted content in a security zone such as TrustZone, and thus, protect the encrypted content by using hardware. Additionally, the first device 100 may transmit the encrypted content to at least one the second and third devices 200 and 300, and/or may transmit the encrypted content to a server.

Figure 4:
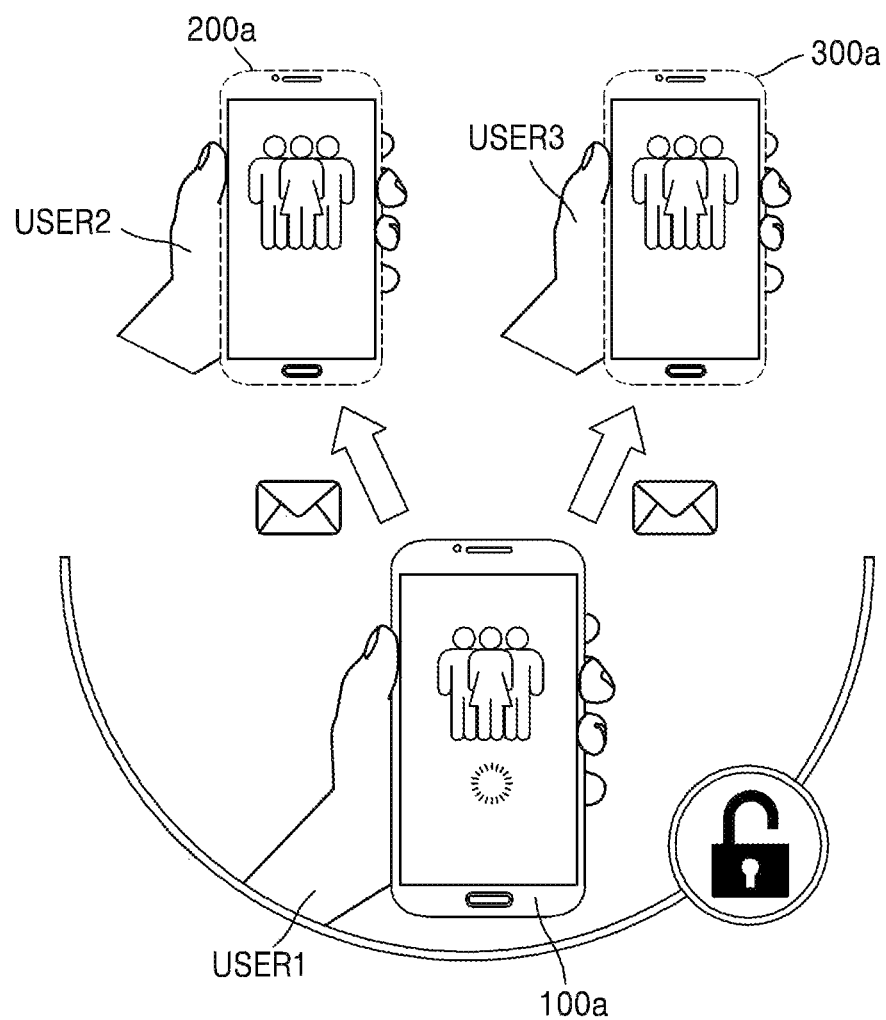
FIG. 4 illustrates an exemplary embodiment of distributing and storing, included in the method of encrypting content described with reference to FIG. 3.

FIG. 4 illustrates an exemplary embodiment of the distributing and the storing operations that may be included in the method of encrypting content described with reference to FIG. 3.

Referring to FIG. 4, the first device 100*a* of the first user USER1 may transmit second and third partial keys to the second and third devices 200*a* and 300*a*, respectively. Accordingly, since an arbitrary user of an arbitrary device in the security group 10 may not obtain all partial keys (e.g., the second device 200*a* receives only the second partial key), the arbitrary user may not independently access the content. However, only when devices amounting to a value equal to or greater than a threshold value, from among the plurality of devices included in the security group 10, are located within a proximate spacing of each other, a decryption key may be recovered by using a plurality of partial keys that are respectively stored in the corresponding devices, and then, the arbitrary user may access the encrypted content by using the recovered decryption key.

The first device 100*a* of the first user USER1 may transmit encrypted second and third partial keys to the second and third devices 200*a* and 300*a*, respectively. Accordingly, since a device that is not included in the security group 10 or another device included in the security group 10 does not have a key for decrypting the encrypted second and third partial keys, the other device may not obtain the second and third partial keys.

Additionally, the first device 100*a* may transmit the encrypted content to the second and third devices 200*a* and 300*a*. Accordingly, since a device or a user that does not belong to the security group 10 does not have a key for decrypting the encrypted content, the other device or the user may not access the encrypted content.

FIG. 5 illustrates an exemplary embodiment of the storing operation, included in the method of encrypting content described with reference to FIG. 3.

Referring to FIG. 5, the first through third devices 100*a* through 300*a* each may store encrypted content EC. Additionally, since the first through third devices 100*a* through 300*a* respectively store the corresponding first through third partial keys, the first through third devices 100*a* through 300*a* may not independently decrypt the encrypted content EC.

Figure 6:
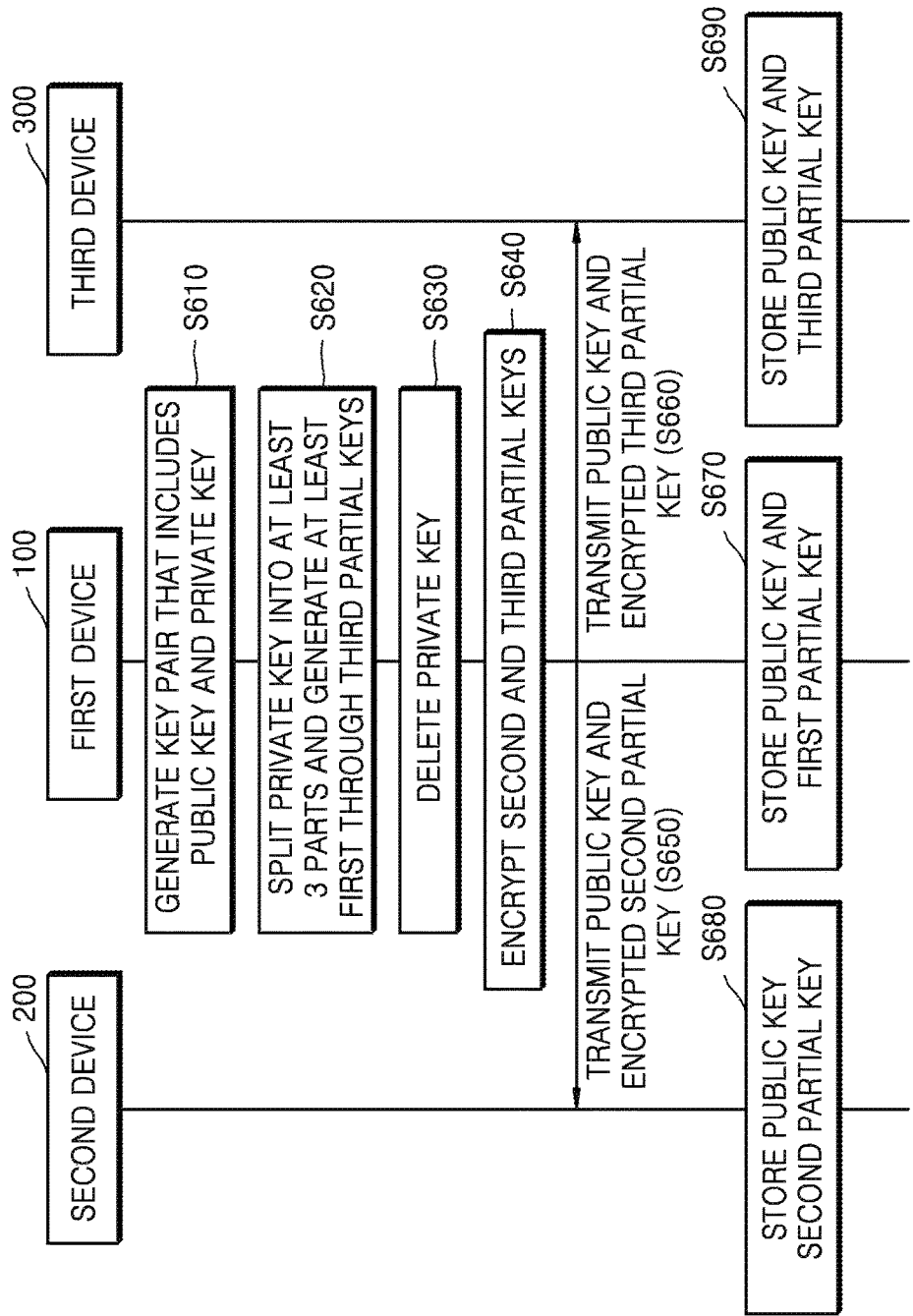
FIG. 6 illustrates a flowchart showing an example of operation of the security group shown in FIG. 1, according to generating of an encryption key and a plurality of partial keys and distributing of the generated plurality of partial keys, which are included in the method of encrypting content described with reference to FIG. 3

FIG. 6 illustrates a flowchart showing an example of operation of the security group 10, shown in FIG. 1, according to the generating of an encryption key and a plurality of partial keys and the distributing of the generated plurality of partial keys, which are included in the method of encrypting content described with reference to FIG. 3.

Referring to FIG. 6, in the current exemplary embodiment, the method of encrypting content includes a splitting encryption method performed by distributing a private key. The method of encrypting content includes operations processed by the first through third devices 100 through 300 included in the security group 10 shown in FIG. 1. Accordingly, it will be understood that a description, provided with regard to the security group 10 described with reference to FIG. 1, may also be applied to the method of encrypting content in the current exemplary embodiment, even if the description is not repeated.

In operation S610, the first device 100 generates a key pair consisting of a public key and a private key. For example, the first device 100 may generate a public key T used for encryption and a private key t that corresponds to the public key T and is used for decryption.

In operation S620, the first device 100 splits the private key t into three parts, and thus, generates first through third partial keys. For example, the first device 100 may generate at least first through third partial keys t1 through t3 by splitting the private key t into three parts. In this case, the first device 100 may split the private key t by using a secret sharing scheme, such as a Shamir scheme.

In operation S630, the private key t is deleted. For example, the first device 100 may delete the private key t. Accordingly, none of the first through third device 100 through 300 may obtain the private key t, and thus, may not independently access the encrypted content.

In operation S640, the second and third partial keys are encrypted. For example, the first device 100 may generate the encrypted second and third partial keys by encrypting the second and third partial keys t2 and t3 each, so as to ensure security in the transmitting of the second and third partial keys. Thus, in the transmitting of the encrypted second and third partial keys, devices that are not included in the security group 10 may not obtain the second and third partial keys.

In operation S650, the first device 100 transmits the public key and the encrypted second partial key to the second device 200. In operation S660, the first device 100 transmits the public key and the encrypted third partial key to the third device 300. For example, the first device 100 may transmit the public key and the encrypted second and third partial keys respectively to the second and third devices 200 and 300 via a wireless communication connection such as WiFi, third generation (3G), long-term evolution (LTE), Bluetooth, or the like.

In operation S670, the first device 100 stores the public key and the first partial key. In operation S680, the second device 200 stores the public key and the second partial key. In operation S690, the third device 300 stores the public key and the third partial key. For example, the second and third devices 200 and 300 may respectively extract the second and third partial keys by decrypting the encrypted second and third partial keys. Additionally, since the second and third devices 200 and 300 have the public key T, any of the first through third users USER1 through USER3 of the first through third devices 100 through 300 may decrypt the content by using the public key T.

Figure 7:
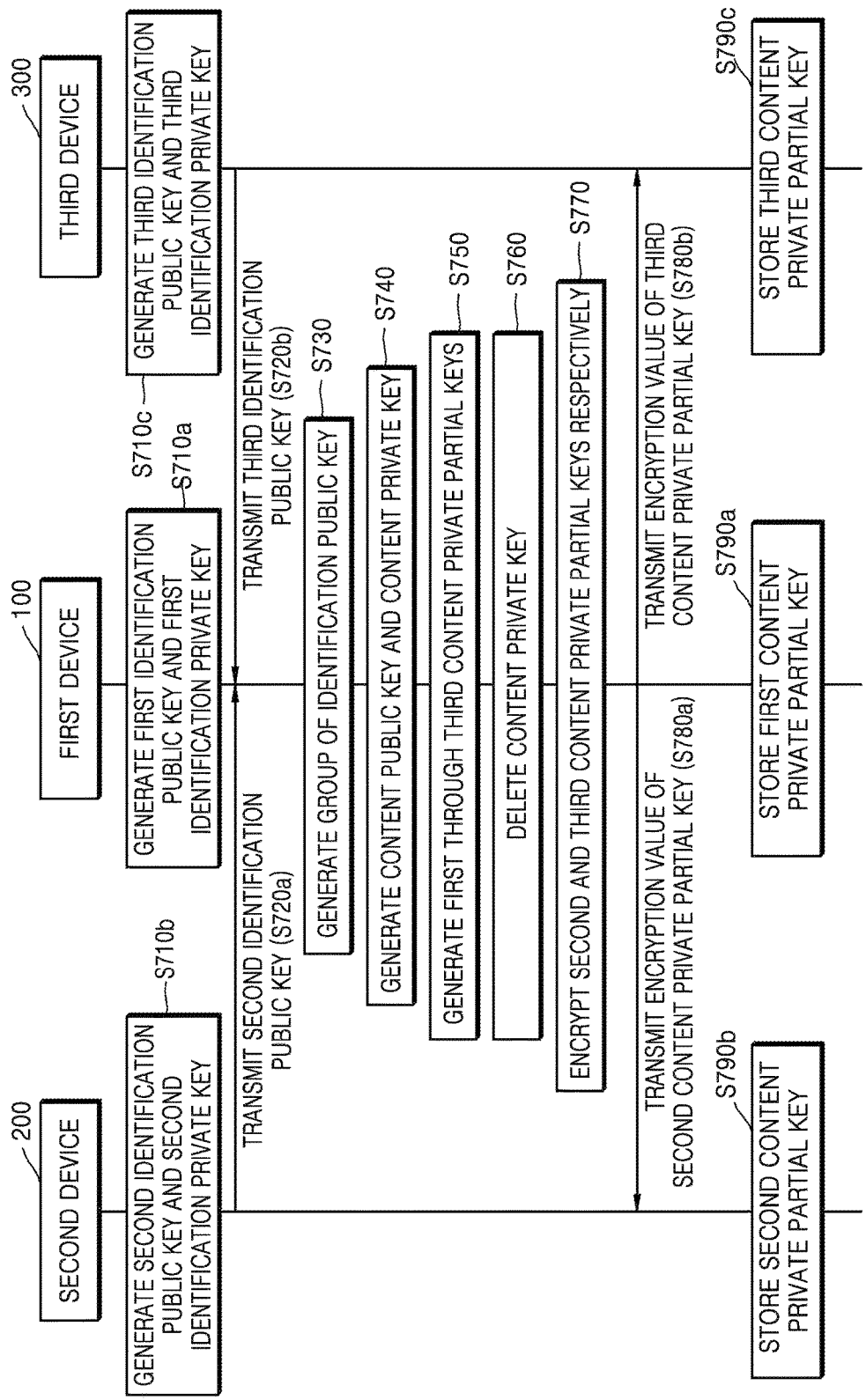
FIG. 7 illustrates a detailed flowchart showing an example of operation of the security group shown in FIG. 1, according to the method of encrypting content described with reference to FIG. 6.

FIG. 7 illustrates a detailed flowchart showing an example of operation of the security group 10 shown in FIG. 1, according to the method of encrypting content described with reference to FIG. 6.

Referring to FIG. 7, in operation S710a, the first device 100 generates a first identification public key K1 and a first identification private key k1. A first identification key pair consisting of the first identification public key K1 and the first identification private key k1 is a combination of keys for identifying a first application installed in the first device 100. Second and third applications respectively installed in the second and third devices 200 and 300 may check or identify the first application installed in the first device 100 by using the first identification public key K1.

According to an exemplary embodiment, the first device 100 may request a public key infrastructure (PKI), such as a phone PKI, to generate the first identification public key K1 and the first identification private key k1. According to another exemplary embodiment, the first device 100 may request the phone PKI to generate the first identification public key K1, the first identification private key k1, and a first certificate $Certificate_{p1}(K1)$ with respect to the first identification public key k1. p1 denotes a key for certification of the first device 100, and the first certificate $Certificate_{p1}(K1)$ is a document for concatenating an identity of the first user USER1 to the public key, that is, the first identification public key K1.

In operation S710b, the second device 200 generates a second identification public key K2 and a second identification private key k2. A second identification key pair consisting of the second identification public key K2 and the second identification private key k2 is a combination of keys for identifying a second application installed in the second device 200. The first and third applications each installed in the first and third devices 100 and 300 may check or identify the second application installed in the second device 100 by using the second identification public key K2.

According to an exemplary embodiment, the second device 200 may request the phone PKI to generate the second identification public key K2 and the second identification private key k2. According to another exemplary embodiment, the second device 200 may request the phone PKI to generate the second identification public key K2, the second identification private key k2, and a second certificate $Certificate_{p2}(K2)$ with respect to the second identification public key k2. p2 denotes a key for certification of the second device 200, and the second certificate $Certificate_{p2}(K2)$ is a document for concatenating an identity of the second user USER2 to the public key, that is, the second identification public key K2.

In operation S710c, the third device 300 generates a third identification public key K3 and a third identification private key k3. A third identification key pair consisting of the third identification public key K3 and the third identification private key k3 is a combination of keys for identifying a third application installed in the third device 100. The first and second applications each installed in the first and second devices 100 and 200 may check or identify the third application installed in the third device 300 by using the third identification public key K3.

According to an exemplary embodiment, the third device 300 may request the phone PKI to generate the third identification public key K3 and the third identification private key k3. According to another exemplary embodiment, the third device 300 may request the phone PKI to generate the third identification public key K3, the third identification private key k3, and a third certificate $Certificate_{p3}(K3)$ with respect to the third identification public key k3. p3 denotes a key for certification of the third device 300, and the third certificate $Certificate_{p3}(K3)$ is a document for concatenating an identity of the third user USER3 to the public key, that is, the third identification public key K3. Operations S710a through S710b described above may be referred to as operations of generating identification keys.

In operation S720a, the second device 200 transmits the second identification public key K2 to the first device 100. The transmitted second identification public key K2 may be used to encrypt a second content private partial key t2. According to another exemplary embodiment, the second device 200 may transmit the second identification public key K2 and the second certificate $Certificate_{p2}(K2)$ to the first device 100.

In operation S720b, the third device 300 transmits the third identification public key K3 to the first device 100. The transmitted third identification public key K3 may be used to encrypt a third content private partial key t3. According to another embodiment, the third device 300 may transmit the third identification public key K3 and the third certificate $Certificate_{p3}(K3)$ to the first device 100.

In operation S730, the first device 100 generates a group {K1, K2, K3} of the identification public keys which includes the first through third identification public keys K1 through K3. The generated group {K1, K2, K3} of the identification public keys may be stored in the first through third devices.

In operation S740, the first device 100 generates the content public key T and the content private key t. A content key pair consisting of the content public key T and the content private key t is a combination of keys for encrypting/decrypting content shared by the security group 10. In detail, the content private key t may be used to encrypt a symmetric key s for encrypting content.

According to another exemplary embodiment, the first device 100 may further generate an identification public key concatenation value G from the first through third identification public keys K1 through K3 (that is, G=K1|K2|K3).

In operation S750, the first device 100 splits the content private key t into at least 3 parts, and thus, generates the first through third content private partial keys t1 through t3 (that is, t=t1+t2+t3+ . . . ). The first device 100 may split the content private key t by using a secret sharing scheme, such as a Shamir scheme.

According to another exemplary embodiment, the first device 100 may generate an identification public key concatenation value G and first through third electronic signatures each with respect to the first through third content private partial keys t1 through t3. According to another exemplary embodiment, the first device 100 may generate a group identification (ID) GroupID, an identification public key concatenation value G, and an electronic signature with respect to the first through third content private partial keys t1 through t3. In detail, the first electronic signature is E-Sign$_t$(GroupID|G|t1), the second electronic signature is E-Sign$_t$(GroupID|G|t2), and the third electronic signature is E-Sign$_t$(GroupID|G|t3).

In operation S760, the first device 100 deletes the content private key t. Thus, the content private key t may not be known to any user, and unless devices amounting to a value equal to or greater than a threshold value, from among the first through third devices 100 through 300, are located within a proximate spacing of each other, any user may not independently decrypt the encrypted content. According to another exemplary embodiment, the first device 100 may store the content private key t in a security zone such as TrustZone or other hardware-based security architecture, and thus, protect the content private key t by using hardware.

In operation S770, the first device 100 encrypts the second and third content private partial keys t2 and t3 respectively by using the second and third identification public keys K2 and K3. Thus, a second content private partial key encryption value $Enc_{K2}(t2)$ and a second content private partial key encryption value $Enc_{K3}(t3)$ are generated. Since the second content private partial key encryption value $Enc_{K2}(t2)$ may be decrypted by using the second identification private key k2 corresponding to the second identification public key K2, the second content private partial key encryption value $Enc_{K2}(t2)$ may be decrypted only by the second device 200 that has the second identification key k2. Additionally, since the third content private partial key encryption value $Enc_{K3}(t3)$ may be decrypted by using the third identification private key k3 corresponding to the third identification public key K3, the third content private partial key encryption value $Enc_{K3}(t3)$ may be decrypted only by the third device 300 that has the third identification private key k3.

In operation S780a, the first device 100 transmits the group {K1, K2, K3} of the identification public keys, the content public key T, and the second content private partial key encryption value $Enc_{K2}(t2)$ to the second device 200. According to another exemplary embodiment, the first device 100 may further transmit the second electronic signature E-Sign$_t$(GroupID|G|t2) to the second device 200.

In operation S780b, the first device 100 transmits the group {K1, K2, K3} of the identification public keys, the content public key T, and the third content private partial key encryption value $Enc_{K3}(t3)$ to the third device 300. According to another exemplary embodiment, the first device 100 may further transmit the third electronic signature E-Sign$_t$(GroupID|G|t3) to the third device 300. Operations S710a through S780b may be referred to as generating and initializing of the security group 10.

In operation S790a, the first device 100 stores the group {K1, K2, K3} of the identification public keys, the content public key T, and the first content private partial key t1. In operation S790b, the second device 200 extracts and stores the second content private partial key t2 by decrypting the second content private partial key encryption value $Enc_{K2}(t2)$ by using the second identification private key k2. In operation S790c, the third device 300 extracts and stores the third content private partial key t3 by decrypting the third content private partial key encryption value $Enc_{K3}(t3)$ by using the third identification private key k3. According to an exemplary embodiment, the first through third devices 100 through 300 may respectively store the first through third content private keys t1 through t3 in a security zone such as TrustZone or other hardware-based security architecture.

Figure 8:
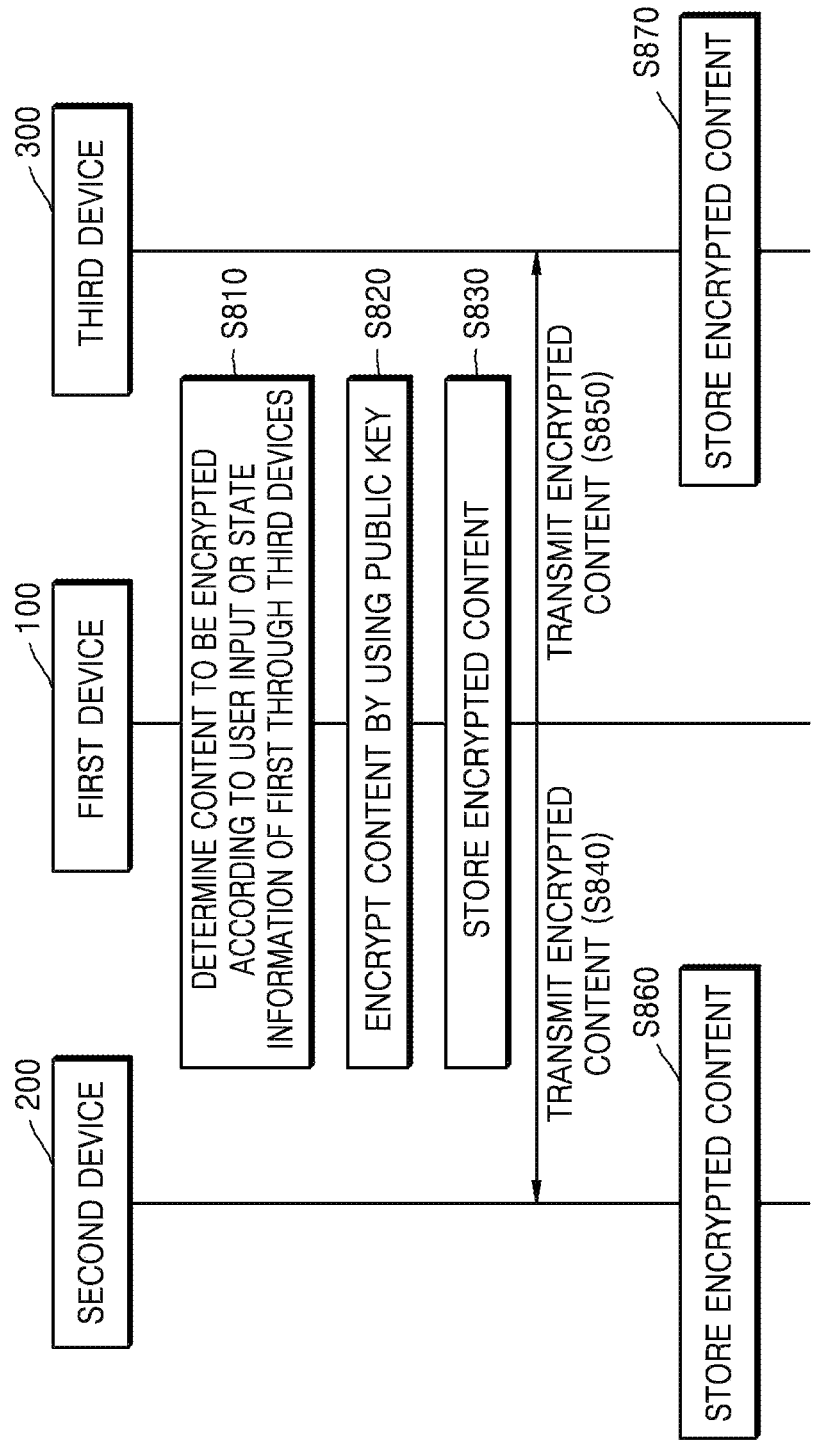
FIG. 8 illustrates a flowchart showing another example of operation of the security group shown in FIG. 1, according to encrypting and storing of the encrypted content which are included in the method of encrypting content shown in FIG. 3.

FIG. 8 illustrates a flowchart showing another example of operation of the security group 10 shown in FIG. 1, according to the encrypting and the storing of the encrypted content which are included in the method of encrypting content shown in FIG. 3.

Referring to FIG. 8, in the current exemplary embodiment, the method of encrypting content may be performed after the method of encrypting content described with reference to FIG. 6 is performed. Additionally, in the current exemplary embodiment, the method of encrypting content include operations that are performed by the first through third devices 100 through 300 included in the security group 10. Hereinafter, an operation of encrypting content is described, in which the encrypting is performed by the first device 100. However, according to another exemplary embodiment, one of the second and third devices 200 and 300 may encrypt content by using a public key.

In operation S810, the first device 100 determines content to be encrypted, according to a user input or state information of the first through third devices 100 through 300. In detail, the first user USER1 may determine content stored in the first device 100 or a server as content to be encrypted, manually via a user input. Alternatively, content stored in the first device 100 or a server may be automatically determined as content to be encrypted, according to state information of the first through third devices 100 through 300.

For example, the first user USER1 may select one of the photographs stored in the first device 100, and determine the selected photograph as content to be encrypted. As another example, a photograph that includes the first through third users USER1 through USER3, from among the photographs stored in the first device 100, may be automatically selected, and the selected photograph may be automatically selected as content to be encrypted. As another example, a photograph taken at a location of the first through third devices 100 through 300, from among the photographs stored in the first device 100, may be automatically selected, and the selected photograph may be automatically determined as content to be encrypted. As another example, a photograph related to activity of the first through third users USER1 through USER3 on a SNS, to which the first through third users are subscribed, from among the photographs stored in the first device 100, may be automatically determined as content to be encrypted.

In operation S820, the first device 100 encrypts the content by using a public key. For example, the first device 100 may encrypt content m by using an symmetric key s, (that is, $AES_s(m)$) and encrypt the symmetric key s by using a public key T (that is, $Enc_T(s)$).

In operation S830, the first device 100 stores the encrypted content. For example, the first device 100 may store the encrypted content in a security zone such as Trust Zone or other hardware-based security architecture, and thus, protect the encrypted content by using hardware.

In operation S840, the first device 100 transmits the encrypted content to the second device 200. In operation S850, the first device 100 transmits the encrypted content to the third device 300. For example, the first device 100 may transmit the encrypted content to the second and third devices 200 and 300 via a wireless communication connection such as WiFi, 3G, LTE, Bluetooth, or the like.

In operation S860, the second device stores the encrypted content. In operation S870, the third device 300 stores the encrypted content. For example, the second and third devices 200 and 300 may store the encrypted content in a security zone such as TrustZone or other hardware-based security architecture, and thus, protect the encrypted content by using hardware.

According to the method of generating a plurality of partial keys by splitting the private key which is described with reference to FIGS. 6 through 8, one of the first through third devices 100 through 300 which are included in the security group 10 may independently encrypt content. However, when devices amounting to a value equal to or greater than a threshold value, from among the first through third devices 100 through 300 included in the security group 10, are located within a proximate spacing between each other, a private key may be recovered from each stored partial keys, and thus, the encrypted content may be decrypted.

Accordingly, in this case, whereas the content may be generated or attached by any one of the first through third users USER1 through USER3 in the security group 10, the encrypted content may be accessed only when the users amounting to the value equal to or greater than the threshold value are located within a proximate spacing between each other. For example, any one of the first through third users USER1 through USER3 may generate a joint account, and all or some of the first through third users USER1 through USER3 may access the joint account only when the all or some of the first through third users USER1 through USER3 are located within a proximate spacing between each other.

Figure 9:
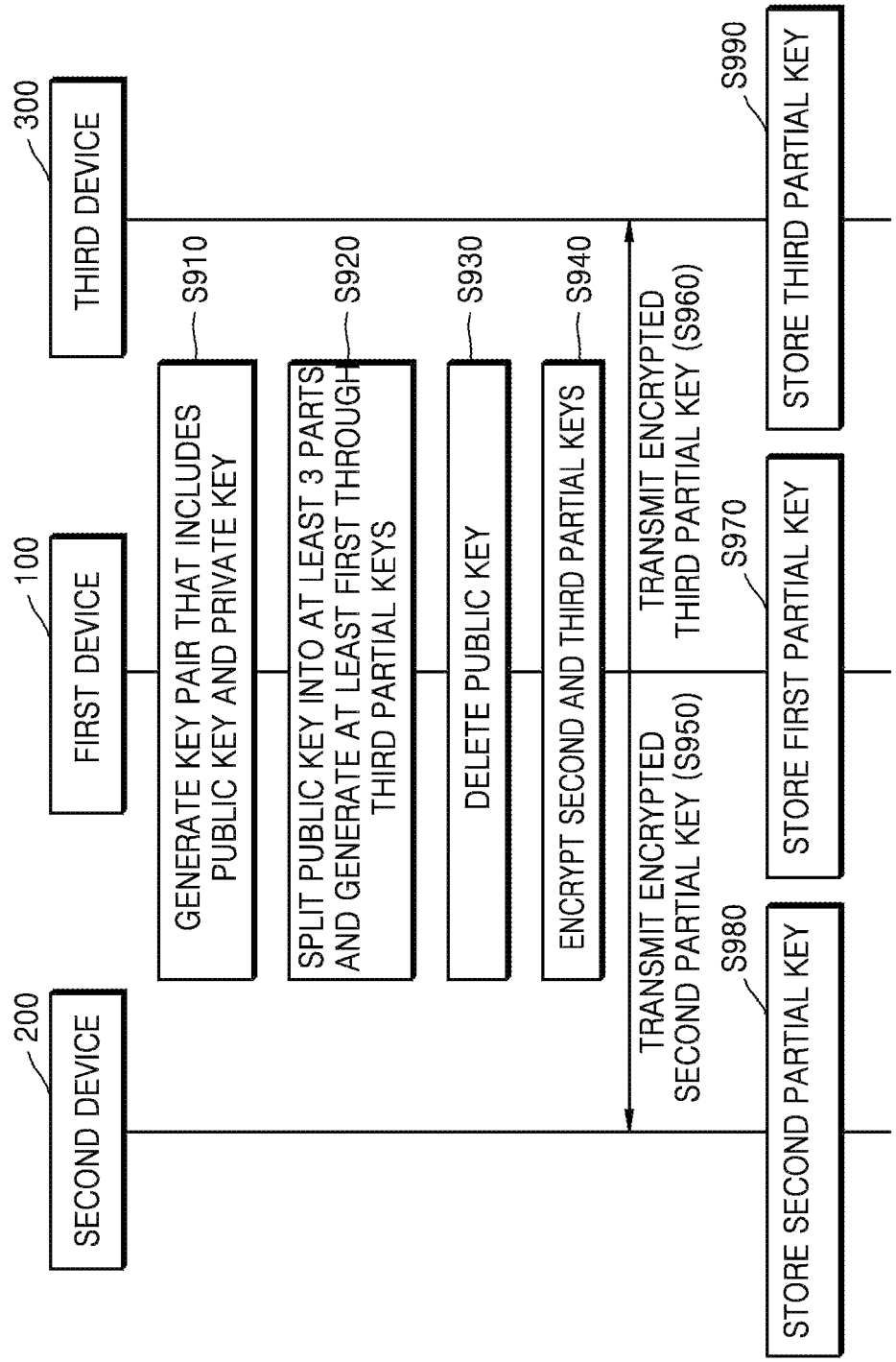
FIG. 9 illustrates a flowchart showing another example of operation of the security group shown in FIG. 1, according to the generating of an encryption key and a plurality of partial keys and the distributing of the generated plurality of partial keys which are included in the method of encrypting content described with reference to FIG. 3.

FIG. 9 illustrates a flowchart showing another example of operation of the security group 10 shown in FIG. 1, according to the generating of an encryption key and a plurality of partial keys and the distributing of the generated plurality of partial keys which are included in the method of encrypting content described with reference to FIG. 3.

Referring to FIG. 9, in the current exemplary embodiment, the method of encrypting content includes a splitting encryption method performed by distributing a private key. The method of encrypting content includes operations processed by the first through third devices 100 through 300 included in the security group 10 shown in FIG. 1. Accordingly, it will be understood that a description, provided with regard to the security group 10 described with reference to FIG. 1, may also be applied to the method of encrypting content in the current exemplary embodiment, even if the description is not repeated.

In operation S910, the first device 100 generates a key pair consisting of a public key and a private key. For example, the first device 100 may generate the public key T used for encryption and a private key t that corresponds to the public key T and is used for decryption.

In operation S920, the first device 100 splits the public key T into three parts, and thus, generates first through third partial keys. For example, the first device 100 may generate at least first through third partial keys T1 through T3 by splitting the public key T into three parts. In this case, the first device 100 may split the public key T by using a secret sharing scheme, such as a Shamir scheme.

In operation S630, the public key T is deleted. For example, the first device 100 may delete the public key T. Accordingly, none of the first through third devices 100 through 300 may obtain the public key T, and thus, may not independently encrypt the content.

In operation S940, the first device 100 encrypts the second and third partial keys T2 and T3. For example, the first device 100 may generate the encrypted second and third partial keys by encrypting the second and third partial keys T2 and T3 each, so as to ensure security in the transmitting. Thus, in the transmitting of the encrypted second and third partial keys, devices that are not included in the security group 10 may not obtain the second and third partial keys.

In operation S950, the first device 100 transmits the encrypted second partial key to the second device 200. In operation S960, the first device 100 transmits the encrypted third partial key to the third device 300. For example, the first device 100 may transmit the encrypted second and third partial keys to the second and third devices 200 and 300 via a wireless communication connection such as WiFi, 3G, LTE, Bluetooth, or the like.

In operation S970, the first device 100 stores the first partial key. In operation S980, the second device 200 stores the second partial key. In operation S990, the third device 300 stores the third partial key. For example, the second and third devices 200 and 300 may extract the second and third partial keys each, by decrypting the encrypted second and third partial keys.

Figure 10:
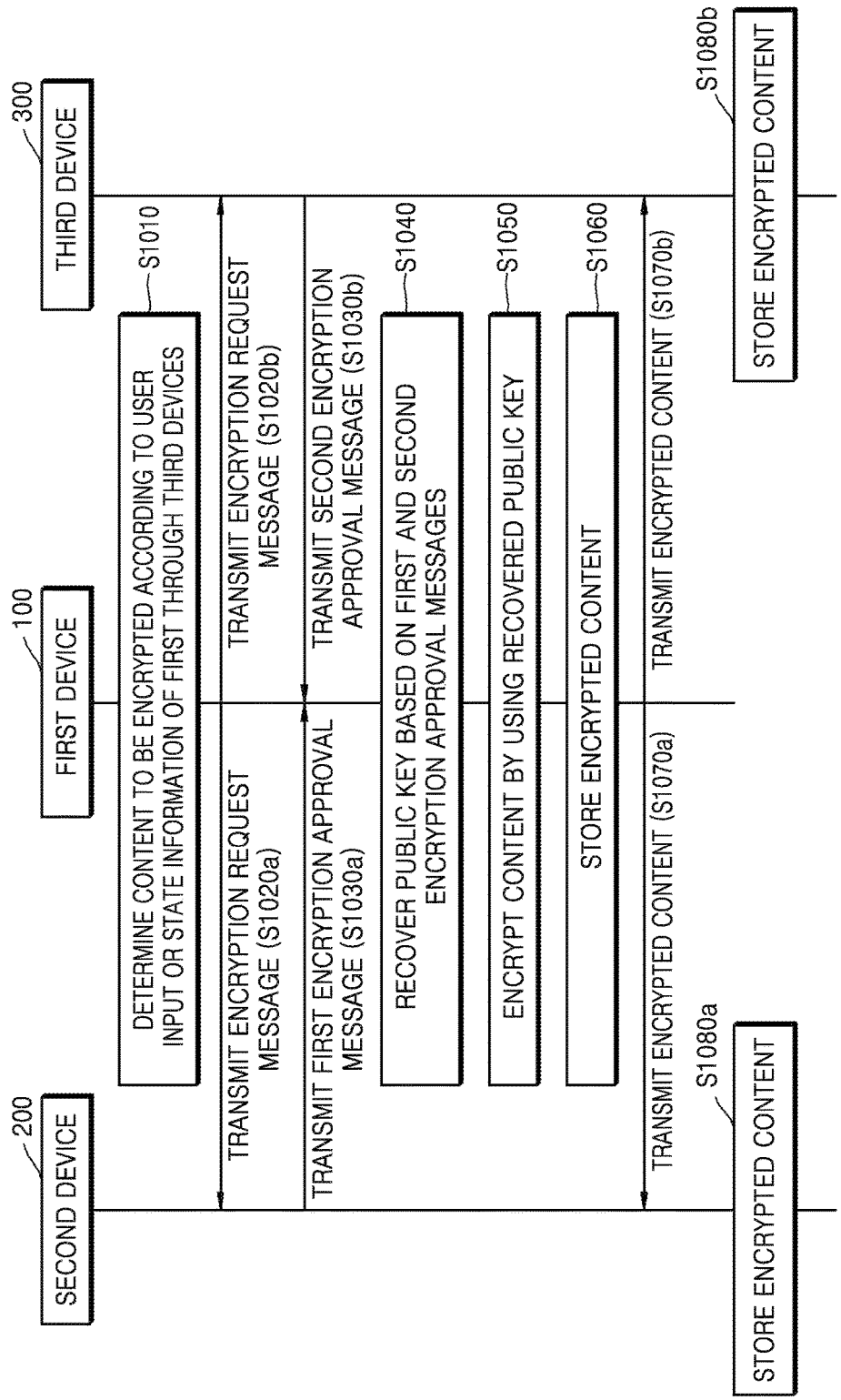
FIG. 10 illustrates a flowchart showing another example of operation of the security group shown in FIG. 1, according to the encrypting and the storing of the encrypted content which are included in the method of encrypting content shown in FIG. 3.

FIG. 10 illustrates a flowchart showing another example of operation of the security group 10 shown in FIG. 1, according to the encrypting and the storing of the encrypted content which are included in the method of encrypting content shown in FIG. 3.

Referring to FIG. 10, in the current exemplary embodiment, the method of encrypting content may be performed after the method of encrypting content described with reference to FIG. 9 is performed. Additionally, in the current embodiment, the method of encrypting content include operations that are performed by the first through third devices 100 through 300 included in the security group 10.

In operation S1010, the first device 100 determines content to be encrypted, according to a user input or state information of the first through third devices 100 through 300. In detail, the first user USER1 may manually determine content stored in the first device 100 or a server as the content to be encrypted, via a user input. Alternatively, content stored in the first device 100 or a server may be automatically determined as the content to be encrypted, according to state information of the first through third devices 100 through 300.

In operation S1020a, the first device 100 transmits an encryption request message to the second device 200. In operation S1020b, the first device 100 transmits an encryption request message to the third device 300.

In operation S1030a, the second device 200 transmits a first encryption approval message to the first device 100. For example, the first encryption approval message may include an encryption value of the second partial key T2 stored in the second device 200. In operation S1030b, the third device 300 transmits a second encryption approval message to the first device 100. For example, the second encryption approval message may include an encryption value of the third partial key T3 stored in the third device 300.

In operation S1040, the first device 100 recovers a public key based on the first and second encryption approval messages. For example, the first device 100 may recover the public key T based on the encryption values of the second and third partial keys T2 and T3 each included in the first and second encryption approval messages, and the first partial key T1 stored in the first device 100, (that is, T=T1+T2+T3).

In operation S1050, the first device 100 encrypts content by using the public key. For example, the first device 100 may encrypt the content m by using the symmetric key s (that is, $AES_s(m)$), and encrypt the symmetric key s by using the recovered public key T (that is, $Enc_T(s)$).

In operation S1060, the first device 100 stores the encrypted content. For example, the first device 100 may store the encrypted content in a security zone such as TrustZone or other hardware-based security architecture.

In operation S1070a, the first device 100 transmits the encrypted content to the second device 200. In operation S1070b, the first device 100 transmits the encrypted content to the third device 300. For example, the first device 100 may transmit the encrypted content to the second and third devices 200 and 300 via a wireless communication such as WiFi, 3G, LTE, Bluetooth, or the like.

In operation S1080a, the second device 200 stores the encrypted content. In operation S1080b, the third device 300 stores the encrypted content. For example, the second and third devices 200 and 300 may store the encrypted content in a security zone such as TrustZone or other hardware-based security architecture.

According to the method of generating a plurality of partial keys by splitting the public key as described with reference to FIGS. 9 and 10, only when devices amounting to a value equal to or greater than a threshold value, from among the first through third devices 100 through 300 included in the security group 10, are located within a proximate spacing of each other, a public key may be recovered based on each stored partial keys, and thus, content may be encrypted. On the contrary, any one of the first through third devices 100 through 300 included in the security group 10 may decrypt the encrypted content.

For example, whereas content regarding laws, policies, or regulations may be generated only when the first through third users USER1 through USER3 are located within a proximate spacing between each other, any one may access the generated content regarding laws, policies, or regulations.

Figure 11:
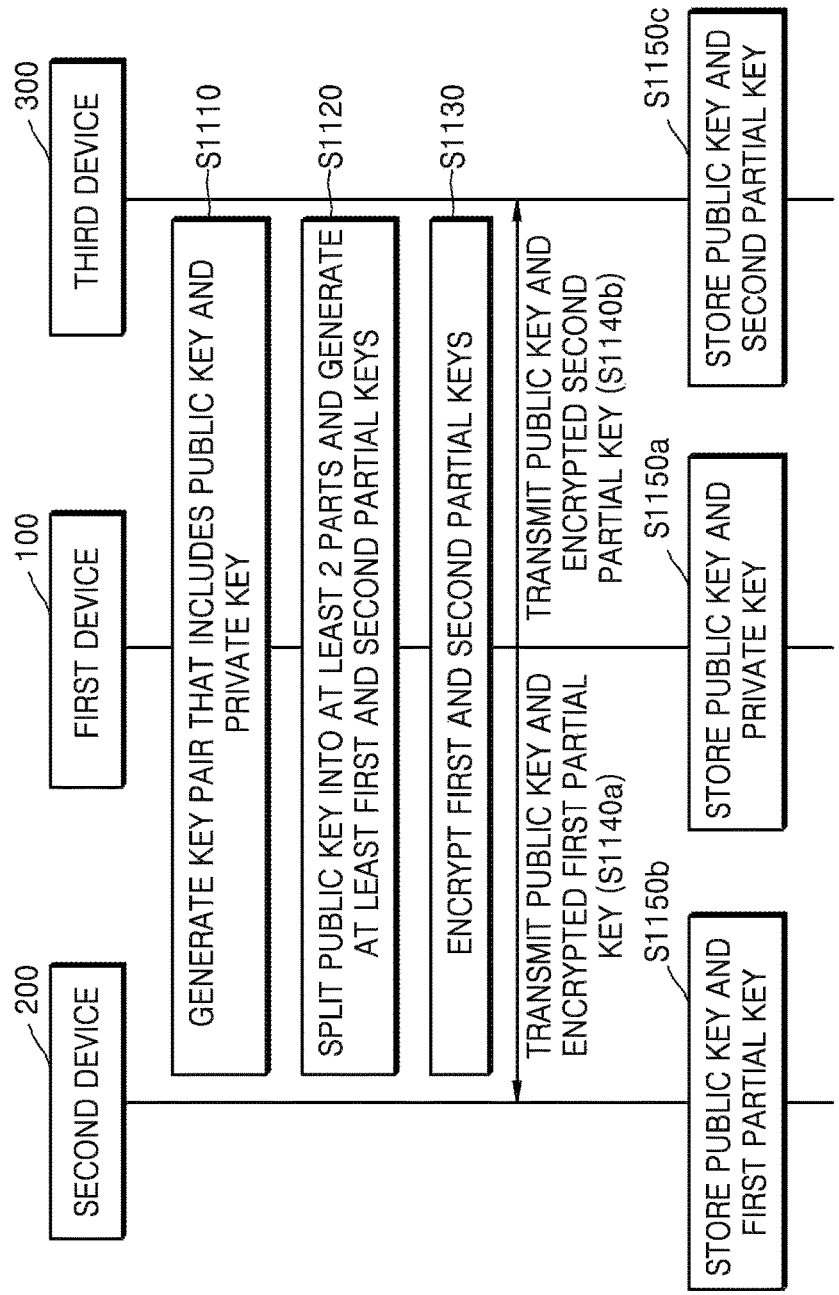
FIG. 11 illustrates a flowchart showing another example of operation of the security group shown in FIG. 1, according to the generating of an encryption key and a plurality of partial keys and the distributing of the generated plurality of partial keys which are included in the method of encrypting content described with reference to FIG. 3.

FIG. 11 illustrates a flowchart showing another example of operation of the security group 10 shown in FIG. 1, according to the generating of an encryption key and a plurality of partial keys and the distributing of the generated plurality of partial keys which are included in the method of encrypting content described with reference to FIG. 3.

Referring to FIG. 11, in the current exemplary embodiment, the method of encrypting content includes a modified splitting encryption method performed by distributing a private key. The method of encrypting content includes operations processed by the first through third devices 100 through 300 included in the security group 10 shown in FIG. 1. Accordingly, it will be understood that a description, provided with regard to the security group 10 described with reference to FIG. 1, may also be applied to the method of encrypting content in the current embodiment, even if the description is not repeated.

In operation S1110, the first device 100 generates a key pair consisting of a public key and a private key. For example, the first device 100 may generate a public key T used for encryption and a private key t that corresponds to the public key T and is used for decryption.

In operation S1120, the first device 100 splits the private key into at least 2 parts, and thus, generates at least first and second partial keys. For example, the first device 100 may generate at least the first and second partial keys t1 and t2 by splitting the private key t into at least 2 parts. In this case, the first device 100 may split the private key t by using a secret sharing scheme such as a Shamir scheme.

In operation S1130, the first device 100 encrypts the first and second partial keys. For example, the first device 100 may generate the encrypted first and second partial keys by respectively encrypting the first and second partial keys t1 and t2, so as to ensure security in the transmitting. Thus, in the transmitting of the encrypted first and second partial keys, devices that are not included in the security group 10 may not obtain the first and second partial keys.

In operation S1140a, the first device 100 transmits the public key and the encrypted first partial key to the second device 200. In operation S1140b, the first device 100 transmits the public key and the encrypted second partial key to the third device 300. For example, the first device 100 may transmit the public key and the encrypted second and third partial keys to the second and third devices 200 and 300 respectively via a wireless communication connection such as WiFi, 3G, LTE, Bluetooth, or the like.

In operation S1150a, the first device 100 stores the public key and the private key. For example, the first device 100 may independently encrypt the content by using the public key T, and independently decrypt the content by using the private key t. The first user USER1 of the first device 100 may be a person having a very high authority for generating, modifying, or using the content, and the content may be very private or sensitive data.

In operation S1150b, the second device 200 stores the public key and the first partial key. In operation S1150c, the third device 300 stores the public key and the second partial key. For example, the second and third devices 200 and 300 may extract the first and second partial keys respectively, by decrypting the encrypted first and second partial keys.

Additionally, since the second and third devices 200 and 300 have the public key T, any of the second and third users USER2 and USER3 of the second and third devices 200 and 300 may encrypt the content by using the public key T. However, since the second and third devices 200 and 300 respectively have the first and second partial keys t1 and t2, the second and third devices 200 and 300 may not independently decrypt content, and may decrypt content only when the second and third devices 200 and 300 are located within a proximate spacing of each other. The second and third users USER2 and USER3 of the second and third devices 200 and 300 may be persons who have an authority for generation of the content, but have a low authority for use of the content.

Figure 12:
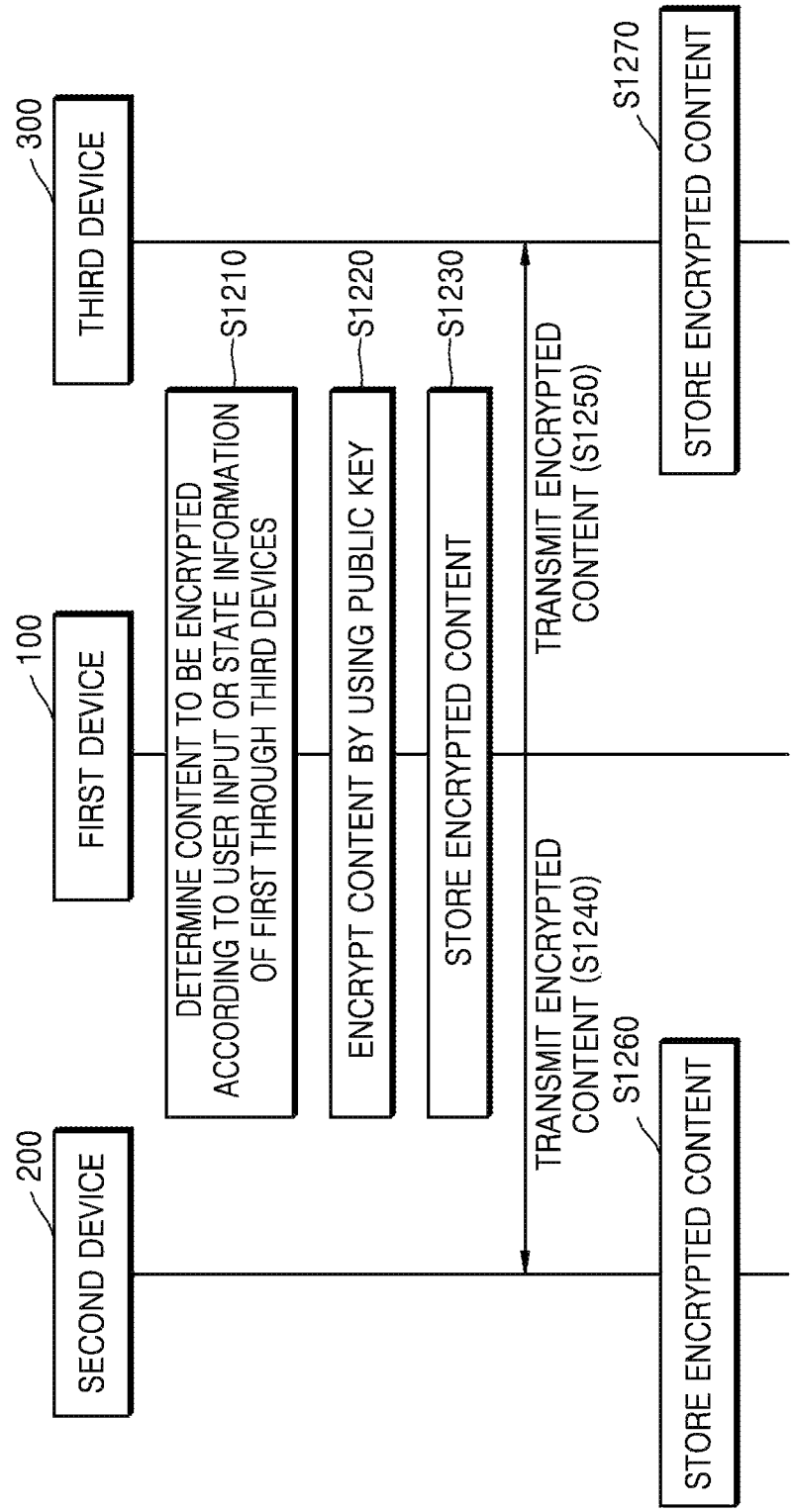
FIG. 12 illustrates a flowchart showing another example of operation of the security group shown in FIG. 1, according to the encrypting and the storing of the encrypted content which are included in the method of encrypting content described with reference to FIG. 3.

FIG. 12 illustrates a flowchart showing another example of operation of the security group 10 shown in FIG. 1, according to the encrypting and the storing of the encrypted content which are included in the method of encrypting content described with reference to FIG. 3.

Referring to FIG. 12, in the current exemplary embodiment, the method of encrypting content may be performed after the method of encrypting content described with reference to FIG. 11 is performed. Additionally, in the current exemplary embodiment, the method of encrypting content include operations that are performed by the first through third devices 100 through 300 included in the security group 10 shown in FIG. 1. Hereinafter, an operation of encrypting content, the operating being performed by the first device 100, is described in detail. However, according to another exemplary embodiment, one of the second and third devices 200 and 300 may encrypt content by using a public key.

In operation S1210, the first device 100 determines content to be encrypted, according to a user input or state information of the first through third devices 100 through 300. In detail, the first user USER1 may manually determine content stored in the first device 100 or a server as content to be encrypted, via a user input. Alternatively, content stored in the first device 100 or a server may be automatically determined as content to be encrypted, according to state information of the first through third devices 100 through 300.

In operation S1220, the first device 100 encrypts the content by using a public key. For example, the first device 100 may encrypt content m by using an symmetric key s (that is, $AES_s(m)$), and encrypt the symmetric key s by using a public key T (that is, $Enc_T(s)$).

In operation S1230, the first device 100 stores the encrypted content. For example, the first device 100 may store the encrypted content in a security zone such as TrustZone or other hardware-based security architecture.

In operation S1240, the first device 100 transmits the encrypted content to the second device 200. In operation S1250, the first device 100 transmits the encrypted content to the third device 300. For example, the first device 100 may transmit the encrypted content respectively to the second and third devices 200 and 300 via a wireless communication connection such as WiFi, 3G, LTE, Bluetooth, or the like.

In operation S1260, the second device 200 stores the encrypted content. In operation S1270, the third device 300 stores the encrypted content. For example, the second and third devices 200 and 300 may store the encrypted content in a security zone such as TrustZone or other hardware-based security architecture.

According to a modified method of generating a plurality of partial keys by splitting the private key which is described with reference to FIGS. 11 through 12, any of the first through third devices 100 through 300 which are included in the security group 10 may independently encrypt content. On the contrary, only the first device 100 having a private key, from among the first through third devices 100 through 300 included in the security group 10, may decrypt encrypted content, and the second and third devices 200 and 300 may decrypt content, by recovering a private key from respectively stored partial keys that are located within a proximate spacing of each other.

For example, the first user USER1 may be a patient receiving a medical service, and the second and third users USER2 and USER3 may be doctors or hospital officials providing a medical service. Information about medical treatment may be generated or attached by all the first through third users USER1 through USER3. However, whereas the first user USER1 who is a patient may independently access encrypted information, the second and third users USER2 and USER3 may access the encrypted information only when they are located within a proximate spacing of each other.

Figure 13:
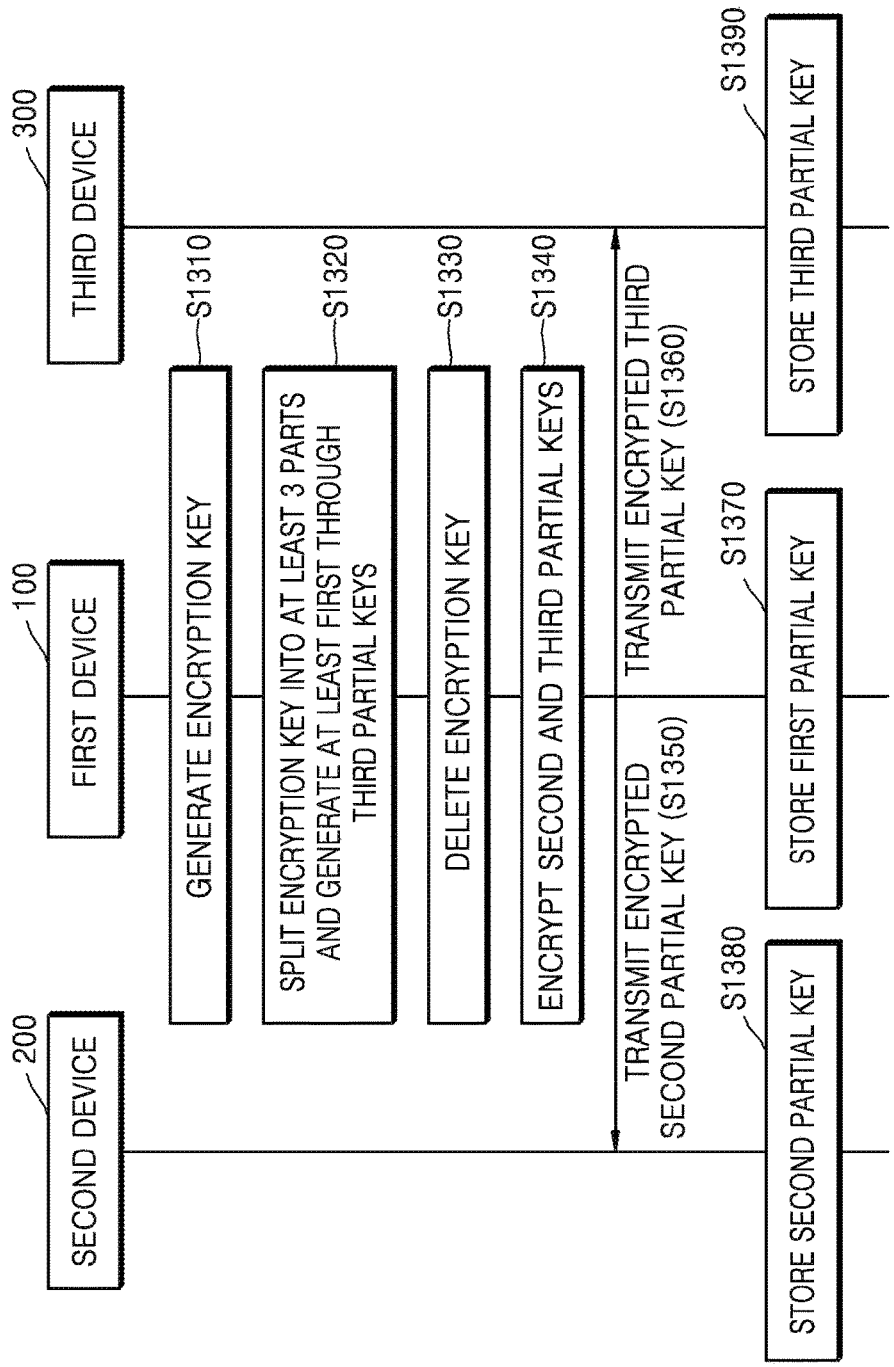
FIG. 13 illustrates a flowchart showing another example S400 of an operation of the security group 1 shown in FIG. 1, according to the generating of an encryption key and a plurality of partial keys and the distributing of the generated plurality of partial keys which are included in the method of encrypting content described with reference to FIG. 3.

FIG. 13 illustrates a flowchart showing another example of an operation of the security group 10 shown in FIG. 1, according to the generating of an encryption key and a plurality of partial keys and the distributing of the generated plurality of partial keys which are included in the method of encrypting content described with reference to FIG. 3.

Referring to FIG. 13, in the current exemplary embodiment, the method of encrypting content includes a splitting encryption method performed by distributing a symmetric key, and includes operations processed by the first through third devices 100 through 300 included in the security group 10 shown in FIG. 1. Accordingly, it will be understood that a description, provided with regard to the security group 10 described with reference to FIG. 1, may also be applied to the method of encrypting content in the current embodiment, even if the description is not repeated.

In operation S1310, the first device 100 generates an encryption key, that is, a symmetric key. For example, the first device 100 may generate an encryption key sk used for encryption. The generated encryption key sk may be also used for decryption.

In operation S1320, the first device 100 splits the encryption key into at least three parts, and thus, generates at least first through third partial keys. For example, the first device 100 may generate at least first through third partial keys sk1 through sk3 by splitting the encryption key sk into at least three parts. In this case, the first device 100 may split the encryption key sk by using a secret sharing scheme such as a Shamir scheme.

In operation S1330, the first device 100 deletes the encryption key.

In operation S1340, the first device 100 encrypts the second and third partial keys. For example, the first device 100 may generate encrypted second and third partial keys sk2 and sk3 by respectively encrypting the second and third partial keys, so as to ensure security in the transmitting. Thus, in the transmitting of the encrypted second and third partial keys, devices that are not included in the security group 10 may not obtain the second and third partial keys.

In operation S1350, the first device 100 transmits the encrypted second partial key to the second device 200. In operation S1360, the first device 100 transmits the encrypted third partial key to the third device 300. For example, the first device 100 may transmit the public key and the encrypted second and third partial keys respectively to the second and third devices 200 and 300 via a wireless communication connection such as WiFi, 3G, LTE, Bluetooth, or the like.

In operation S1370, the first device 100 stores the first partial key sk1. In operation S1380, the second device 200 stores the second partial key sk2. In operation S1390, the third device 300 stores the third partial key sk3.

Since the first through third devices 100 through 300 respectively have the first through third partial keys sk1 through sk3, the first through third users USER1 through USER3 of the first through third devices 100 through 300 may not independently encrypt the content, and may encrypt content only when the first through third devices 100 through 300 are located within a proximate spacing between each other. Additionally, since the first through third devices 100 through 300 use a symmetric encryption/decryption method, the first through third users USER1 through USER3 of the first through third devices 100 through 300 may not independently decrypt the content, and may decrypt content only when the first through third devices 100 through 300 are located within a proximate spacing of each other.

Figure 14:
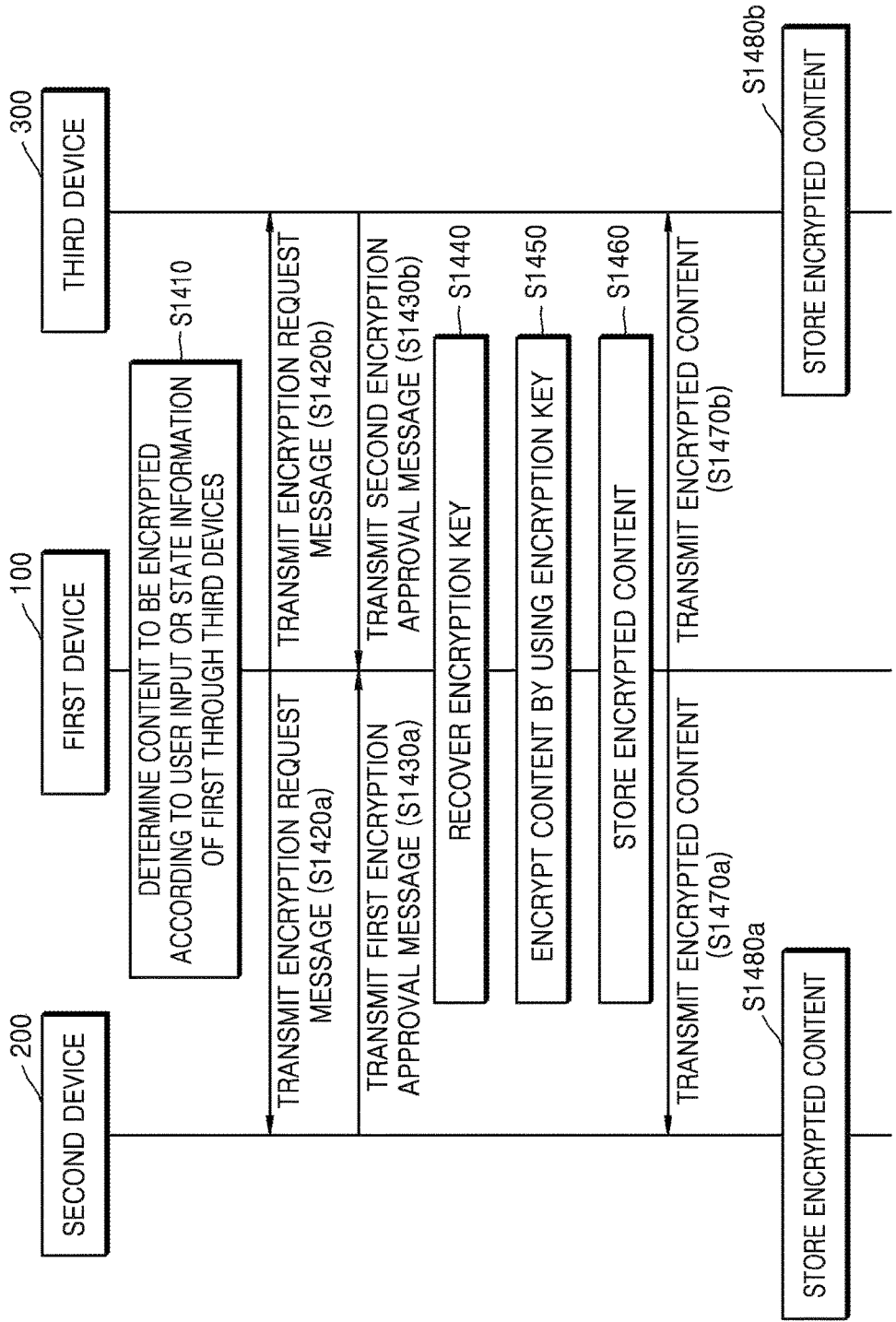
FIG. 14 illustrates a flowchart showing another example of operation of the security group shown in FIG. 1, according to the encrypting and the storing which are included in the method of encrypting content shown in FIG. 3.

FIG. 14 illustrates a flowchart showing another example of operation of the security group 10 shown in FIG. 1, according to the encrypting and the storing which are included in the method of encrypting content shown in FIG. 3.

Referring to FIG. 14, in the current exemplary embodiment, the method of encrypting content may be performed after the method of encrypting content described with reference to FIG. 13 is performed. Additionally, in the current exemplary embodiment, the method of encrypting content include operations that are performed by the first through third devices 100 through 300 included in the security group 10.

In operation S1410, the first device 100 determines content to be encrypted, according to a user input or state information of the first through third devices 100 through 300. In detail, the first user USER1 may manually determine content stored in the first device 100 or a server as content to be encrypted, via a user input. Alternatively, content stored in the first device 100 or a server may be automatically determined as content to be encrypted, according to state information of the first through third devices 100 through 300.

In operation S1420a, the first device 100 transmits an encryption request message to the second device 100. In operation S1420b, the first device 100 transmits an encryption request message to the third device 100.

In operation S1430a, the second device 200 transmits a first encryption approval message to the first device 100. For example, the first encryption approval message may include an encryption value of the second partial key sk2 stored in the second device 200. In operation S1430b, the third device 300 transmits a second encryption approval message to the first device 100. For example, the second encryption approval message may include an encryption value of the third partial key sk3 stored in the third device 300.

In operation S1440, the first device 100 recovers a public key based on the first and second encryption approval messages. For example, the first device 100 may recover the encryption key sk based on the encryption values of the second and third partial keys sk2 and sk3 each included in the first and second encryption approval message, and the first partial key sk1 stored in the first device 100 (that is, sk=sk1+sk2+sk3).

In operation S1450, the first device 100 encrypts content by using the encryption key. For example, the first device 100 may encrypt the content m by using the symmetric key s (that is, $AES_s(m)$), and encrypt the symmetric key s by using the recovered encryption key sk (that is, $Enc_T(s)$).

In operation S1460, the first device 100 stores the encrypted content. For example, the first device 100 may store the encrypted content in a security zone such as TrustZone or other hardware-based security architecture.

In operation S1470a, the first device 100 transmits the encrypted content to the second device 200. In operation S1470b, the first device 100 transmits the encrypted content to the third device 300. For example, the first device 100 may transmit the encrypted content respectively to the second and third devices 200 and 300 via a wireless communication connection such as WiFi, 3G, LTE, Bluetooth, or the like.

In operation S1480a, the second device 200 stores the encrypted content. In operation S1480b, the third device 300 stores the encrypted content. For example, the second and third devices 200 and 300 may store the encrypted content in a security zone such as TrustZone or other hardware-based security architecture.

According to the method of generating a plurality of partial keys by splitting the private key as described with reference to FIGS. 13 and 14, only when devices amounting to a value equal to or greater than a threshold value, from among the first through third devices 100 through 300 included in the security group 10, are located within a proximate spacing of each other, a symmetric key may be recovered based on each of the stored partial keys. Thus, content may be encrypted, and encrypted content may be decrypted.

For example, a first user USER1 may be an employer, and a second user USER2 may be a supervisor. Only when the first and second users USER1 and USER2 are located within a proximate spacing of each other, content, for example, electronic documents or data may be encrypted, and the encrypted content may be decrypted.

Figure 15:
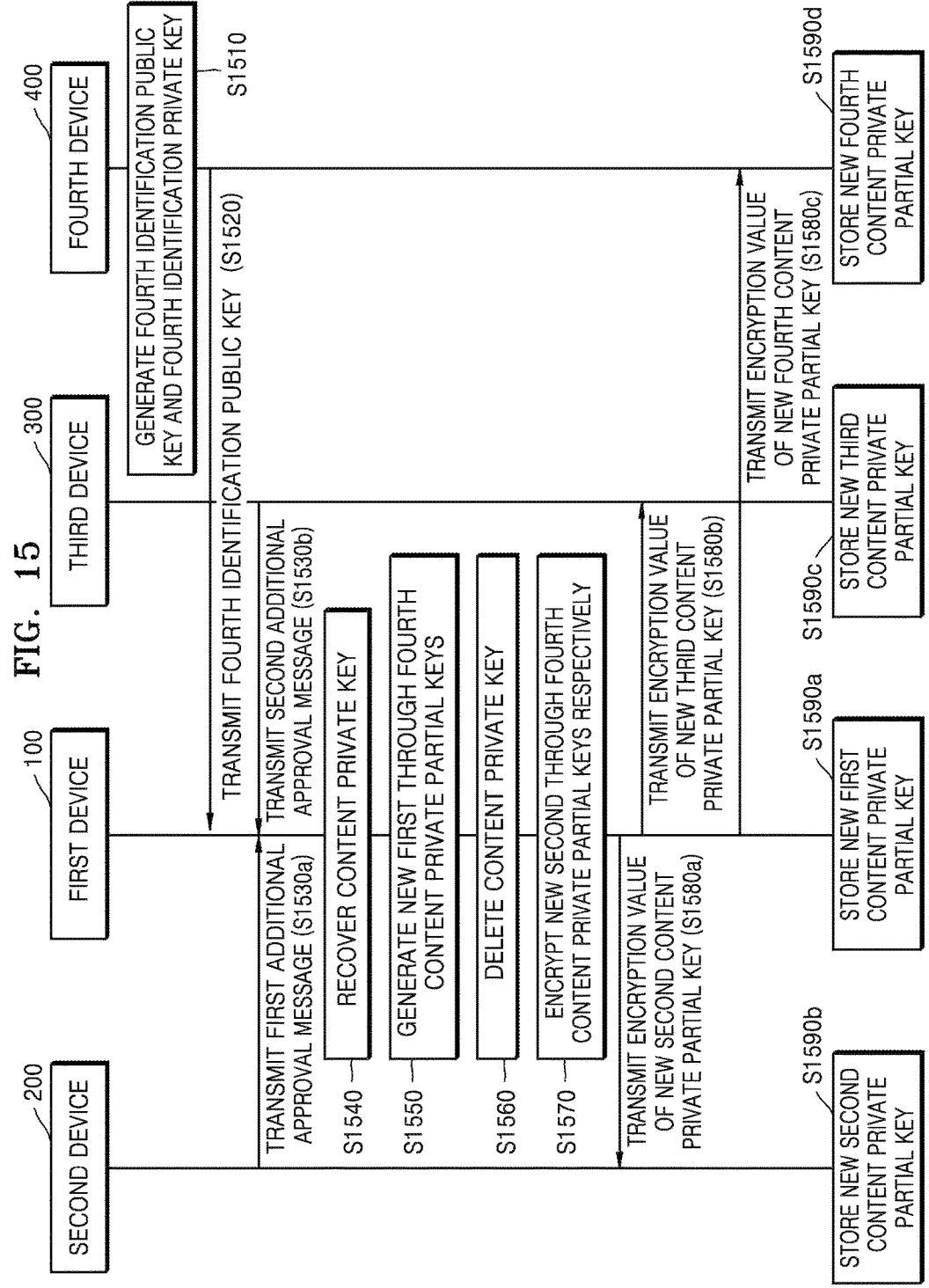
FIG. 15 illustrates a flowchart showing an example of operation of the security group shown in FIG. 1, according to a modified example of the method of encrypting content described with reference to FIG. 3.

FIG. 15 illustrates a flowchart showing an example of operation of the security group 10 shown in FIG. 1, according to a modified example of the method of encrypting content described with reference to FIG. 3.

Referring to FIG. 15, in the current exemplary embodiment, the method of encrypting content includes a method of adding a new member to the security group 10. The method of encrypting content may be performed after the operation of the security group 10 according to the method of encrypting content, described with reference to FIG. 6, is performed. In the current exemplary embodiment, the method of encrypting content includes operations processed by the first through third devices 100 through 300 included in the security group 10 shown in FIG. 1. Accordingly, it will be understood that a description, provided with regard to the security group 10 shown in FIG. 1, may also be applied to the method of encrypting content in the current exemplary embodiment, even if the description is not repeated.

In operation S1510, a fourth device 400 generates a fourth identification public key K4 and a fourth identification private key k4. The fourth device 400 is a device of a fourth user USER4, a new member who is to subscribe to the security group 10. A fourth identification key pair consisting of the fourth identification public key K4 and the fourth identification private key k4 is a combination of keys for identifying a fourth application installed in the fourth device 400. The first through third applications each installed in the first through third devices 100 through 300 may check or identify the fourth application installed in the fourth device 400 via the fourth identification public key K4.

According to an exemplary embodiment, the fourth device 400 may request a phone PKI or other PKI to generate the fourth identification public key K4 and the fourth identification private key k4. According to another exemplary embodiment, the fourth device 400 may request the phone PKI to generate the fourth identification public key K4, the fourth identification private key k4, and a fourth certificate $Certificate_{p4}(K4)$ with respect to the fourth identification public key k4. p4 denotes a key for certification of the fourth device 400, and the fourth certificate $Certificate_{p4}(K4)$ is a document for concatenating an identity of the fourth user USER4 and the public key, that is, the fourth identification public key K4.

In operation S1520, the fourth device 400 transmits the fourth identification public key K4 to the first device 100. The first device 100 may use the transmitted fourth identification public key K4 to encrypt a fourth content private partial key t4. According to another exemplary embodiment, the fourth device 400 may transmit the fourth identification public key K4 and the fourth certificate $Certificate_{p4}(K4)$ to the first device 100.

In operation S1530a, the second device 200 transmits a first additional approval message to the first device 100. For example, the first additional approval message may include an encryption value of the second partial key t2 stored in the second device 200. In detail, the first additional approval message may include a value $Enc_{K1}(t2)$ obtained by encrypting the second partial key t2 by using the first identification public key K1.

In operation S1530b, the third device 300 transmits a second additional approval message to the first device 100. For example, the second additional approval message may include an encryption value of the third partial key t3 stored in the third device 300. In detail, the second additional approval message may include a value $Enc_{K1}(t3)$ obtained by encrypting the third partial key t3 by using the first identification public key K1.

In operation S1540, the first device 100 recovers a content private key by using the first and second additional approval messages. In detail, the first device 100 may recover the second and third partial keys t2 and t3 by decrypting the encryption values $Enc_{K1}(t2)$ and $Enc_{K1}(t3)$ of the second and third partial keys included in the first and second additional approval messages by using the first identification public key K1. Then, the first device 100 may recover the content private key t based on the first through third partial key t1 through t3.

In operation S1550, the first device 100 re-splits the content private key t into at least four parts, and thus, generates new first through fourth content private partial keys t1' through t4' (that is, t=t1'+t2'+t3'+t4' . . . ). The first device 100 may re-split the content private key t by using a secret sharing scheme such as a Shamir scheme.

In operation S1560, the first device 100 deletes the content private key t. Thus, the content private key t may not be known to anyone, and unless devices amounting to a value equal to or greater than a threshold value, from among the first through fourth devices 100 through 400, are located within a proximate spacing of each other, any one device may not independently decrypt the encrypted content. According to another exemplary embodiment, the first device 100 may store the content private key t in a security zone such as TrustZone or other hardware-based security architecture.

In operation S1570, the first device 100 encrypts the new second through fourth content private partial keys t2' through t4' respectively by using the second through fourth identification public keys K2 through K4. Thus, a new second content private partial key encryption value $Enc_{K2}(t2')$, a new third content private partial key encryption value $Enc_{K3}(t3')$, and a new fourth content private partial key encryption value $Enc_{K4}(t4')$ are generated.

Since the new second content private partial key encryption value $Enc_{K2}(t2')$ may be decrypted by using the second identification private key k2 corresponding to the second identification public key K2, the new second content private partial key encryption value $Enc_{K2}(t2')$ may be decrypted only by the second device 200 having the second identification private key k2. Additionally, since the new third content private partial key encryption value $Enc_{K3}(t3')$ may be decrypted by using the third identification private key k3 corresponding to the third identification public key K3, the new third content private partial key encryption value $Enc_{K3}(t3')$ may be decrypted by the third device 300 having the third identification private key k3. Additionally, since the new fourth content private partial key encryption value $Enc_{K4}(t4')$ may be decrypted by using the fourth identification private key k4 corresponding to the fourth identification public key K4, the new fourth content private partial key encryption value $Enc_{K4}(t4')$ may be decrypted by the fourth device 400 having the fourth identification private key k4.

In operation S1580a, the first device 100 transmits the new second content private partial key encryption value $Enc_{K2}(t2')$ to the second device 200. In operation S1580b, the first device 100 transmits the new third content private partial key encryption value $Enc_{K3}(t3')$ to the third device 300. In operation S1580c, the first device 100 transmits the new fourth content private partial key encryption value $Enc_{K4}(t4')$ to the fourth device 400.

In operation S1590a, the first device 100 stores the new first content private partial key t1'. In operation S1590b, the second device 200 decrypts the new second content private partial key encryption value $Enc_{K2}(t2')$ by using the second identification private key k2, and thus, extracts and stores the second new content private partial key t2'. In operation S1590c, the third device 300 decrypts the new third content private partial key encryption value $Enc_{K3}(t3')$ by using the third identification private key k3, and thus, extracts and stores the new third content private partial key t3'. In operation S1590d, the fourth device 400 decrypts the new fourth content private partial key encryption value $Enc_{K4}(t4')$ by using the fourth identification private key k4, and thus, extracts and stores the new fourth content private partial key t4'. According to an exemplary embodiment, the first through fourth devices 100 through 400 may respectively store the new first through fourth content private keys t1' through t4' in a security zone such as TrustZone or other hardware-based security architecture.

As described above, the fourth device 400 may be added to the security group 10 by performing operations S1510 through S1590d. According to another exemplary embodiment, even though a new member is added to the security group 10, if a threshold value necessary for decryption is identical to the threshold value needed before the new member is added, a fourth content private partial key may be generated without having to change the first through third content private partial keys t1 through t3. Thus, transactions of the fourth device 100 with the second and third devices may not occur.

Figure 16:
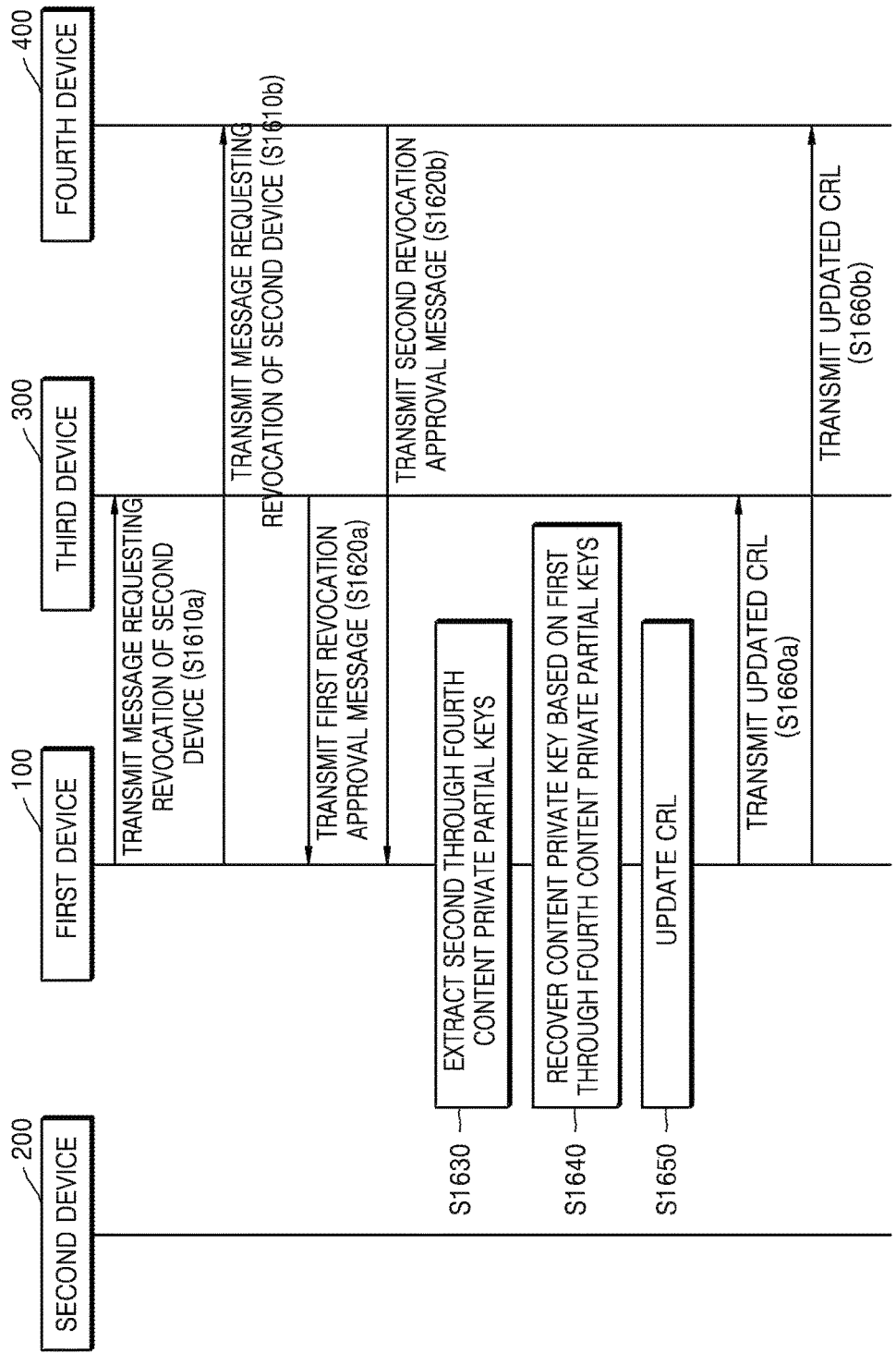
FIG. 16 illustrates a flowchart showing an example of operation of the security group shown in FIG. 1, according to a modified example of the method of encrypting content described with reference to FIG. 3.

FIG. 16 illustrates a flowchart showing an example of operation of the security group 10 shown in FIG. 1, according to a modified example of the method of encrypting content described with reference to FIG. 3.

Referring to FIG. 16, in the current exemplary embodiment, the method of encrypting content includes a method of revoking a member included in the security group 10. This method may be performed after the operation of the security group 10 according to the method of encrypting content, described with reference to FIG. 6, is performed. In the current exemplary embodiment, the method of encrypting content may be a method of revoking the second device 200, from among the first through third groups 100 through 300 included in the security group 10 shown in FIG. 1, and may include operations processed in time series by the first through third devices 100 through 300 included in the security group 10 described with reference to in FIG. 1, and the fourth device 400 newly added to the security group 10. Accordingly, it will be understood that a description, provided with regard to the security group 10 described with reference to FIGS. 1 and 15, may also be applied to the method of encrypting content in the current exemplary embodiment, even if the description is not repeated.

In operation S1610a, the first device 100 transmits a message requesting revocation of the second device 200 to the third device 300. The message requesting revocation of the second device 200 may include the first identification public key K1, a group ID GroupID, and an electronic signature E-Sign$_{K1}$(K1|K3|K2|GroupID) with respect to the first identification public key K1, the third identification public key K3, the second identification pubic key K2, and the group ID GroupID.

In operation S1610b, the first device 100 transmits a message requesting revocation of the second device 200 to the fourth device 400. The message requesting revocation of the second device 200 may include the first identification public key K1, the group ID GroupID, and an electronic signature E-Sign$_{K1}$(K1|K4|K2|GroupID) with respect to the first identification public key K1, the fourth identification public key K4, the second identification pubic key K2, and the group ID GroupID.

As such, the first device 100 may transmit the message requesting revocation of the second device 200, to members of the security group 10 other than the second device 200 that is to be revoked.

In operation S1620a, the third device 300 transmits a first revocation approval message to the first device 100. The first revocation approval message may include a value $Enc_{K1}(t3)$ obtained by encrypting the third content private partial key t3 by using the first identification public key K1, and an electronic signature with respect to the value $Enc_{K1}(t3)$. In operation S1620b, the fourth device 400 transmits a second revocation approval message to the first device 100. For example, the second revocation approval message may include a value $Enc_{K1}(t4)$ obtained by encrypting the fourth content private partial key t4 by using the first identification public key K1, and an electronic signature with respect to the value $Enc_{K1}(t4)$.

In operation S1630, the first device 100 extracts the second through fourth content private partial keys t2 through t4. In detail, the first device 100 may extract the second through fourth content private keys t2 through t4 respectively by decrypting the values $Enc_{K1}(t2)$, $Enc_{K1}(t3)$, and $Enc_{K1}(t4)$ by using the first identification private key k1, wherein the values $Enc_{K1}(t2)$, $Enc_{K1}(t3)$, and $Enc_{K1}(t4)$ are obtained by encrypting the second through fourth content private partial keys t2 through t4.

In operation S1640, the first device 100 recovers the content private key t from the first content private partial key t1 and the second through fourth content private partial keys t2 through t4.

In operation S1650, the first device 100 updates a certificate revocation list (CRL). According to another exemplary embodiment, the first device 100 may further generate an electronic signature $E\text{-}Sign_t(CRL)$ for the CRL.

In operation S1660a, the first device 100 transmits the updated CRL to the third device 300. According to another exemplary embodiment, the first device 100 may transmit the updated CRL and the electronic signature $E\text{-}Sign_t(CRL)$ for the CRL to the third device 300. In operation S1660b, the first device 100 transmits the updated CRL to the fourth device 400. According to another exemplary embodiment, the first device 100 may transmit the updated CRL and the electronic signature $E\text{-}Sign_t(CRL)$ for the CRL to the fourth device 400.

Figure 17:
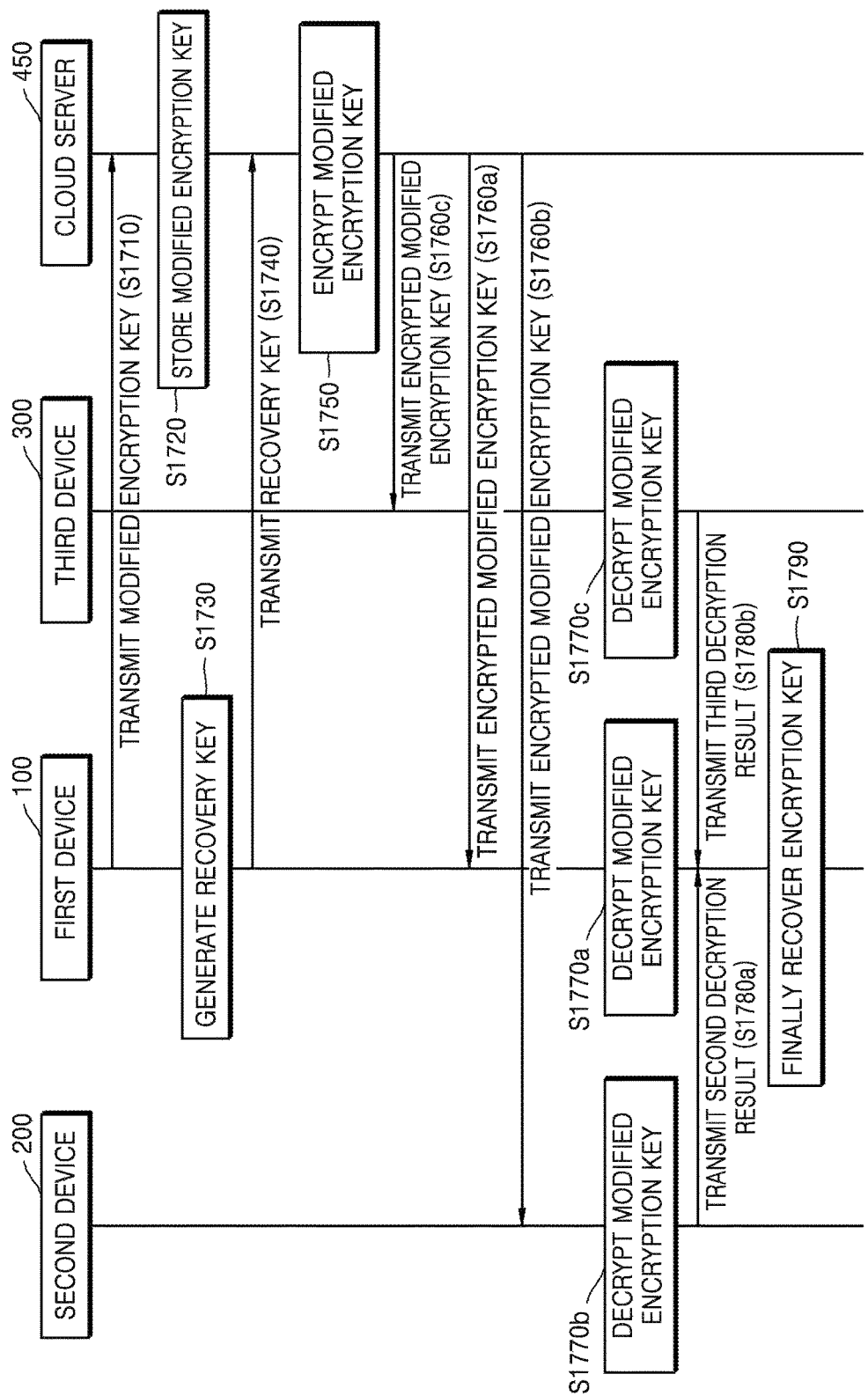
FIG. 17 illustrates a flowchart showing an example of operation of the security group shown in FIG. 1, according to a modified example of the method of encrypting content described with reference to FIG. 3.

FIG. 17 illustrates a flowchart showing an example of operation of the security group 10 shown in FIG. 1, according to a modified example of the method of encrypting content described with reference to FIG. 3.

Referring to FIG. 17, in the current exemplary embodiment, the method of encrypting content includes a method of recovering a key by using a cloud service, if one of a plurality of devices included in the security group 10 is lost or otherwise leaves the security group 10. This method of encrypting content may be performed after the operation of the security group 10 according to the method of encrypting content, described with reference to FIG. 6, is performed. The method of encrypting content includes operations processed by the first through third devices 100 through 300 included in the security group 10 shown in FIG. 1. Accordingly, it will be understood that a description, provided with regard to the security group 10 described with reference to FIG. 1, may also be applied to the method of encrypting content in the current embodiment, even if the description is not repeated.

In operation S1710, the first device 100 transmits a modified encryption key ti to a cloud server 450. In operation S1720, the cloud server 450 stores the modified encryption key ti. For example, the modified encryption key ti may have a value corresponding to the content private key t and, in detail, a content private key $Enc_{K1}(Enc_{K2}(Enc_{K3}(t)))$ encrypted by using the first through third identification public keys K1 through K3.

In operation S1730, the first device 100 generates a recovery key v. In operation S1740, the first device 100 transmits the recovery key v to the cloud server 450. In operation S1750, the cloud server 450 encrypts the modified encryption key ti by using the recovery key v. For example, the encrypted modified encryption key may be $Enc_v(Enc_{K1}(Enc_{K2}(Enc_{K3}(t))))$.

In operation S1760a, the cloud server 450 transmits the encrypted modified encryption key $Enc_v(Enc_{K1}(Enc_{K2}(Enc_{K3}(t))))$ to the first device 100. In operation S1760b, the cloud server 450 transmits the encrypted modified encryption key $Enc_v(Enc_{K1}(Enc_{K2}(Enc_{K3}(t))))$ to the second device 200. In operation S1760c, the cloud server 450 transmits the encrypted modified encryption key $Enc_v(Enc_{K1}(Enc_{K2}(Enc_{K3}(t))))$ to the third device 300.

In operation S1770a, the first device 100 obtains a first decryption result $Dec_{k1}(Enc_v(Enc_{K1}(Enc_{K2}(Enc_{K3}(t)))))$, by decrypting the encrypted modified encryption key $Enc_v(Enc_{K1}(Enc_{K2}(Enc_{K3}(t))))$ by using the first identification private key k1. In operation S1770b, the second device 200 obtains a second decryption result $Dec_{k2}(Enc_v(Enc_{K1}(Enc_{K2}(Enc_{K3}(t)))))$, by decrypting the encrypted modified encryption key $Enc_v(Enc_{K1}(Enc_{K2}(Enc_{K3}(t))))$ by using the second identification private key k2. In operation S1770c, the third device 300 obtains a third decryption result $Dec_{k3}(Enc_v(Enc_{K1}(Enc_{K2}(Enc_{K3}(t)))))$, by decrypting the encrypted modified encryption key $Enc_v(Enc_{K1}(Enc_{K2}(Enc_{K3}(t))))$ by using the third identification private key k3.

In operation S1780a, the second device 200 transmits the second decryption result $Dec_{k2}(Enc_v(Enc_{K1}(Enc_{K2}(Enc_{K3}(t)))))$ to the first device 100. In operation S1780b, the third device 300 transmits the third decryption result $Dec_{k3}(Enc_v(Enc_{K1}(Enc_{K2}(Enc_{K3}(t)))))$ to the first device 100. As such, each device sequentially encrypts the encrypted modified encryption key $Enc_v(Enc_{K1}(Enc_{K2}(Enc_{K3}(t))))$ by using an identification private key corresponding thereto. As a result, the first device 100 may obtain $Enc_v(t)$.

In operation S1790, the first device 100 finally recovers an encryption key by using the recovery key v. For example, the first device 100 may recover the content private key t by decrypting $Enc_v(t)$ by using the recovery key v (that is, $Dec_v(Enc_v(t))=t$).

FIG. 18 illustrates a flowchart showing an example of operation of the security group 10 shown in FIG. 1, according to a modified example of the method of encrypting content described with reference to FIG. 3.

Referring to FIG. 18, in the current exemplary embodiment, the method of encrypting content includes a method of adding a new device, owned by one of a plurality of users of a plurality of devices included in the security group 10. This method may be performed after the operation of the security group 10 according to the method of encrypting content, described with reference to FIG. 6, is performed. For example, in the current exemplary embodiment, the method of encrypting content may include a method of adding a first additional device 150 to the security group 10, wherein the first additional device 150 is owned by the first user USER1 of the first device 100 included in the security group 10 shown in FIG. 1. The method of encrypting content includes operations processed by the first device 100 and the first additional device 150. Accordingly, it will be understood that a description with reference to FIGS. 1 and 6 may also be applied to the method of encrypting content in the current embodiment, even if the description is not provided here again In operation S1810, a personal identification number (PIN) is input to the first device 100. In operation S1820, the PIN is input to the first additional device 150. The PINs respectively input to the first device 100 and the first additional device 150 may be identical to each other.

In operation S1830, the first device 100 transmits the first identification public key K1, the first identification private key k1, the first content private partial key t1, and the group {K1, K2, K3} of the identification public keys to the first additional device 150. According to another exemplary embodiment, the first device 100 may encrypt the first identification private key k1 and the first content private partial key t1, and transmit the encrypted identification private key k1 and the encrypted first content private partial key t1 to the first additional device 150.

FIG. 19 illustrates a flowchart of a method of decrypting content, according to an exemplary embodiment.

Referring to FIG. 19, in the current exemplary embodiment, the method of decrypting content is a method of decrypting content shared in the security group 10 that includes a plurality of devices, and includes operations performed by one of the plurality of devices, as described below. For example, in the current embodiment, the method of decrypting content may include operations processed in time series by the first device 100 included in the security group 10 shown in FIG. 1. Additionally, in the current embodiment, the method of decrypting content may correspond to the method of encrypting content described with reference to FIG. 3.

In operation S1910, it is determined whether devices amounting to a value equal to or greater than a threshold value, from among the plurality of devices, are located within a proximate spacing of each other so that the devices may recognize each other. In detail, the first device 100 may determine whether devices amounting to a value equal to or greater than a threshold value are located within a proximate spacing from each other. The threshold value may be, for example, two devices.

If the security group 10 includes N devices wherein N is an integer equal to or greater than 2, the threshold value may be an integer equal to or greater than 2 and equal to or less than N. Accordingly, for example, if N is 2, the threshold value may be 2. If N is greater than 2, the threshold value may be equal to or greater than 2 and equal to or less than N.

In operation S1920, a decryption key is recovered from a plurality of partial keys distributed to the devices located within a proximate spacing between each other. According to an exemplary embodiment, in the method of decrypting content, content may be decrypted according to an asymmetric decryption method. The plurality of partial keys may correspond to a plurality of private partial keys, and a decryption key may be a private key. According to another exemplary embodiment, in the method of decrypting content, content may be decrypted according to an asymmetric decryption method. The plurality of partial keys may correspond to a plurality of private partial keys, and a decryption key may be an encryption key.

In operation S1930, the encrypted content is decrypted by using the recovered decryption key. In detail, the first through third devices 100 through 300 may decrypt content stored in at least one of the first through third devices 100 through 300 or in a server, by using the recovered encryption key. For example, in regard to the asymmetric decryption method, the first through third devices 100 through 300 may decrypt content by using the recovered private key. As another example, in regard to a symmetric decryption method, the first through third devices 100 through 300 may decrypt content by using the encryption key that is a symmetric key.

Figure 20:
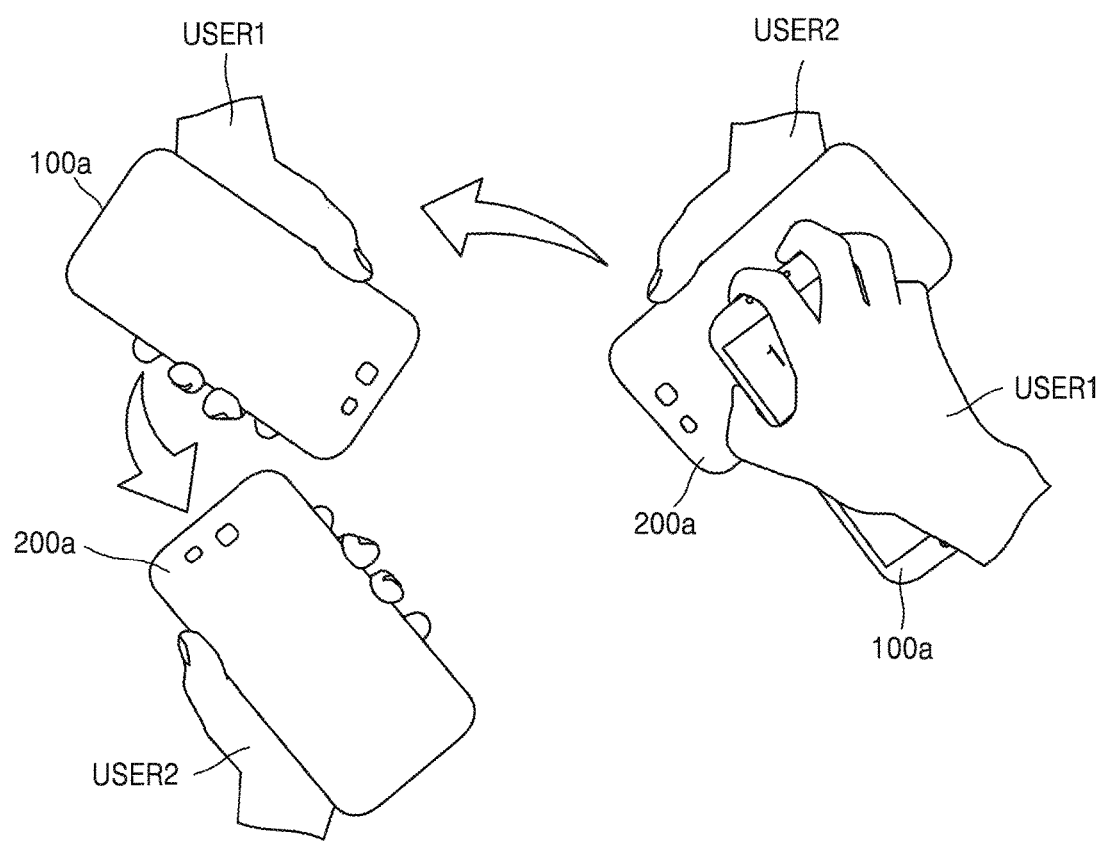
FIG. 20 illustrates an exemplary embodiment of determining whether devices are located within a proximate spacing from each other, which is included in the method of decrypting content described with reference to FIG. 19.

FIG. 20 illustrates an exemplary embodiment of determining whether devices are located within a proximate spacing of each other, which is included in the method of decrypting content described with reference to FIG. 19.

Referring to FIG. 20, the first user USER1 may touch or access a second device 200a of the second user USER2 with a first device 100a. Here, the second device 200a may be referred to as a target device. Thus, it may be detected whether the first and second devices 100a and 200a are located within a proximate spacing of each other to recognize each other, and the first and second devices 100a and 200a may be connected to each other. FIG. 20 shows only the first and second devices 100a and 200a. However, it may be detected whether the first through third devices 100a through 300a are located within a proximate spacing from each other by touching or accessing each other so that the devices recognize each other. The first through third devices 100a through 300a may be connected to each other.

Additionally, the first user USER1 may transmit an allocated second partial key or an encrypted partial key to the second device 200a of the second user USER2, by touching or accessing the second device 200a with the first device 100a. Likewise, the first user USER1 may receive the second partial key or the encrypted partial key from the second device 200a of the second user USER2, by touching or accessing the second device 200a with the first device 100a.

Figure 21:
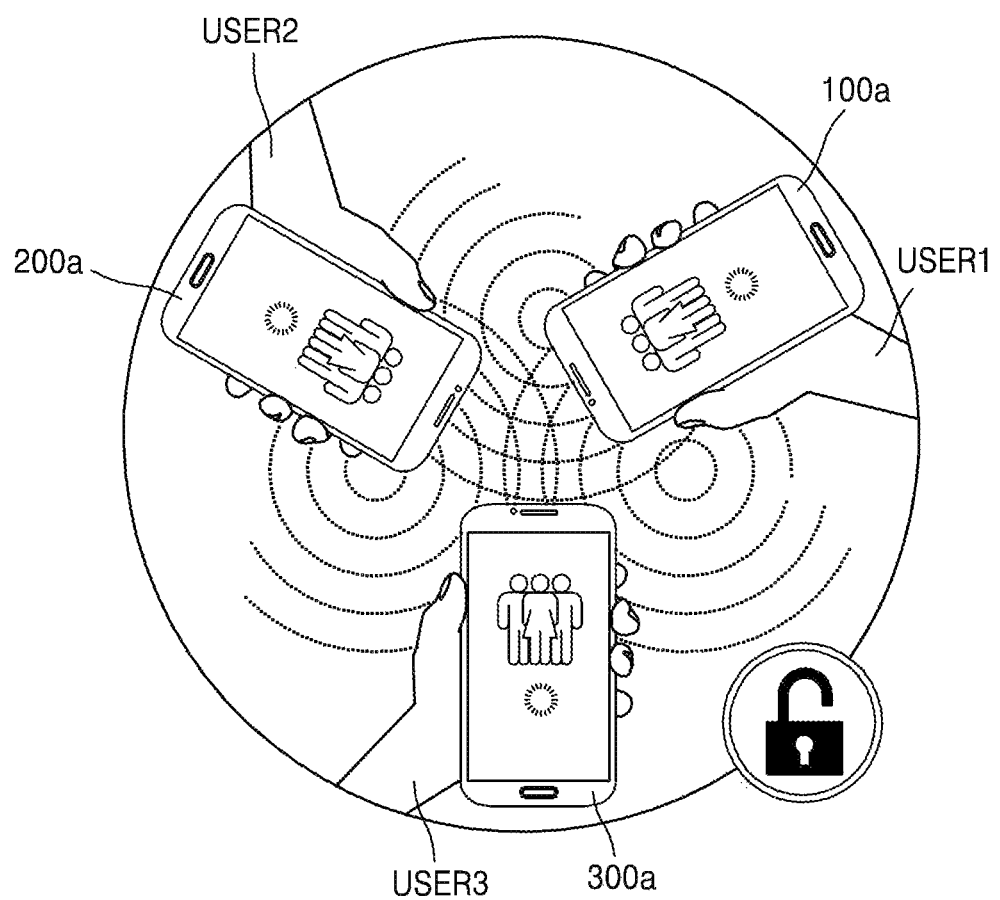
FIG. 21 illustrates another exemplary embodiment of determining whether devices are located within a proximate spacing from each other, which is included in the method of decrypting content described with reference to FIG. 19.

FIG. 21 illustrates another exemplary embodiment of determining whether devices are located within a proximate spacing of each other, which is included in the method of decrypting content described with reference to FIG. 19.

Referring to FIG. 21, if it is determined that the first through third devices 100a through 300a are located within a proximate spacing of each other, an operation of decrypting encrypted content may be performed. According to an exemplary embodiment, it may be detected whether the first through third devices 100a through 300a are located within a proximate spacing of each other, via one or more sensors, such as a touch sensor and a proximate sensor. According to another exemplary embodiment, it may be detected whether the first through third devices 100a through 300a are located within a proximate spacing of each other, via a short-range wireless communication module that includes at least one of a near field communication (NFC) module, a Bluetooth module, a WiFi module, and a ZigBee module.

FIG. 21 shows a case when the first through third devices 100a through 300a are all located within a proximate spacing of each other. However, according to another exemplary embodiment, an operation of decrypting encrypted content may be performed even if two devices from among the first through third devices 100a through 300a are located within a proximate spacing of each other.

Figure 22:
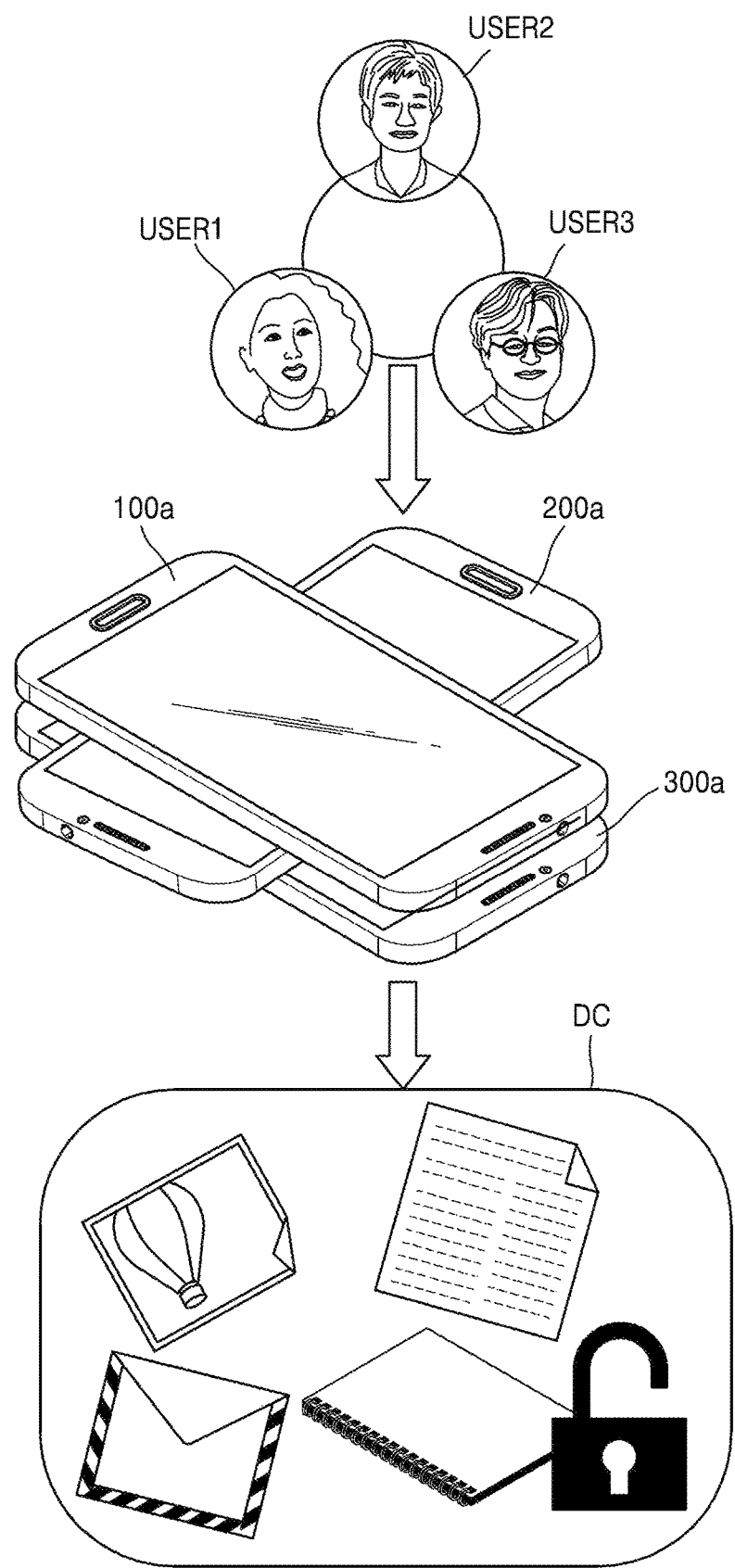
FIG. 22 illustrates an exemplary embodiment of the method of decrypting content described with reference to FIG. 19.

FIG. 22 illustrates an exemplary embodiment of the method of decrypting content described with reference to FIG. 19.

Referring to FIG. 22, the first through third users USER1 through USER3 constitutes the security group 10, and the first through third devices 100a through 300a of the first through third users USER1 through USER3 respectively store the first through third partial keys. Accordingly, the first through third users USER1 through USER3 may not decrypt encrypted content, stored in at least one of the first through third devices 100a through 300a, independently from each other.

However, if the first through third devices 100a through 300a of the first through third users USER1 through USER3 are located within a proximate spacing of each other, the encrypted content may be decrypted, and the first through third users USER1 through USER3 may share decrypted content DC. According to another exemplary embodiment, if two devices from among the first through third devices 100a through 300a of the first through third users USER1 through USER3 are located within a proximate spacing of each other, the encrypted content may be decrypted, and two users who are located within a proximate spacing from each other, from among the first through third users USER1 through USER3, may share the decrypted content DC.

Figure 23:
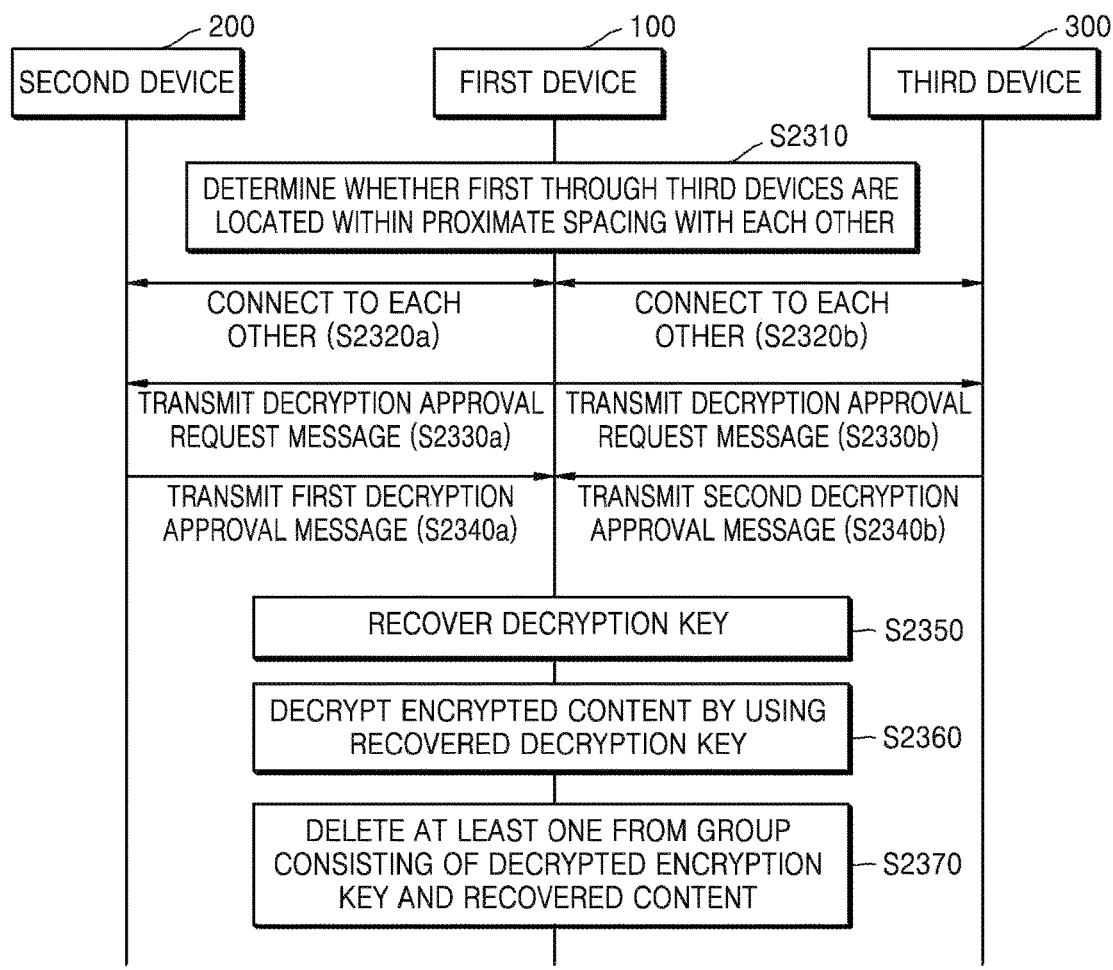
FIG. 23 illustrates a flowchart showing an example of an operation of the security group shown in FIG. 1, according to the method of decrypting content described with reference to FIG. 19.

FIG. 23 illustrates a flowchart showing an example of an operation of the security group 10, shown in FIG. 1, according to the method of decrypting content described with reference to FIG. 19.

Referring to FIG. 23, in the current exemplary embodiment, the method of decrypting content includes operations processed by the first through third devices 100 through 300 included in the security group 10 shown in FIG. 1. Accordingly, it will be understood that a description, provided with regard to the security group 10 described with reference to FIG. 1, may also be applied to the method of decrypting content in the current exemplary embodiment, even if the description is not repeated.

In operation S2310, the first device 100 determines whether the first through third devices 100 through 300 are located within a proximate spacing from each other.

In operation S2320a, the first and second devices 100 and 200 are connected to each other. In operation S2320b, the first and third devices 100 and 300 are connected to each other. Accordingly, the second and third devices 200 and 300 are connected to each other.

In operation S2330a, the first device 100 transmits a decryption approval request message to the second device 200. In operation S2330b, the first device 100 transmits a decryption approval request message to the third device 300.

In operation S2340a, the second device 200 transmits a first decryption approval message to the first device 100. For example, the first decryption approval message may include an encryption value $Enc_{K1}(t2)$ of the second partial key t2 stored in the second device 200. In operation S2340b, the third device 300 transmits a second decryption approval message to the first device 100. For example, the second decryption approval message may include an encryption value $Enc_{K1}(t3)$ of the third partial key t3 stored in the third device 300.

In operation S2350, the first device 100 recovers a decryption key based on the first and second decryption approval messages. For example, the first device 100 may obtain second and third partial keys t2 and t3 by decrypting the encryption values $Enc_{K1}(t2)$ and $Enc_{K1}(t3)$ of the second and third partial keys t2 and t3 respectively included in the first and second decryption approval messages, by using a first identification private key k1. Then, the first device 100 may recover a private key t based on the second and third partial keys t2 and t3 and a first partial key t1 stored in the first device 100 (that is, t=t1+t2+t3).

In operation S2360, the first device 100 decrypts encrypted content by using the recovered decryption key. For example, the first device 100 may decrypt a symmetric key s by using the recovered private key t (that is, $Dec_t(Enc_T(s))=s$), and decrypt encrypted content by using the decrypted symmetric key s (that is, $AES_s(m)=m$).

In operation S2370, the first device 100 deletes the recovered encryption key and/or the recovered content. For example, the first device 100 may delete the recovered encryption key t and/or the recovered content m.

Figure 24:
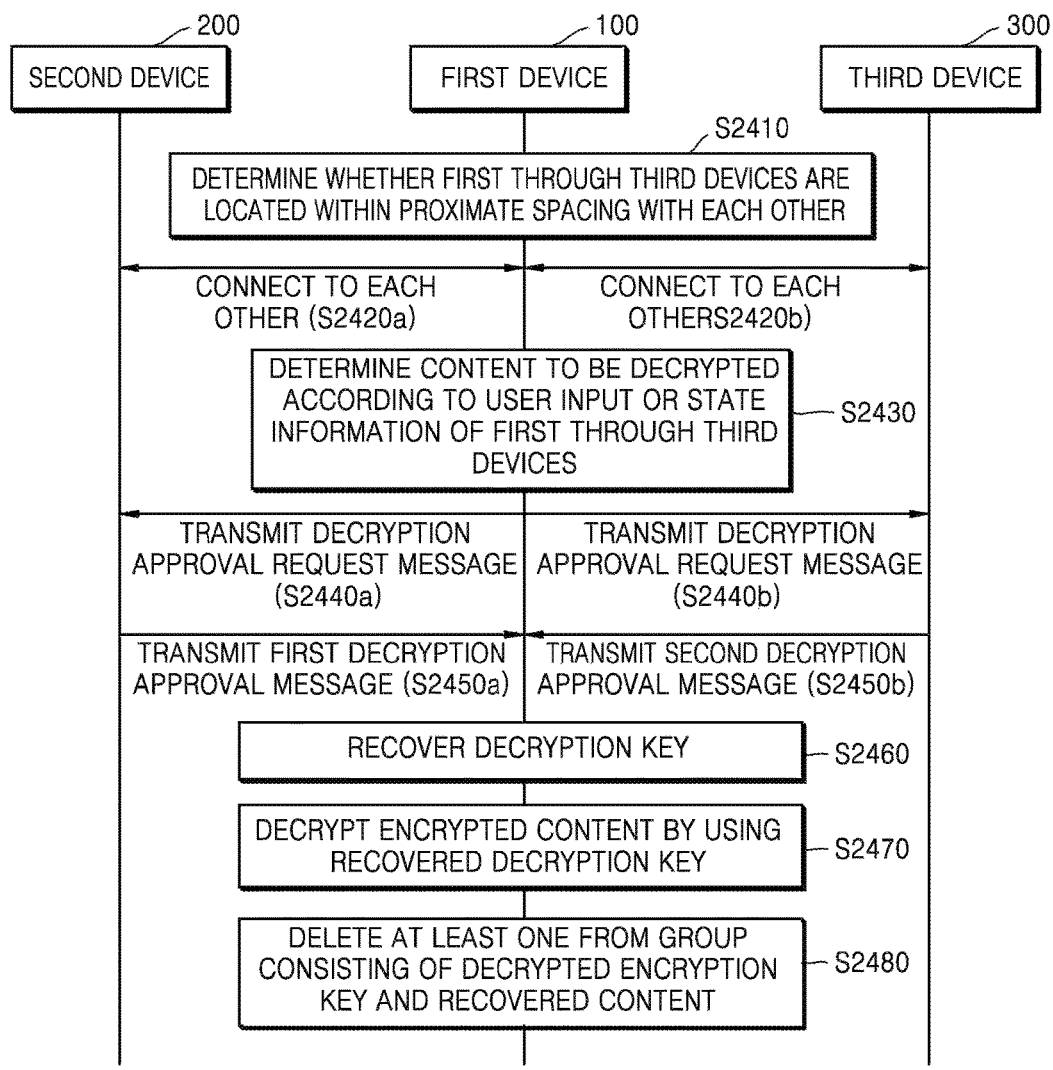
FIG. 24 illustrates a flowchart showing another example of an operation of the security group shown in FIG. 1, according to the method of decrypting content described with reference to FIG. 19.

FIG. 24 illustrates a flowchart showing another example of an operation of the security group 10, shown in FIG. 1, according to the method of decrypting content described with reference to FIG. 19.

Referring to FIG. 24, in the current exemplary embodiment, the method of encrypting content includes operations processed by the first through third devices 100 through 300 included in the security group 10 shown in FIG. 1. Accordingly, it will be understood that a description, provided with regard to the security group 10 described with reference to FIG. 1, may also be applied to the method of decrypting content in the current exemplary embodiment, even if the description is not repeated.

In operation S2410, the first device 100 determines whether the first through third devices 100 through 300 are located within a proximate spacing of each other.

In operation S2420a, the first and second devices 100 and 200 are connected to each other. In operation S2420b, the first and third devices 100 and 300 are connected to each other. Accordingly, the second and third devices 200 and 300 are connected to each other.

In operation S2430, the first device 100 may determine content to be decrypted, according to a user input or state information of the first through third devices 100 through 300. In detail, the first user USER1 may manually determine encrypted content stored in the first device 100 or a server as content to be decrypted, via a user input. Alternatively, encrypted content stored in the first device 100 or a server may be automatically determined as content to be decrypted, according to state information of the first through third devices 100 through 300.

In operation S2440a, the first device 100 transmits a decryption request message to the second device 200. In operation S2440b, the first device 100 transmits an decryption request message to the third device 300.

In operation S2450a, the second device 200 transmits a first decryption approval message to the first device 100. For example, the first decryption approval message may include an encryption value $Enc_{K1}(t2)$ of a second partial key t2 stored in the second device 200. In operation S2450b, the third device 300 transmits a second decryption approval message to the first device 100. For example, the second decryption approval message may include an encryption value $Enc_{K1}(t3)$ of the third partial key t3 stored in the third device 300.

In operation S2460, the first device 100 recovers a decryption key based on the first and second decryption approval messages. For example, the first device 100 may obtain the second and third partial keys t2 and t3, by decrypting the encryption values $Enc_{K1}(t2)$ and $Enc_{K1}(t3)$ of the second and third partial keys t2 and t3 respectively included in the first and second decryption approval messages by using a first identification private key k1. Then, the first device 100 may recover a private key t based on the second and third partial keys t2 and t3 and a first partial key t1 stored in the first device 100 (that is, t=t1+t2+t3).

In operation S2470, the first device 100 decrypts encrypted content by using the recovered decryption key. For example, the first device 100 may decrypt a symmetric key s by using the recovered private key t (that is, $Dec_t$ ($Enc_T(s))=s$), and decrypt encrypted content by using the decrypted symmetric key s (that is, $AES_s(m)=m$).

In operation S2380, the first device 100 deletes at the recovered encryption key and/or the recovered content. For example, the first device 100 may delete the recovered encryption key t and/or the recovered content m.

Figure 25:
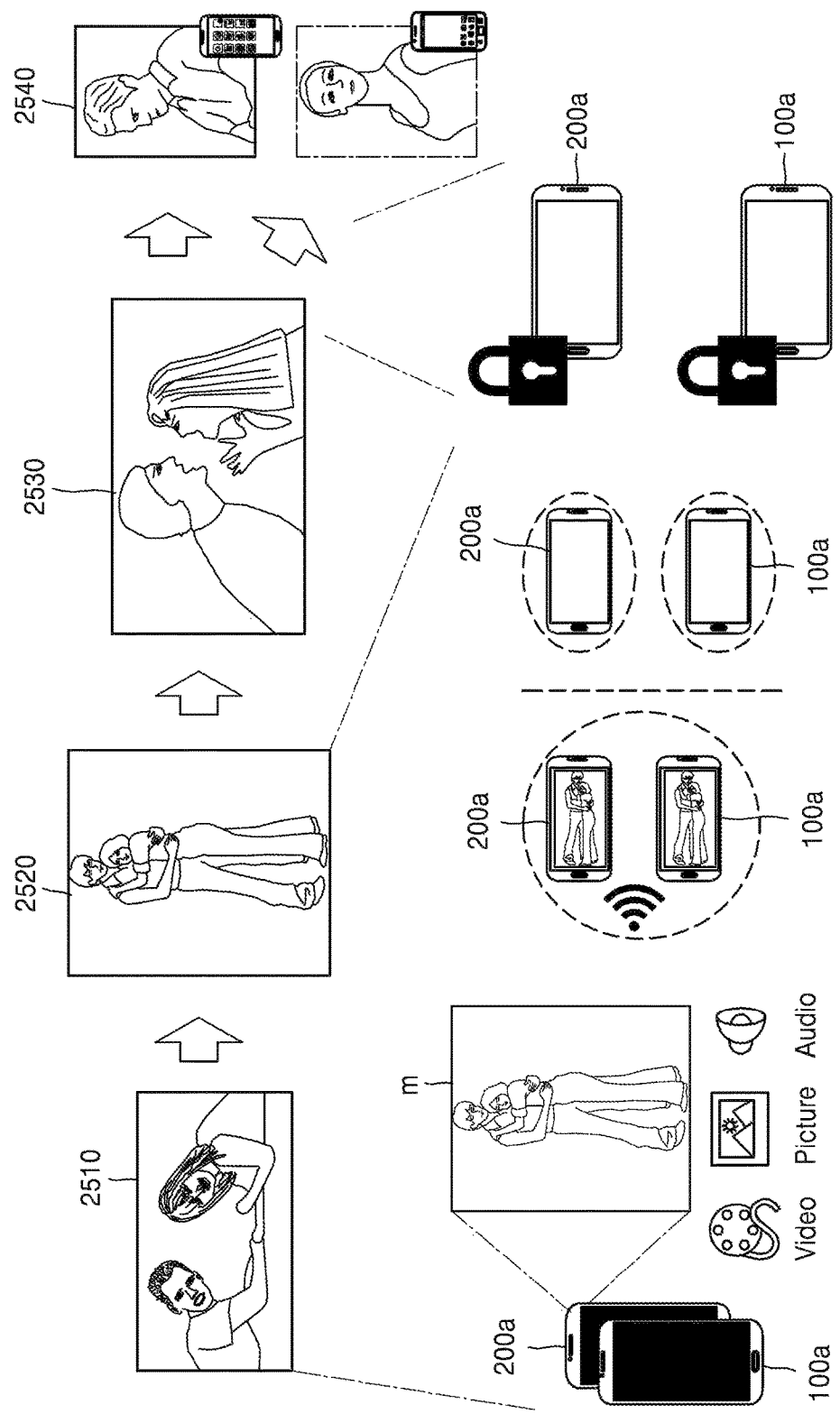
FIG. 25 illustrates an application example of the method of encrypting content described with reference to FIG. 3, and the method of decrypting content described with reference to FIG. 19.

FIG. 25 illustrates an application example of the method of encrypting content described with reference to FIG. 3, and the method of decrypting content described with reference to FIG. 19.

Referring to FIG. 25, in a first operation in an image 2510, a first user USER1 and a second user USER2 may be involved in an intimate relationship. In the first operation in the image 2510, at least one of the first device 100a of the first user USER1 and the second device 200a of the second user USER2 may generate or initialize a security group 10a and, accordingly, the first device 100a of the first user USER1 and the second device 200a of the second user USER2 may be set as the security group 10a.

In a second operation in an image 2520, the first user USER1 and the second USER2 may take a photograph of themselves together, and share the photograph that is taken. The photograph may be encrypted and stored in at least one of the first device 100a of the first user USER1 and the second device 200a of the second user USER2. If the first user USER1 and the second user USER2 are located in the same place together, the first and second device 100a and 100b may be, for example, connected to each other via NFC. Accordingly, the first and second devices 100a and 200a may decrypt and share an encrypted photograph. If the first user USER1 and the second USER2 are not together, the first device 100a and the second device 200a are not connected to each other, and thus, a photograph encrypted and stored in at least one of the first and second devices 100a and 200a may not be shared.

In a third operation in an image 2530, trouble may develop in the relationship between the first user USER1 and the second user USER2. The first user USER1 and the second user USER2 may not access a photograph encrypted and stored in at least one of the first and second devices 100a and 200a, and the photograph encrypted and stored in at least one of the first and second devices 100a and 200a is in a locked state.

In a fourth operation in an image 2540, the first user USER1 and the second user USER2 may terminate their relationship and separate from each other. Since the first user USER1 and the second user USER2 may not meet each other again, a connection of the first device 100a to the second device 200a may not be resumed. Thus, the photograph encrypted and stored in at least one of the first and second devices 100a and 200a cannot be exposed to the outside.

Figure 26:
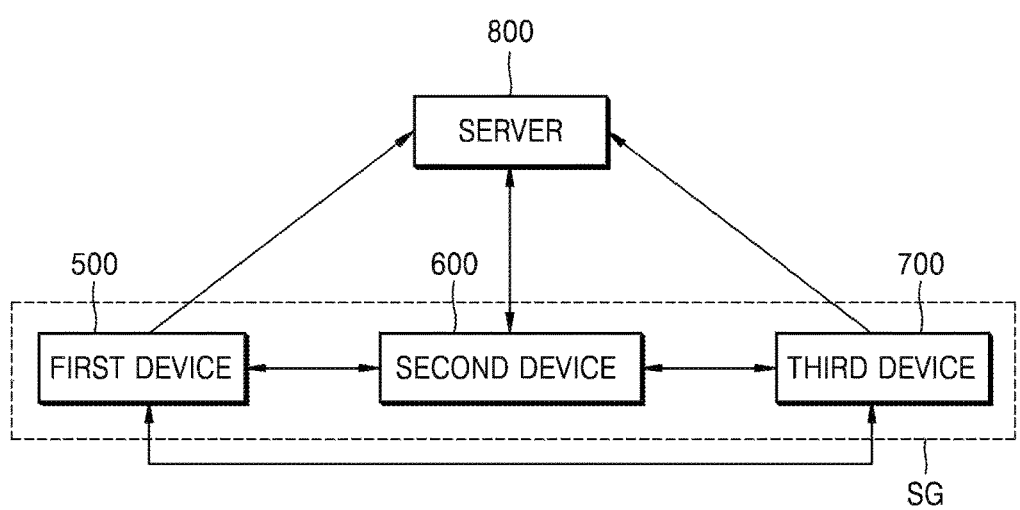
FIG. 26 is a block diagram of a security system according to an exemplary embodiment.

FIG. 26 is a block diagram of a security system 20 according to an exemplary embodiment.

Referring to FIG. 26, the security system 20 may include a security group SG that includes a plurality of devices, for example, first through third devices 500 through 700, and a server 800. In detail, the security group SG may share content securely between the plurality of devices 500 through 700 and, for this, the server 800 may encrypt the content and decrypt the encrypted content. Accordingly, the security group 20 may be referred to as a content encryption system or an encrypted-content decryption system.

However, the elements, shown in FIG. 26, are not all essential elements. The security group SG or the content encryption system may be implemented by using more or less elements than those shown in FIG. 26. For example, the security system 20 may include two devices, or four or more devices.

The server 800 may generate or initialize the security group SG. The first device 500 may be a device of a first user USER1. The second device 600 may be a device of a second user USER2. The second device 700 may be a device of a third user USER3.

For example, the first through third devices 500 through 700 may be smartphones, but are not limited thereto. At least one of the first through third devices 500 through 700 may be a tablet PC, a PC, a smart TV, a cellular phone, a personal digital assistant (PDA), a laptop computer, a media player, a micro server, a global positioning system (GPS) device, an e-book terminal, a digital broadcasting terminal, a navigation system, a kiosk, an MP3 player, a digital camera, a wearable device, or other mobile or non-mobile devices.

One of the first through third devices 500 through 700 may generate and store content, and the server 800 may encrypt content. The encrypted content may be copied and shared between the first through third devices 500 through 700. At least one selected of the first through third devices 500 through 700 may store the encrypted content in a security zone, for example, TrustZone or other hardware-based security architecture, and thus, protect the encrypted content by using hardware. According to another exemplary embodiment, the server 800 store encrypted content, and the stored content may be shared between the first through third devices 500 through 700.

According to an exemplary embodiment, content may be selected manually according to a user input. For example, content may be selected while an application such as a camera or an album is being executed. As another example, content may be selected by executing a particular application for sharing content between the security group SG.

According to another exemplary embodiment, content may be automatically determined according to state information of the first through third devices 500 through 700, that is, based on context. For example, content may be determined according to at least one of location information of the first through third devices and relation information about the first user USER1 through the third user USER3 of the first through third devices 500 through 700 in a social network service (SNS). As another example, one from among the first through third devices 500 through 700 may unilaterally determine content.

According to an exemplary embodiment, the content may be encrypted by the server 800, and the encrypted content may be decrypted and shared between the first through third devices 500 through 700, only when the first through third devices 500 through 700 are located within a proximate spacing of each other. Accordingly, if first through third devices 500 through 700 all consent, the content may become public or changed.

According to another exemplary embodiment, the content may be encrypted by the server 800, and the encrypted content may be decrypted when some of the first through third devices 500 through 700 are located within a proximate spacing of each other, and shared therebetween. Accordingly, if some of the first through third devices 500 through 700 consent, the content may become public or be changed.

Hereinafter, a method of encrypting content and a method of decrypting the encrypted content are described in detail with reference to FIGS. 27 through 33.

Figure 27:
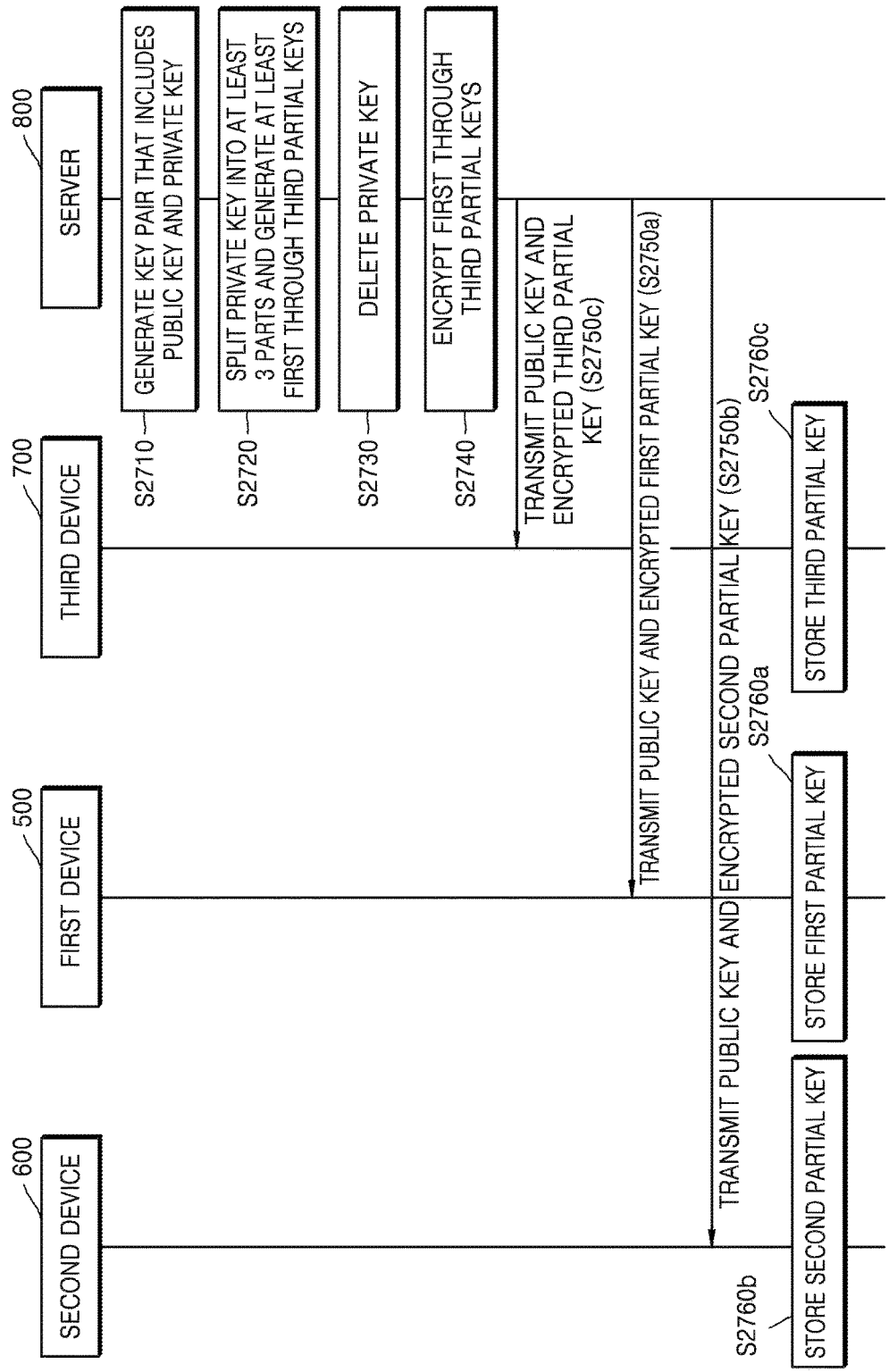
FIG. 27 illustrates a flowchart showing an example of operation of the security system shown in FIG. 26, according to the generating of an encryption key and a plurality of partial keys and the distributing of the generated plurality of partial keys which are included in the method of encrypting content described with reference to FIG. 3.

FIG. 27 illustrates a flowchart showing an example of operation of the security system 20 shown in FIG. 26, according to the generating of an encryption key and a plurality of partial keys and the distributing of the generated plurality of partial keys which are included in the method of encrypting content described with reference to FIG. 3.

Referring to FIG. 27, in the current exemplary embodiment, the method of encrypting content includes a splitting encryption method performed by distributing a private key. The method of encrypting content includes operations processed by the first through third devices 500 through 700 included in the security system 20 and the server 800 which are shown in FIG. 26. Accordingly, it will be understood that a description, provided with regard to the security system 20 described with reference to FIG. 26, may also be applied to the method of encrypting content in the current embodiment, even if the description is not repeated.

In operation S2710, the server 800 generates a key pair consisting of a public key and a private key. For example, the server 800 may generate a public key T used for encryption and a private key t that corresponds to the public key T and is used for decryption.

In operation S2720, the server 800 splits the private key t into three parts, and thus, generates first through third partial keys. For example, the server 800 may generate at least first through third partial keys t1 through t3 by splitting the private key t into three parts. In this case, the server 800 may split the private key t by using a secret sharing scheme such as a Shamir scheme.

In operation S2730, the server 800 deletes the private key t. For example, the sever 800 may delete the private key t. Accordingly, none of the first through third device 500 through 700 may obtain the private key t, and thus, may not independently access the encrypted content.

In operation S2740, the server 800 encrypts the first through third partial keys. For example, the server 800 may generate the encrypted first through third partial keys by encrypting the first through third partial keys t1 through t3 each, so as to ensure security in transmitting the first through third partial keys. Thus, in the transmitting of the encrypted second and third partial keys, devices that are not included in the security group SG may not obtain the second and third partial keys.

In operation S2750a, the server 800 transmits the public key and the encrypted first partial key to the first device 500. In operation S2750b, the server 800 transmits the public key and the encrypted second partial key to the second device 600. In operation S2750c, the server 800 transmits the public key and the encrypted third partial key to the third device 700. For example, the server 800 may transmit the public key and the encrypted first through third partial keys respectively to the first through third devices 500 through 700 via a wireless communication connection such as WiFi, 3G, LTE, Bluetooth, or the like.

In operation S2760a, the first device 500 stores the public key and the first partial key. In operation S2760b, the second device 600 stores the public key and the second partial key. In operation S2760c, the third device 700 stores the public key and the third partial key. For example, the first through third devices 500 through 700 may extract the first through third partial keys each by decrypting the encrypted first through third partial keys. Additionally, since the first through third devices 500 through 700 have the public key T, any of the first through third users USER1 through USER3 of the first through third devices 500 through 700 may encrypt the content by using the public key T.

Figure 28:
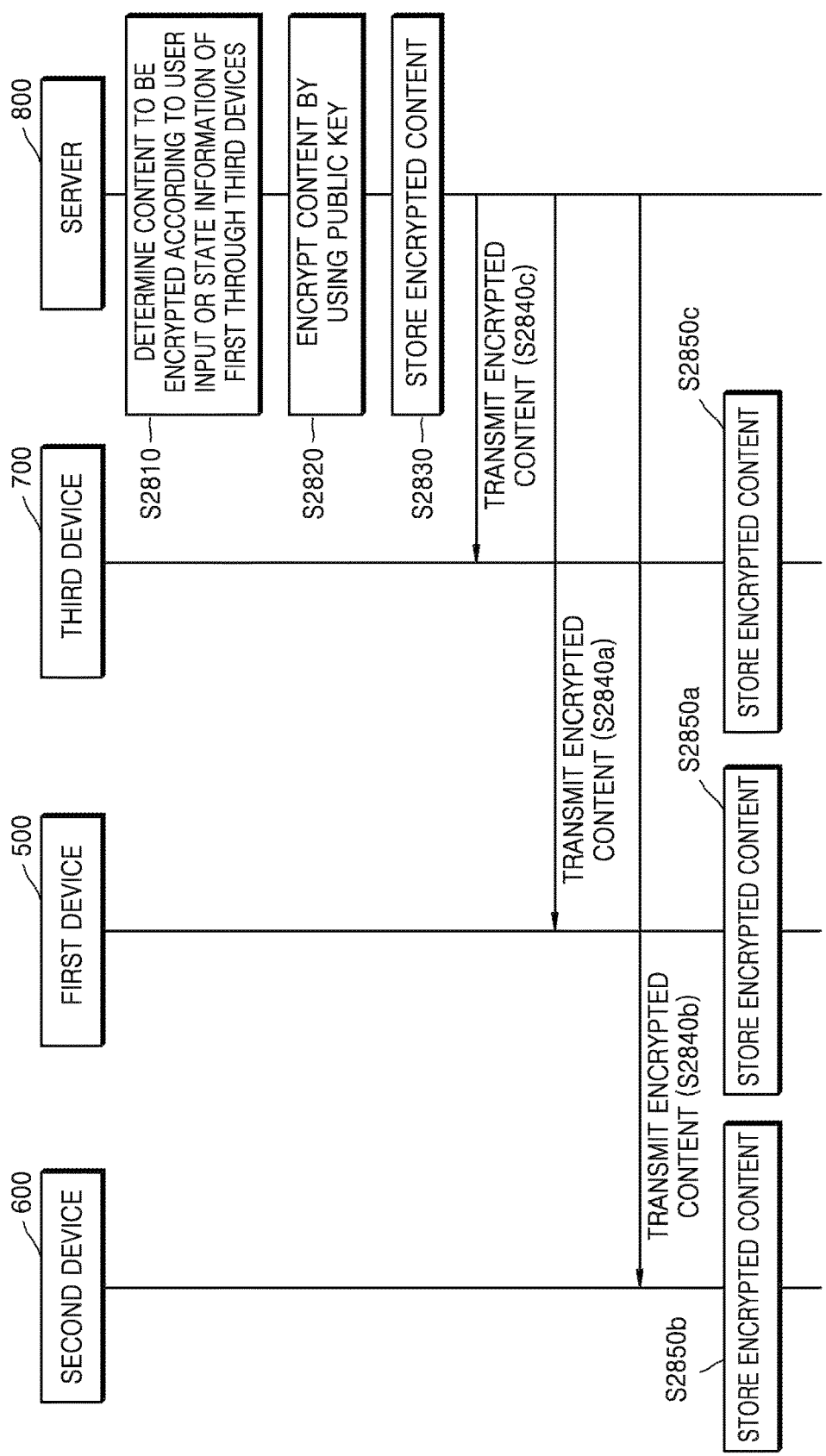
FIG. 28 illustrates a flowchart showing an example of operation of the security system shown in FIG. 26, according to the encrypting of content and the storing of the encrypted content which are included in the method of encrypting content described with reference to FIG. 3.

FIG. 28 illustrates a flowchart showing an example of operation of the security system 20 shown in FIG. 26, according to the encrypting of content and the storing of the encrypted content which are included in the method of encrypting content described with reference to FIG. 3.

Referring to FIG. 28, in the current exemplary embodiment, the method of encrypting content may be performed after the method of encrypting content described with reference to FIG. 27 is performed. Additionally, in the current exemplary embodiment, the method of encrypting content may include operations that are performed by the first through third devices 500 through 700 and the server 800 which are included in the security group 20 shown in FIG. 26. Hereinafter, an operation of encrypting content, the encrypting being performed by the server 800, is described. However, according to another exemplary embodiment, one of the first through third devices 500 through 700 may encrypt content by using a public key.

In operation S2810, the server 800 determines content to be encrypted, according to a user input or state information of the first through third devices 500 through 700. In detail, the first user USER1 may manually determine content stored in the first device 500 or the server 800 as content to be encrypted, via a user input. Alternatively, content stored in the first device 500 or the server 800 may be automatically determined as content to be encrypted, according to state information of the first through third devices 500 through 700.

In operation S2820, the server 800 encrypts the content by using a public key. For example, the server 800 may encrypt content by using a symmetric key s, and encrypt the symmetric key s by using a public key T. In operation S2830, the server 800 stores the encrypted content.

In operation S2840a, the server 800 transmits the encrypted content to the first device 500. In operation S2840b, the server 800 transmits the encrypted content to the second device 600. In operation S2840c, the server 800 transmits the encrypted content to the third device 700.

In operation S2850a, the first device 500 stores the encrypted content. In operation S2850b, the second device 600 stores the encrypted content. In operation S2850c, the third device 700 stores the encrypted content. For example, the first through third devices 500 through 700 may store the encrypted content in a security zone such as TrustZone or other hardware-based security architecture.

Figure 29:
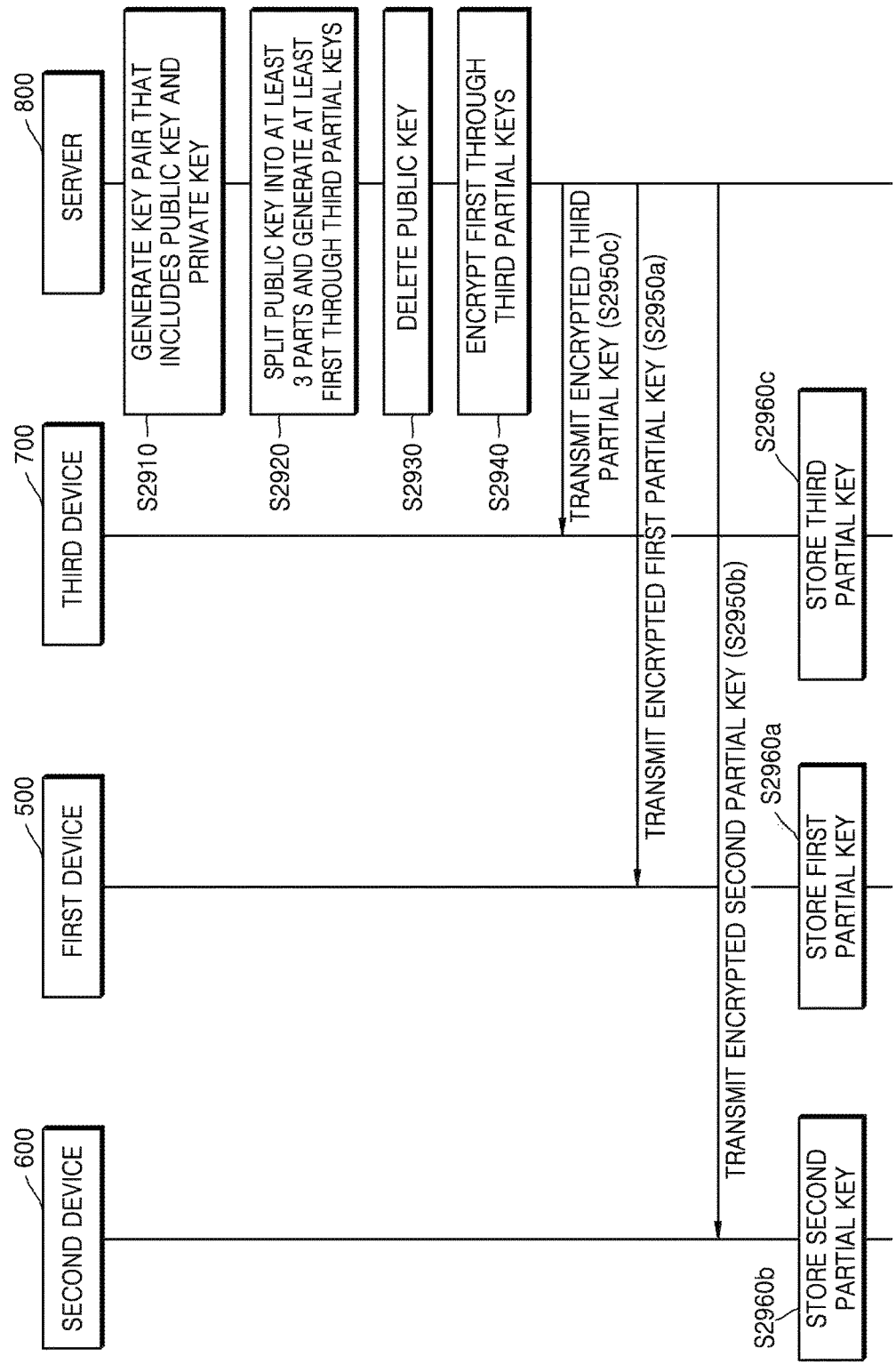
FIG. 29 illustrates a flowchart showing another example of operation of the security system shown in FIG. 26, according to the generating of an encryption key and a plurality of partial keys and the distributing of the generated plurality of partial keys which are included in the method of encrypting content described with reference to FIG. 3.

FIG. 29 illustrates a flowchart showing another example of operation of the security system 20 shown in FIG. 26, according to the generating of an encryption key and a plurality of partial keys and the distributing of the generated plurality of partial keys which are included in the method of encrypting content described with reference to FIG. 3.

Referring to FIG. 29, in the current exemplary embodiment, the method of encrypting content includes a splitting encryption method performed by distributing a private key. The method of encrypting content includes operations processed by the first through third devices 500 through 700 included in the security system 20 and the server 800 which are shown in FIG. 26. Accordingly, it will be understood that a description, provided with regard to the security system 20 described with reference to FIG. 26, may also be applied to the method of encrypting content in the current exemplary embodiment, even if the description is not repeated.

In operation S2910, the server 800 generates a key pair consisting of a public key and a private key. For example, the server 800 may generate a public key T used for encryption and a private key t that corresponds to the public key T and is used for decryption. In operation S2920, the server 800 splits the public key T into three parts, and thus, generates first through third partial keys. For example, the server 800 may split the public key T into at least three parts, and thus, generate at least first through third partial keys T1 through T3.

In operation S2930, the server 800 deletes the public key. In operation S2940, the server 800 encrypts the first and third partial keys. For example, the server 800 may generate the encrypted first and third partial keys by encrypting the first through third partial keys T1 through T3 each, so as to ensure security in transmitting the encrypted first through third partial keys T1 through T3.

In operation S2950*a*, the server 800 transmits the encrypted first partial key to the first device 500. In operation S2950*b*, the server 800 transmits the encrypted second partial key to the second device 600. In operation S2950*c*, the server 800 transmits the encrypted third partial key to the third device 700. In operation S2960*a*, the first device 500 stores the first partial key. In operation S2960*b*, the second device 600 stores the second partial key. In operation S2960*c*, the third device 700 stores the third partial key.

Figure 30:
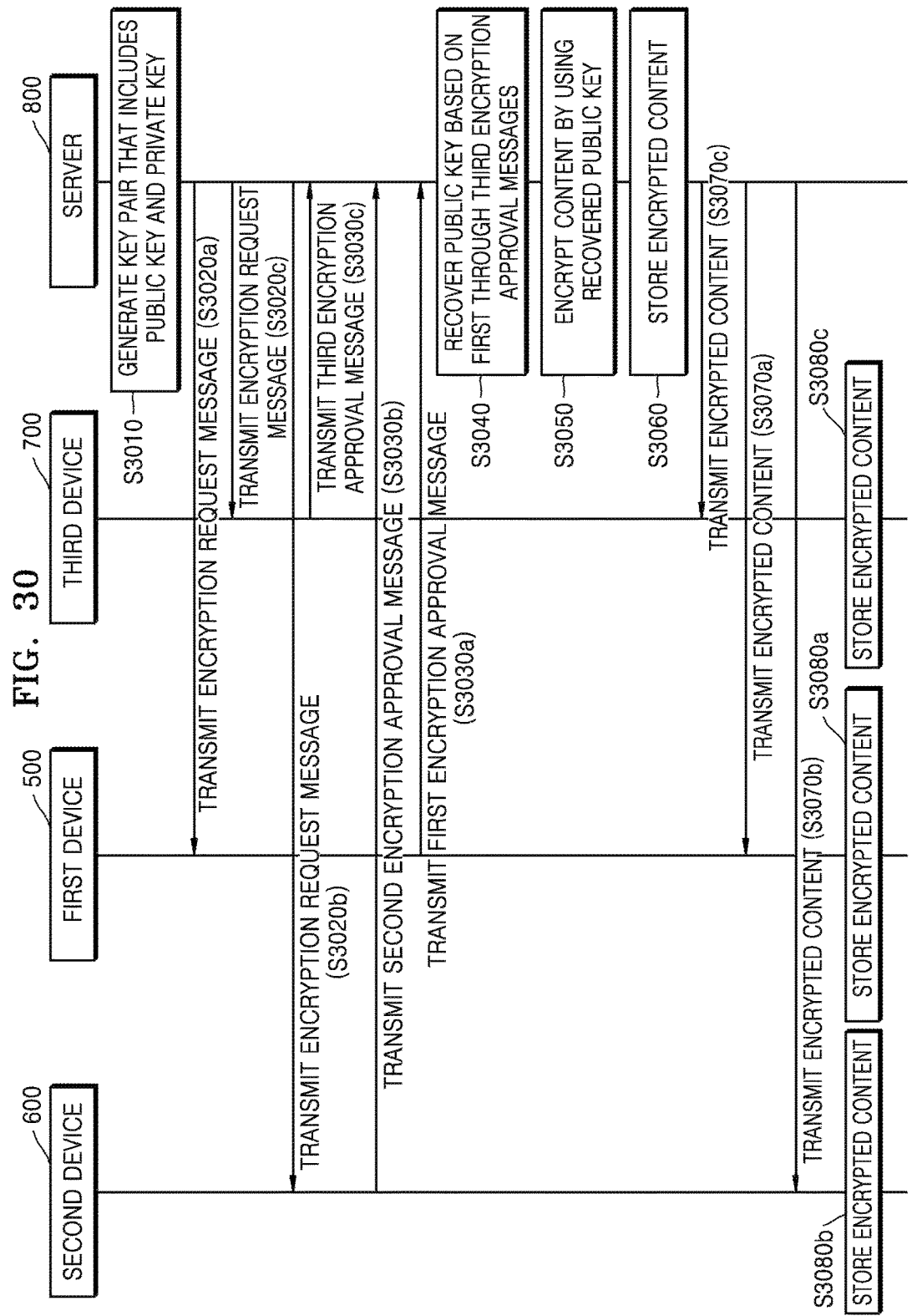
FIG. 30 illustrates a flowchart showing another example of operation of the security system shown in FIG. 26, according to the encrypting of content and the storing of the encrypted content which are included in the method of encrypting content described with reference to FIG. 3.

FIG. 30 illustrates a flowchart showing another example of operation of the security system 20 shown in FIG. 26, according to the encrypting of content and the storing of the encrypted content which are included in the method of encrypting content described with reference to FIG. 3.

Referring to FIG. 30, in the current exemplary embodiment, the method of encrypting content may be performed after the method of encrypting content described with reference to FIG. 29 is performed. Additionally, in the current exemplary embodiment, the method of encrypting content include operations that are performed by the first through third devices 500 through 700 which are included in the security group 20 and the server 800 shown in FIG. 26.

In operation S3010, the server 800 determines content to be encrypted, according to a user input or state information of the first through third devices 500 through 700. In operation S3020*a*, the server 800 transmits an encryption request message to the first device 500. In operation S3020*b*, the server 800 transmits an encryption request message to the second device 600. In operation S3020*c*, the server 800 transmits an encryption request message to the third device 700.

In operation S3030*a*, the first device 500 transmits a first encryption approval message to the server 800. For example, the first encryption approval message may include an encryption value of the first partial key T1 stored in the first device 500. In operation S3030*b*, the second device 600 transmits a second encryption approval message to the server 800. For example, the second encryption approval message may include an encryption value of the second partial key T2 stored in the second device 600. In operation S3030*c*, the third device 700 transmits a third encryption approval message to the server 800. For example, the third encryption approval message may include an encryption value of the third partial key T3 stored in the third device 700.

In operation S3040, the server 800 recovers a public key based on the first through third encryption approval messages. In operation S3050, the server 800 encrypts content by using the public key. In operation S3060, the server 800 stores the encrypted content.

In operation S3070*a*, the server 800 transmits the encrypted content to the first device 500. In operation S3070*b*, the server 800 transmits the encrypted content to the second device 600. In operation S3070*c*, the server 800 transmits the encrypted content to the third device 700.

In operation S3080*a*, the first device 500 stores the encrypted content. In operation S3080*b*, the second device 600 stores the encrypted content. In operation S3080*c*, the third device 700 stores the encrypted content. For example, the first through third devices 500 through 700 may store the encrypted content in a security zone such as TrustZone or other hardware-based security architecture.

Figure 31:
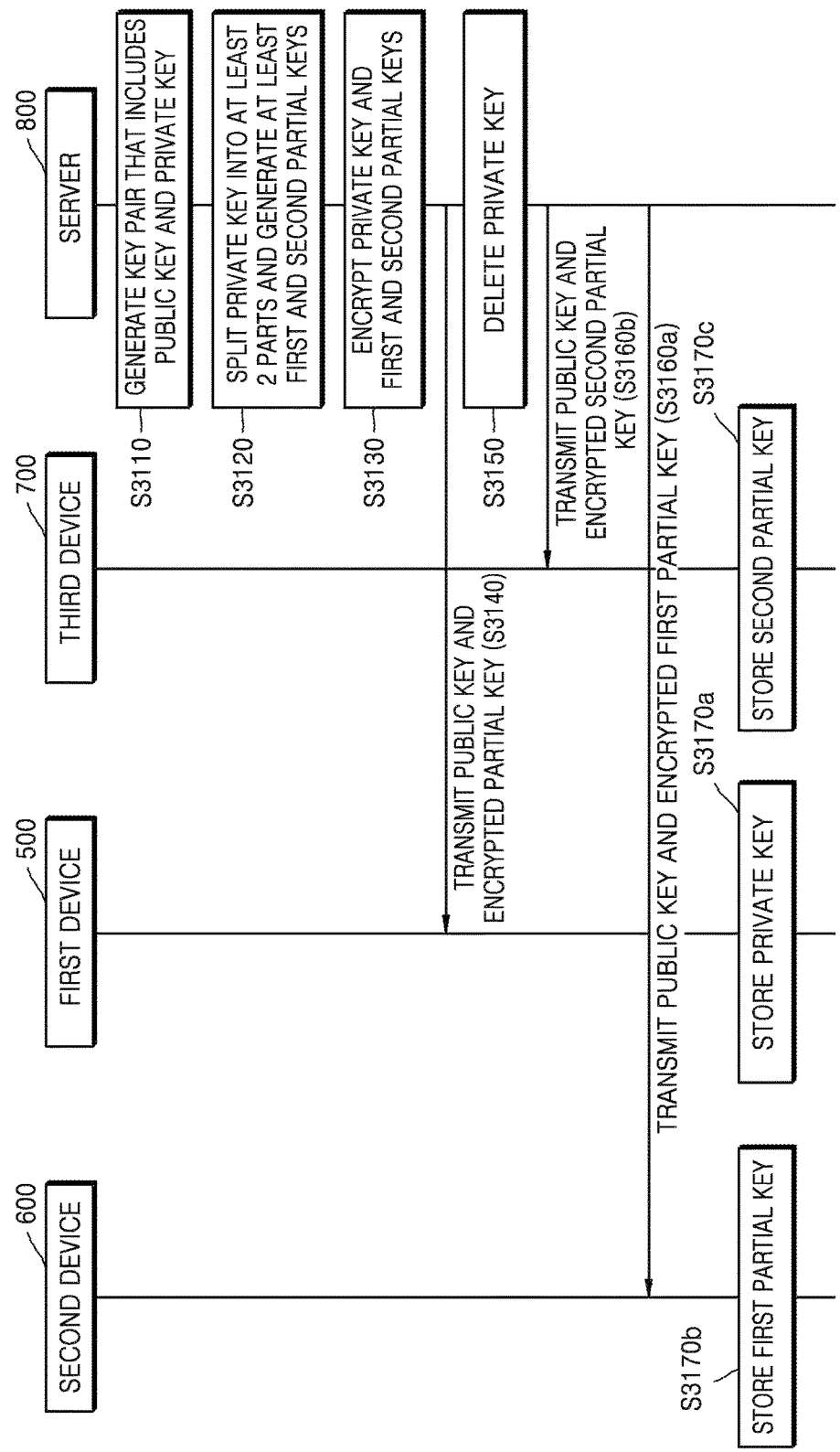
FIG. 31 illustrates a flowchart showing another example of operation of the security system shown in FIG. 26, according to the generating of an encryption key and a plurality of partial keys and the distributing of the generated plurality of partial keys which are included in the method of encrypting content described with reference to FIG. 3.

FIG. 31 illustrates a flowchart showing another example of operation of the security system 20 shown in FIG. 26, according to the generating of an encryption key and a plurality of partial keys and the distributing of the generated plurality of partial keys which are included in the method of encrypting content described with reference to FIG. 3.

Referring to FIG. 31, in the current exemplary embodiment, the method of encrypting content includes a splitting encryption method performed by distributing a private key. The method of encrypting content includes operations processed by the first through third devices 500 through 700 included in the security system 20 and the server 800 which are shown in FIG. 26. Accordingly, it will be understood that a description, provided with regard to the security system 20 described with reference to FIG. 26, may also be applied to the method of encrypting content in the current embodiment, even if the description is not repeated.

In operation S3110, the server 800 generates a key pair consisting of a public key T and a private key t. In operation S3120, the server 800 splits the private key t into at least two parts, and thus, generates at least first and second partial keys t1 and t2. In operation S3130, the server 800 encrypts the private key t and the first and second partial keys t1 and t2.

In operation S3140, the server 800 transmits the public key and the encrypted private key to the first device 500. In operation S3150, the server 800 deletes the private key t. In operation S3160*a*, the server 800 transmits the public key and the encrypted first partial key to the second device 600. In operation S3160*b*, the server 800 transmits the public key and the encrypted second partial key to the third device 700.

In operation S3170*a*, the first device 500 stores the public key and the private key t. For example, the first device 500 may independently encrypt the content by using the public key T, and independently decrypt the content by using the private key t.

In operation S3170*b*, the second device 600 stores the public key and the first partial key. In operation S3170*c*, the third device 700 stores the public key and the second partial key. For example, the second and third devices 600 and 700 may extract the first and second partial keys each by decrypting the encrypted first and second partial keys.

The second and third devices 600 and 700 have the public key T, any of the second and third users USER2 and USER3 of the second and third devices 600 and 700 may encrypt the content by using the public key T. However, since the second and third devices 600 and 700 respectively have the first and second partial keys t1 and t2, the second and third devices 600 and 700 may not independently decrypt content, and may decrypt content only when the second and third devices 600 and 700 are located within a proximate spacing of each other.

In the current exemplary embodiment, the encrypting of content and the storing of the encrypted content are substantially similar to the encrypting and the storing described with reference to FIG. 28. Thus, a detailed description thereof is not repeated.

Figure 32:
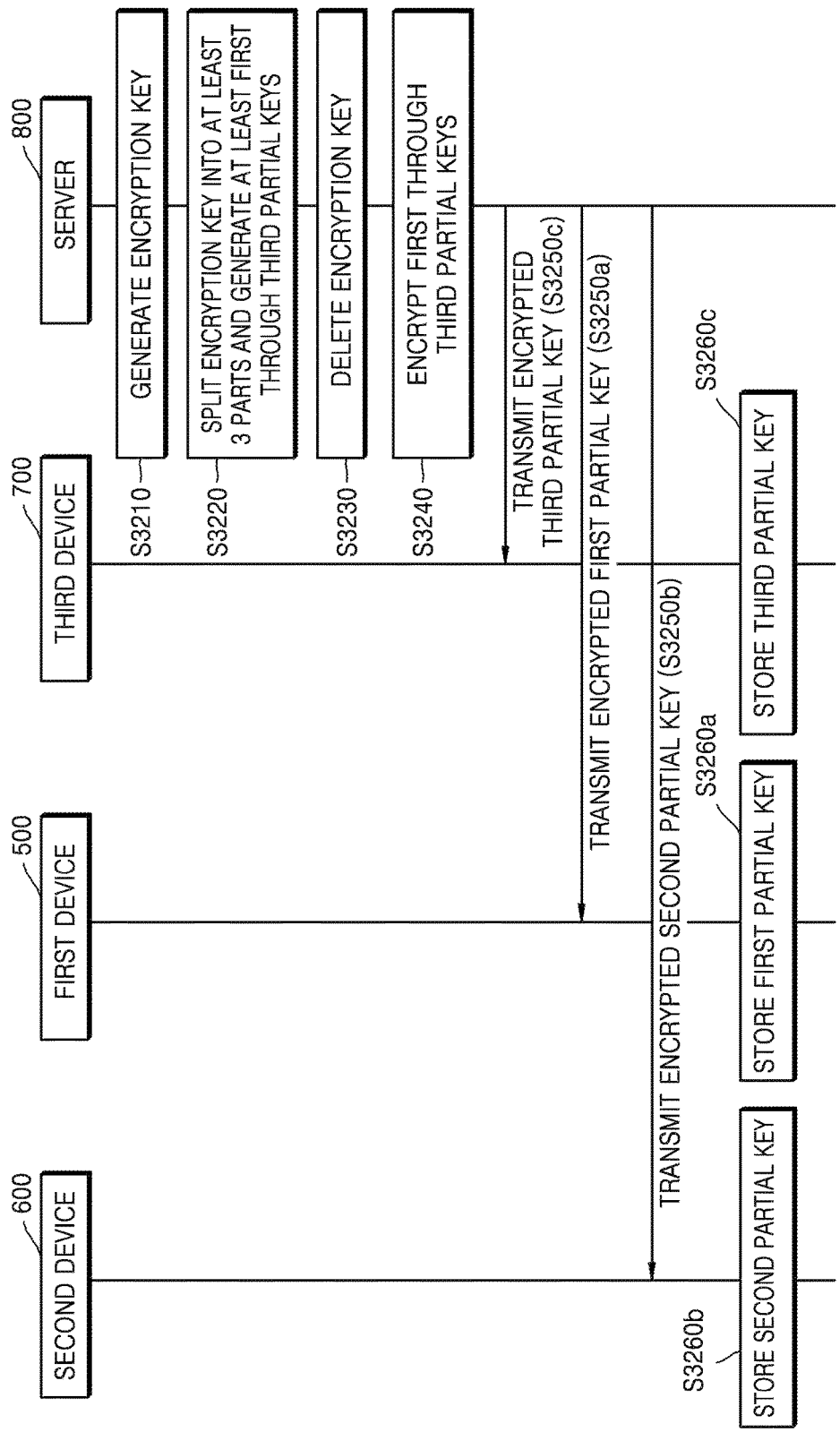
FIG. 32 illustrates a flowchart showing another example of operation of the security system shown in FIG. 26, according to the generating of an encryption key and a plurality of partial keys and the distributing of the generated plurality of partial keys which are included in the method of encrypting content described with reference to FIG. 3.

FIG. 32 illustrates a flowchart showing another example of operation of the security system 20 shown in FIG. 26, according to the generating of an encryption key and a plurality of partial keys and the distributing of the generated plurality of partial keys which are included in the method of encrypting content described with reference to FIG. 3.

Referring to FIG. 32, in the current exemplary embodiment, the method of encrypting content includes a splitting encryption method performed by distributing a private key. The method of encrypting content includes operations processed by the first through third devices 500 through 700 included in the security system 20 and the server 800 which are shown in FIG. 26. Accordingly, it will be understood that a description, provided with regard to the security system 20 described with reference to FIG. 26, may also be applied to the method of encrypting content in the current embodiment, even if the description is not repeated.

In operation S3210, the server 800 generates an encryption key, that is, a symmetric key. For example, the server 800 may generate an encryption key sk used for encryption. The generated encryption key sk may be also used for decryption.

In operation S3220, the server 800 splits the encryption key into at least three parts, and thus, generates at least first through third partial keys. For example, the server 800 may split the encryption key sk into at least three parts, and thus, generate at least the first through third partial keys sk1 through sk3.

In operation S3230, the server 800 deletes the encryption key. In operation S3240, the server 800 encrypts the first through third partial keys. In operation S3250a, the server 800 transmits the encrypted first partial key to the first device 500. In operation S3250b, the server 800 transmits the encrypted second partial key to the second device 600. In operation S3250c, the server 800 transmits the encrypted third partial key to the third device 700.

In operation S3260a, the first device 500 stores the first partial key sk1. In operation S3260b, the second device 600 stores the second partial key sk2. In operation S3260c, the third device 700 stores the third partial key sk3.

Since the first through third devices 500 through 700 have the first through third partial keys sk1 through sk3, the first through third users USER1 through USER3 of the first through third devices 500 through 700 may not independently encrypt the content, and may encrypt content only when the first through third devices 500 through 700 are located within a proximate spacing of each other. Additionally, since the first through third devices 500 through 700 use a symmetric encryption/decryption method, the first through third users USER1 through USER3 of the first through third devices 500 through 700 may not independently decrypt the content, and may decrypt content only when the first through third devices 500 through 700 are located within a proximate spacing of each other.

In the current exemplary embodiment, the encrypting of content and the storing of the encrypted content are substantially similar to the encrypting and the storing described with reference to FIG. 30. Thus, a detailed description thereof is not provided here.

Figure 33:
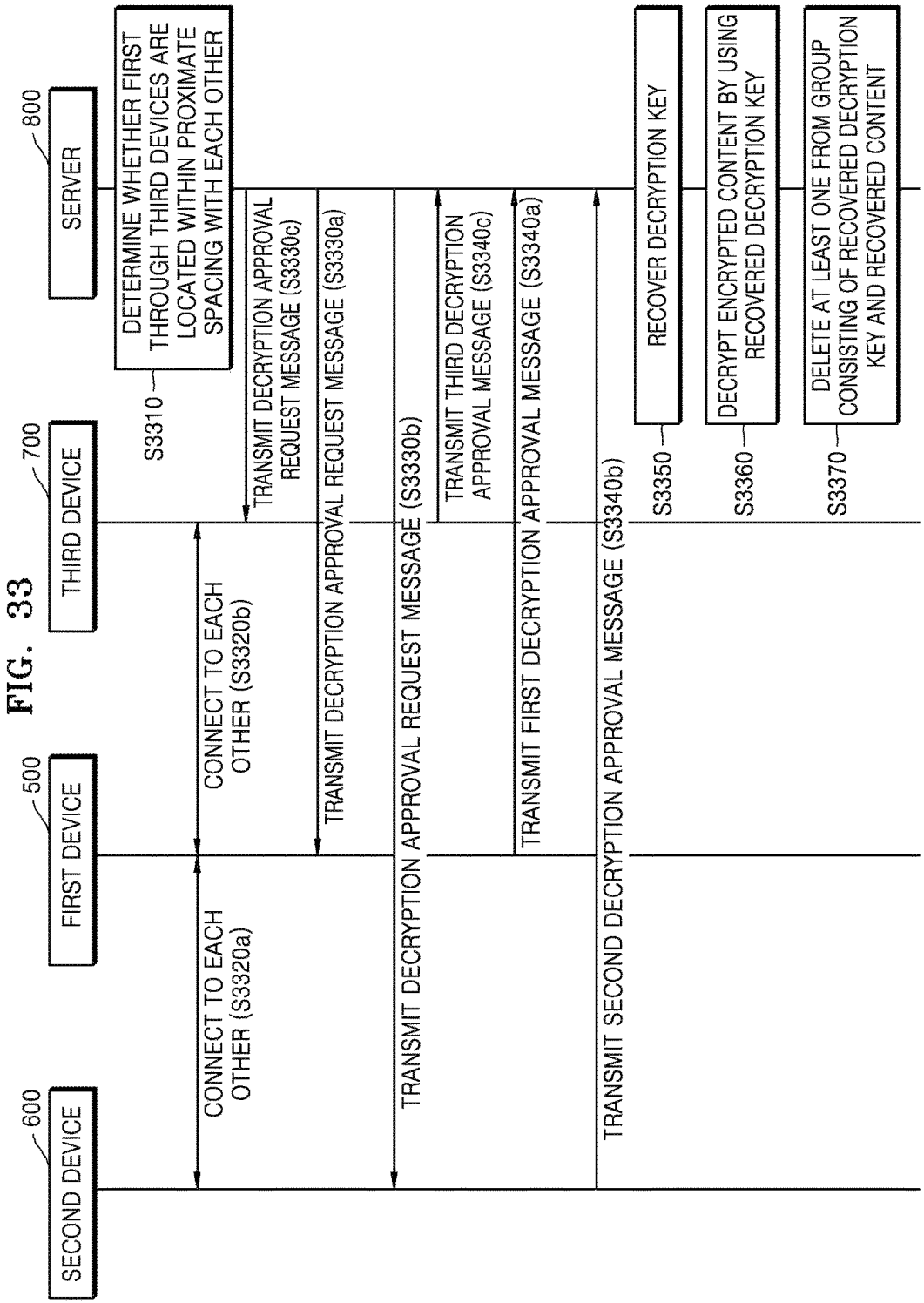
FIG. 33 illustrates a flowchart showing an example of an operation of the security system shown in FIG. 26, according to the method of decrypting content described with reference to FIG. 19.

FIG. 33 illustrates a flowchart showing an example of an operation of the security system 20 shown in FIG. 26, according to the method of decrypting content described with reference to FIG. 19.

Referring to FIG. 33, in the current exemplary embodiment, the method of encrypting content includes operations processed by the first through third devices 500 through 700 included in the security system 20 shown in FIG. 26. Accordingly, it will be understood that a description, provided with regard to the security system 20 described with reference to FIG. 26, may also be applied to the method of decrypting content in the current exemplary embodiment, even if the description is not repeated.

In operation S3310, the server 800 determines whether the first through third devices 500 through 700 are located within a proximate spacing of each other.

In operation S3320a, the first and second devices 500 and 600 are connected to each other. In operation S3320b, the first and third devices 500 and 700 are connected to each other. Accordingly, the second and third devices 600 and 700 are connected to each other.

In operation S3330a, the server 800 transmits a decryption approval request message to the first device 500. In operation S3330b, the server 800 transmits a decryption approval request message to the second device 600. In operation S3330c, the server 800 transmits a decryption approval request message to the third device 700.

In operation S3340a, the first device 500 transmits a first decryption approval message to the server 800. For example, the first decryption approval message may include an encryption value $Enc_{k1}(t1)$ of the first partial key t1 stored in the first device 500. In operation S3340b, the second device 600 transmits a second decryption approval message to the server 800. For example, the second decryption approval message may include an encryption value $Enc_{k2}(t2)$ of the second partial key t2 stored in the second device 600. In operation S3340c, the third device 700 transmits a third decryption approval message to the server 800. For example, the third decryption approval message may include an encryption value $Enc_{k3}(t3)$ of the third partial key t3 stored in the third device 700.

In operation S3350, the server 800 recovers a decryption key based on the first through third decryption approval messages. For example, the server 800 may obtain first through third partial keys t1 through t3, by decrypting the encryption values $Enc_{k1}(t1)$, $Enc_{k2}(t2)$, and $Enc_{k3}(t3)$ of the first through third partial keys t1 through t3 respectively included in the first and second decryption approval messages by using first through third identification public keys K1 through K3. Then, the server 800 may recover a private key t based on the first through third partial keys t1 through t3 (that is, t=t1+t2+t3).

In operation S3360, the server 800 decrypts encrypted content by using the recovered decryption key. For example, the server 800 may decrypt a symmetric key s by using the recovered private key t (that is, $Dec_t(Enc_T(s))=s$), and decrypt encrypted content by using the decrypted symmetric key s (that is, $AES_s(m)=m$).

In operation S3370, the server 800 deletes at least one of the recovered encryption key and the recovered content. For example, the server 800 may delete at least one of the recovered encryption key t and the recovered content m.

With regard to the encryption/decryption method described with reference to FIGS. 1 through 33, various application examples may be present. For example, in the field of entertainment, partial keys may be distributed between members of a group. Thus, whereas any member of the group may generate an event such as a contest, a quiz, or the like, the event may be started at a same time only when all participants, from among all the members of the group, are prepared. As another example, in the field of a lock or a lock release of an electronic apparatus, partial keys with respect to a password for turning on a TV may be distributed to parents. Accordingly, the TV may be turned on only when one of the parents is at home. Additionally, as another example, content may be a will, and partial keys may be distributed between descendants. Accordingly, the will may be viewed only when all the descendants gather in the same location. As another example, content may be a test result, and partial keys may be distributed between teachers. Thus, whereas the test result may be registered for only when at least some of the teachers gather in the same location, any student may view the test result.

Figure 34:
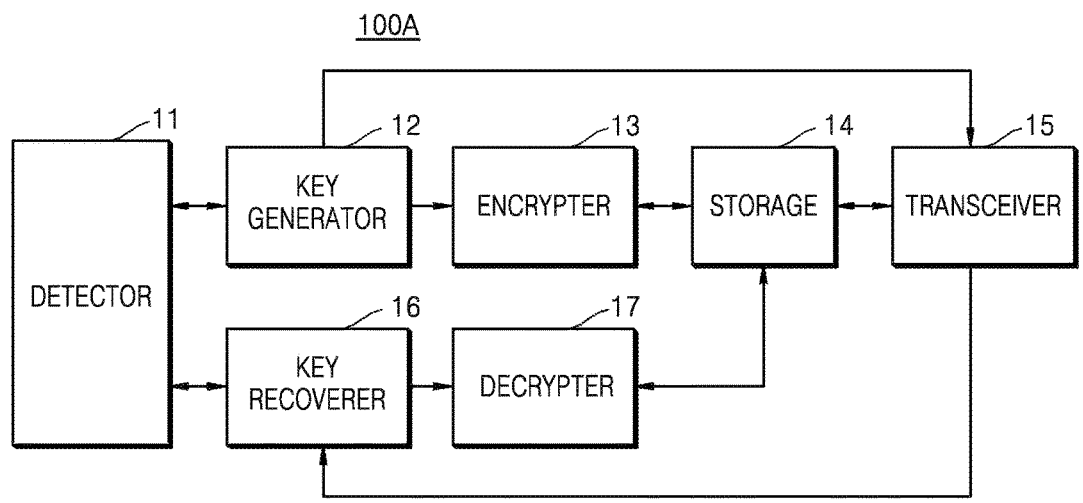
FIG. 34 is a block diagram of a device according to an exemplary embodiment.

FIG. 34 is a block diagram of a device 100A according to an exemplary embodiment.

Referring to FIG. 34, the device 100A may include a detector 11, a key generator 12, an encrypter 13, a storage 14, a transceiver 15, a key recoverer 16, and a decrypter 17. The device 100A may encrypt content that may be shared in a security group which includes a plurality of devices, and decrypt the encrypted content. The device 100A is one of the plurality of devices included in the security group.

The device 100A may be applied both to the first through third devices 100 through 300 shown in FIG. 1, and the first through third devices 500 through 700 shown in FIG. 26. Additionally, the device 100A may perform the method of encrypting content and the method of decrypting content described with reference to the FIGS. 1 through 33. Accordingly, hereinafter, a detailed description about operations of content encryption and decryption, performed by the device 100A, may not be repeated.

The detector 11 may determine whether the plurality of devices included in the security group are located within a proximate spacing of each other so as to recognize each other. In detail, if the plurality of devices included in the security group are located within a proximate spacing of each other so as to recognize each other, the detector 11 generates a detection signal, and transmits the detection signal to a key generator 12, a key recoverer 16, or a server.

Figure 35:
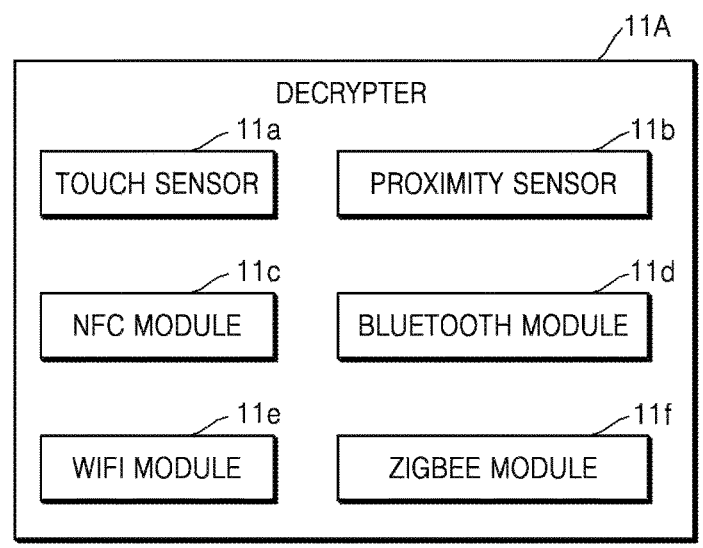
FIG. 35 is a block diagram of an example of a detection unit shown in FIG. 34.

FIG. 35 is a block diagram of a detection unit 11A as an example of the detection unit 11 shown in FIG. 34.

Referring to FIG. 35, the detector 11A may include at least one of a touch sensor 11a, a proximity sensor 11b, an NFC module 11c, a Bluetooth module 11d, a WiFi module 11e, and a ZigBee module 11f. However, exemplary embodiments are not limited thereto. According to another exemplary embodiment, the detector 11 may further include a short-range wireless communicator for communicating in various ways.

Various types of the touch sensor 11a, such as a variable capacitance type, a variable resistance type, or a variable light type, may be employed to detect whether a plurality of devices are located within a proximate spacing of each other.

Various types of the proximate sensor 11b, such as a high-frequency oscillation proximity type, an electrostatic capacity type, a magnetic type, a photoelectric type, or an ultrasonic type may be employed to detect whether a plurality of devices are located within a proximate spacing of each other. In detail, the proximity sensor 11b is a sensor that may determine whether an object is approaching another object before the object contacts the other object, and is used to detect presence, passage, a continuous flow, or congestion of an object by using a strength of an electromagnetic field without requiring a physical contact.

The NFC module 11c may detect whether a plurality of devices are located within a proximate spacing of each other through NFC tagging. In detail, the NFC module 11c refers to a module that operates according to an NFC method by using 13.56 MHz, from among various radio frequency identification (RFID) frequency bands such as 135 kHz, 13.56 MHz, 433 MHz, 860 to 960 MHz, 2.45 GHz, etc.

The Bluetooth module 11d may detect whether a plurality of devices are located within a proximate spacing of each other by performing communication by using a Bluetooth method. The WiFi module 11e may detect whether a plurality of devices are located within a proximate spacing from each other by performing communication by using a WiFi method. If the WiFi module or the Bluetooth module is used, various connection information, such as a service set identifier (SSD), a session key, etc., may be transceived in advance. Then, communication is established by using the connection information so as to transceive various information.

The ZigBee module 11f may detect whether a plurality of devices are located within a proximate spacing of each other by performing communication by using ZigBee, which is one of the Institute of Electrical and Electronics Engineers (IEEE) 802.15.4 standards that support short-range communication. In detail, ZigBee is a technology for short-range communication within a distance of 10 to 20 m in a wireless networking field such as home or an office, and ubiquitous computing. In other words, ZigBee has a concept of a mobile phone or a wireless local area network (WLAN), and may reduce power consumption but may transmit a small amount of information compared to a related art.

Referring back to FIG. 34, the key generator 12 may generate an encryption key and a plurality of partial keys with respect to certain content. According to an exemplary embodiment, if the asymmetric encryption method is employed, the key generator 12 may generate an encryption key that includes a key pair consisting of a public key and a private key. The key generator 12 may generate a plurality of partial keys by splitting the public key or the private key. According to another exemplary embodiment, if the symmetric encryption method is employed, the key generator 12 may generate an encryption key that includes a symmetric key. The key generator 12 may generate a plurality of partial keys by splitting the symmetric key.

The encrypter 13 may encrypt content by using the generated encryption key. In detail, the encrypter 13 may encrypt content by using a session key, and encrypt the session key by using the encryption key. Additionally, the encrypter 13 may encrypt the generated plurality of partial keys. Additionally, if one of a plurality of devices is located at a proximate spacing from each other, the encrypter 13 may re-encrypt the content that is being played.

According to an exemplary embodiment, if the asymmetric encryption method is employed, the encrypter 13 may encrypt content by using the public key. In detail, the encrypter 13 may encrypt content by using the session key, and encrypt the session key by using the public key. According to another exemplary embodiment, if the symmetric encryption method is employed, the encrypter 13 may encrypt content by using the symmetric key. In detail, the encrypter 13 may encrypt content by using the session key, and encrypt the session key by using the symmetric key.

The storage 14 may store at least one of encrypted content and decrypted content. Additionally, the storage 14 may further store at least one of an encryption key and a decryption key. According to an exemplary embodiment, the storage 14 may be implemented as a security zone such as TrustZone or other hardware-based security architecture. After the content is encrypted by the encrypter 13, the encryption key may be deleted.

The transceiver 15 may transmit a plurality of partial keys, generated by the key generator 12, to respective other devices included in a security group. According to another exemplary embodiment, the transceiver 15 may transmit the plurality of partial keys, encrypted by the encrypter 13, to the respective other devices included in the security group. Additionally, the transceiver unit 15 may transmit the encrypted content, stored in the storage 14, to at least one of the other devices included in the security group.

If a detection signal is received from the detector 11, that is, if devices amounting to a value equal to or greater than a threshold value, from among the plurality of devices included in the security group, are located within a proximate spacing of each other, the key recoverer 16 may recover a decryption key from the plurality of partial keys stored in each of the devices amounting to the value equal to or greater than the threshold value. The decryption key may correspond to the encryption key generated by the key generator 12.

The decrypter 17 may decrypt the encrypted content by using the recovered decryption key. According to an exemplary embodiment, the decrypter 17 may decrypt the decrypted session key by using the recovered decryption key, and decrypt the encrypted content by using the decrypted session key. Additionally, after the encrypted content is decrypted, at least one of the decryption key and the decrypted content may be deleted.

In the current exemplary embodiment, if at least one of the plurality of devices located within a proximate spacing of each other gets outside of the proximate spacing, at least one of the key recoverer 16 and the decrypter 17 may stop operation, and the encrypter 13 may re-encrypt the decrypted content.

In the current exemplary embodiment, the key generator 12, the encrypter 13, the key recoverer 16, and the decrypter 17 may be implemented as a plurality of programs, and stored in a memory in the device 100A. Then, a control unit included in the device 100A may access the memory, and thus, execute operations such as key generation, encryption, key recovery, and decryption. In other exemplary embodiments, however, the key generator 12, the encrypter 13, the key recoverer 16, and the decrypter 17 may be implemented in hardware, software, or as a combination of hardware and software. Additionally, in the current exemplary embodiment, the storage 14 may be implemented as a part of an area of the memory in each device 100A. Additionally, in the current exemplary embodiment, the transceiver 15 may be implemented as a part of a communicator included in the device 100A. Hereinafter, an exemplary embodiment of hardware of the device is described with reference to FIG. 36.

Figure 36:
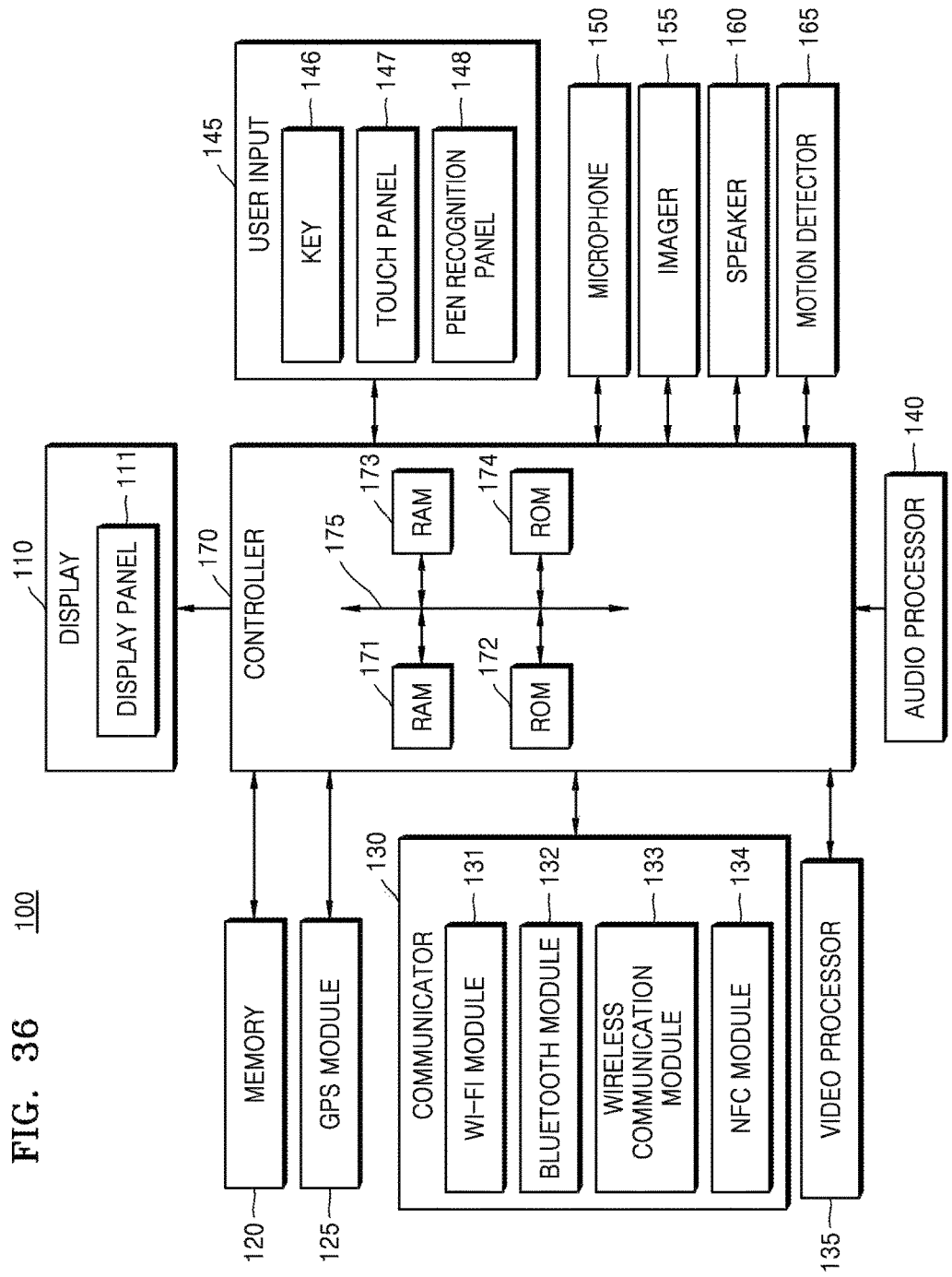
FIG. 36 is a block diagram of a device according to an exemplary embodiment.

FIG. 36 is a block diagram of a device 100B according to an exemplary embodiment.

Referring to FIG. 36, in the current exemplary embodiment, a configuration of the device 100B may be applied to both the first through third devices 100 through 300, described with reference to FIG. 1, and the first through third devices 500 through 600, described with reference to FIG. 26. The configuration of the device 100B may be applied to various devices such as a cellular phone, a tablet PC, a PDA, an MP3 player, a kiosk, an electronic picture frame, a navigation system, a digital TV, a wearable device such as a wrist watch or a head-mounted display (HMD), or the like.

Referring to FIG. 36, the device 100B may include at least one of the display 110, a controller 170, a memory 120, a GPS module 125, a communicator 130, a video processor 135, an audio processor 140, a user input unit 145, a microphone 150, an imager 155, a speaker 160, and a motion detector 165.

The display 110 may include a display panel 111 and a controller (not shown) for controlling the display panel 111. The display panel 111 may be configured as various types of display such as a liquid-crystal display (LCD), an organic light-emitting diode (OLED) display, an active-matrix organic light-emitting diode (AMOLED) display, or a plasma display panel (PDP). The display panel 111 may be implemented to be flexible, transparent, or wearable. The display 110 and the touch panel 147 included in the user input unit 145 may be combined with each other to constitute a touchscreen (not shown). For example, the touchscreen (not shown) may include a module formed as one body in which the display panel 111 and the touch panel 147 form a layered structure.

The memory 120 may include at least one of an internal memory (not shown) and an external memory (not shown).

The internal memory may include, for example, at least one of a volatile memory (for example, a dynamic random access memory (DRAM), a static random access memory (RAM), a synchronous DRAM (SDRAM), or the like), a non-volatile memory (for example, a one-time programmable read-only memory (OTPROM), a programmable read-only memory (PROM), an erasable and programmable read-only memory (EPROM), an electrically erasable and programmable read-only memory (EEPROM), a mask read-only memory (ROM), a flash ROM, or the like), a hard-disk driver (HDD), and a solid-state driver (SSD). According to an exemplary embodiment, the controller 170 may load a command or data, received from at least one of the non-volatile memory and other elements, to the volatile memory and process the command or data. The controller 170 may save data, received or generated from another element, in the non-volatile memory.

The external memory may include, for example, at least one of compact flash (CF), secure digital (SD), micro secure digital (micro-SD), mini secure digital (mini-SD), extreme digital (xD), or a memory stick.

The memory 120 may store various programs and data used for operation of the device 100B. For example, the memory 120 may temporarily or non-permanently store at least a part of a key generation program and an encryption program for encrypting content, and/o a key recovering program and a decryption program for decrypting content. As another example, the memory 120 may temporarily or non-permanently store at least a part of encrypted content and/or decrypted content.

The controller 170 may control the display unit 110 to display a part of content stored in the memory on the display unit 110. In other words, the controller 170 may display a part of the content stored in the memory 120 on the display 110. Alternatively, if a user gesture is performed on an area of the display 110, the controller 170 may perform a control operation in correspondence with the user gesture.

The control unit 170 may include at least one of a RAM 171, a ROM 172, a central processing unit (CPU) 173, a graphic processing unit (GPU) 174, or a bus 175. The RAM 171, the ROM 172, the CPU 173, and the GPU 174 may be connected to each other via the bus 175.

The CPU 173 accesses the memory 120, and performs booting by using an operating system (OS) stored in the memory 120. The CPU 173 performs various operations by using various programs, content, or data stored in the memory 120.

The ROM 172 stores a command set for system booting. As an example, if a turn-on command is input and power is supplied to the device 100B which is a mobile terminal 100B, the CPU 173 may copy the OS stored in the memory 120 to the RAM 171 according to the command stored in the ROM 172, and boot the system by executing the OS. When the booting is completed, the CPU 173 copies various programs stored in the memory to the RAM 171, and executes the programs copied to the RAM 171 to perform various operations. When the booting of the device 100B is completed, the GPU 174 displays a user interface (UI) screen on an area of the display unit 110. In detail, the GPU 174 may generate a screen on which an electronic document that includes various objects such as content, an icon, a menu, or the like is displayed. The GPU 174 calculates attribute values such as a coordinate value, a shape, a size, or a color with respect to each object, according to a layout of the screen. Then, the GPU 17 may generate a screen having various types of layout that includes an object, based on the calculated attribute value. The screen generated by the GPU 174 may be provided to the display unit 110, and displayed on an area of the display unit 110.

The GPS module 125 may receive a GPS signal from a GPS satellite, and calculate a current location of the device 100B. The control unit 170 may calculate a location of a user by using the GPS module 125, if a navigation program is used or a current location of the user is needed.

The communicator 120 may perform communication with various types of external devices according to various types of communication methods. The communicator 130 may include at least one of a WiFi module 131, a Bluetooth module 132, a wireless communication module 133, and an NFC module 134. The controller 170 may perform communication with various external devices by using the communicator 130.

The WiFi module 131 and the Bluetooth module 132 may respectively perform communication by using a WiFi method and a Bluetooth method. If the WiFi module 131 or the Bluetooth module 132 is employed, various connection information, such as a service set identifier (SSID), a session key, etc., may be transceived in advance. Then, communication is performed by using the connection information so as to transceive various information. The wireless communication module 133 refers to a module for performing communication according to various communication standards such as IEEE, ZigBee, $3^{rd}$ generation (3G), $3^{rd}$ generation partnership project (3GPP), or long-term evolution (LTE). The NFC module 134 refers to a module that operates according to an NFC method by using 13.56 MHz, from among various RFID frequency bands such as 135 kHz, 13.56 MHz, 433 MHz, 860 to 960 MHz, 2.45 GHz, etc.

The video processor 135 may process video data included in content received via the communication unit 130, or content stored in the memory 120. The video processor 135 may perform various image processing, such as decoding, scaling, noise filtering, a frame rate conversion, or a resolution conversion, on the video data.

The audio processor 140 may process audio data included in content received via the communication unit 130, or content stored in the memory 120. The audio processor 1340 may perform various processing, such as decoding, amplification, or noise filtering, on the video data.

If a playback program of multimedia content is executed, the controller 170 may play the multimedia content by driving the video processor 135 and the audio processor 140. The speaker 160 may output audio data generated by the audio processor 140.

The user input unit 145 may receive an input of various commands from a user. The user input unit 145 may include at least one of a key 146, a touch panel 147, and a pen recognition panel 148.

The key 146 may include one or more keys and may be implemented by various types of key such as a mechanical button or a wheel, which is formed on various areas such as at a front or a side of an outer surface of the device 100B.

The touch panel 147 may detect a touch input by a user and output a touch event value corresponding to the detected touch input. If the touch panel 147 and the display panel 111 are combined with each other to constitute a touchscreen, the touchscreen may be implemented by using various types of touch sensors such as a capacitive type, a resistive type, or a piezoelectric type. The capacitive touchscreen is formed by using a method of detecting micro-electricity generated from a body of a user when a part of the body of the user touches a surface of the touchscreen and calculating a coordinate of the touched location, by using a dielectric material coated on a surface of the touchscreen. The resistive touchscreen is formed by using a method of detecting current flowing when, if a user touches a touchscreen that includes two built-in electrode plates, an upper electrode plate and a lower electrode plate between the two built-in electrode plates contact each other at a touched location of the touchscreen, and calculating a coordinate of the touched location of the touchscreen. A touch event that occurs on the touchscreen may be generated mainly by a finger of a person, but may also be generated by a conductive material that may change electrostatic capacity.

A pen recognition panel 148 may detect a proximity input or a touch input of a touch pen used by a user, for example, a stylus pen or a digitizer pen, and output an event of the detected proximity input or the detected touch input of the touch pen. The pen recognition panel 148 may be implemented by using an electromagnetic radiation (EMR) method and detect a touch input or a proximity input according to a change in strength of an electromagnetic field as the touch pen is near or touches the pen recognition panel. In detail, the pen recognition panel 148 may include an electromagnetic induction coil sensor (not shown) having a grid structure and an electric signal processor (not shown) providing an alternating current (AC) signal having a predetermined frequency sequentially to each loop coil of the electromagnetic induction coil sensor. If a pen having a resonant circuit is placed in a vicinity of a loop coil of the pen recognition panel 148, a magnetic field transmitted from the loop coil generates current based on mutual electromagnetic induction through the resonant circuit of the pen. Based on the current, an induction field may be generated from the coil of the resonant circuit in the pen, and the pen recognition panel 148 may detect the induction field in a loop coil that is in a signal reception state, thereby sensing a proximity location or a touch location of the pen. The pen recognition panel 148 may be located below the display panel 111 to have a certain area, for example, an area that may cover a display area of the display panel 111.

The microphone 150 may receive an input of and convert user voice or other sound into audio data. The controller 170 may use user voice, input via the microphone 150, in a phone call operation, or convert the user voice into audio data and store the user voice in the memory 120.

The imager 155 may capture a still image or a moving image according to control by a user. A plurality of the imagers 155 such as a front camera and a rear camera may be included.

If the imager 155 and the microphone 150 are provided, the controller 170 may perform control operation according to user voice input via the microphone 150 or a motion of a user recognized by the imager 155. For example, the device 100B may operate in a motion control mode or a voice control mode. If the device 100B operates in the motion control mode, the controller 170 may activate the imager 155 to capture an image of the user, track a change in the motion of the user, and then, perform control operation corresponding to the change in the motion of the user. If the device 100B operates in the voice control mode, the controller 170 may operate in a voice recognition mode in which user voice input via the microphone 150 is analyzed, and a control operation is performed according to the analyzed user voice.

The motion detector 165 may detect movement of a main body of the device 100B. The device 100B may be rotate or tilted in various direction. The motion detector 165 may detect movement characteristics such as a rotation direction, an angle, or an inclination by using at least one of various sensors such as a geo-magnetic sensor, a gyroscope sensor, and an acceleration sensor.

Additionally, although not shown in FIG. 36, according to an exemplary embodiment, the device 100B may further include a universal serial bus (USB) port to which a USB connector is connected, various external input ports for connecting to various external terminals for a headset, a mouse, or a local area network (LAN), a digital multimedia broadcasting (DMB) chip for receiving and processing a DMB signal, or various sensors.

Elements of the device 100B may be named differently. Additionally, according to an exemplary embodiment, the device 100B may include one or more of above-described elements. It may be further understood that some elements may not be included, or additional elements may be further included.

Figure 37:
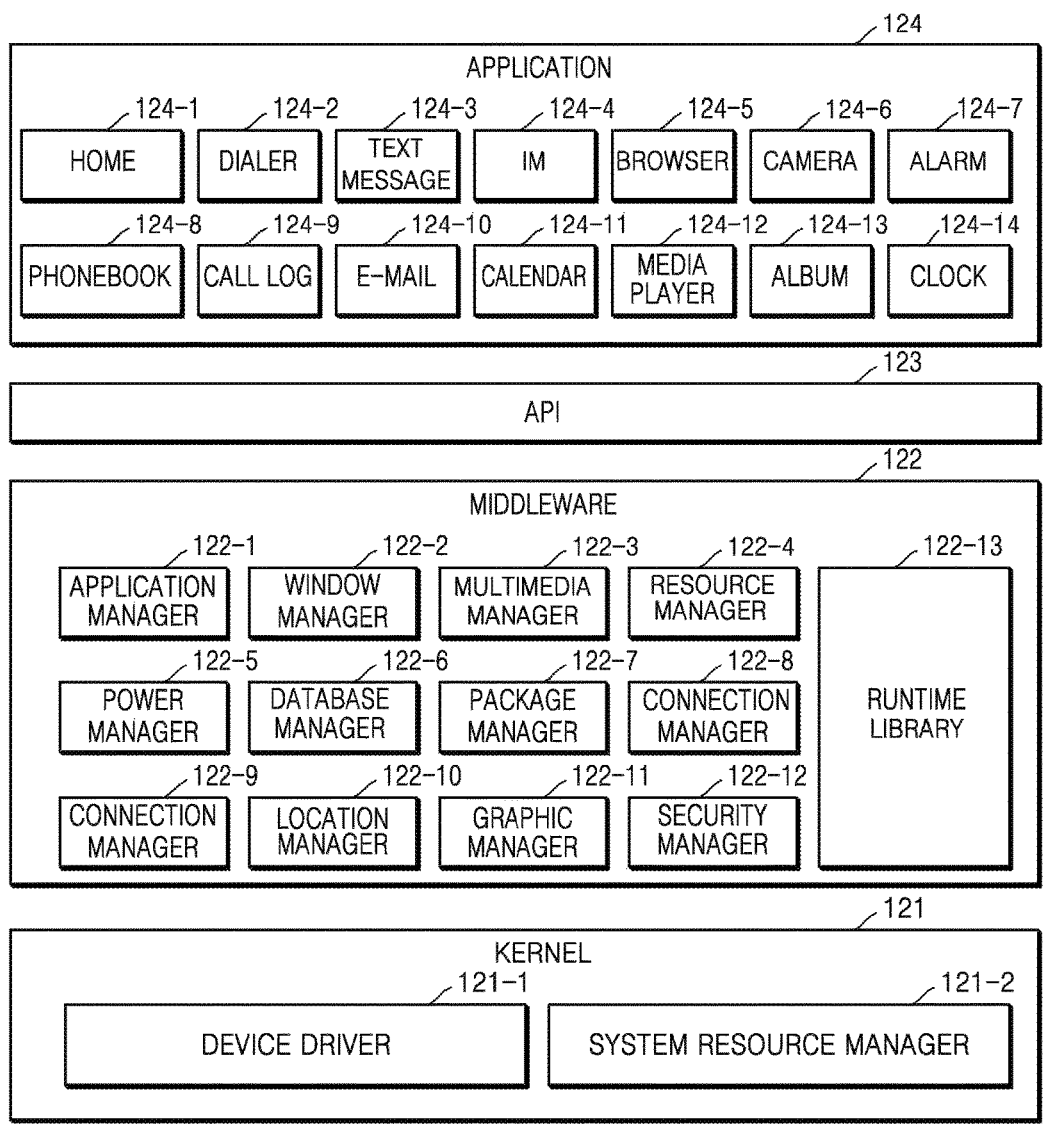
FIG. 37 illustrates a block diagram of a software configuration of a device according to an exemplary embodiment.

FIG. 37 illustrates a block diagram of a software configuration of a device 100C according to an exemplary embodiment.

Referring to FIG. 37, the memory 120 may store an operation system for controlling support of the device 100C and an application program for operating an application. The operating system may include a kernel, middleware, an application programming interface (API), or the like. The operating system may be, for example, Android, iPhone operating system (iOS), Windows, Symbian, Tizen, or Bada.

The kernel 121 may include at least one of a device driver 121-1 or a system resource manager 12102. The device driver 121-1 may access and control hardware of the device 100C by using software. For this, the device driver 121-1 may classified into an interface and an individual driver module provided by each hardware company. The device driver 121-1 may include, for example, at least one of a display driver, a camera driver, a Bluetooth driver, a shared memory driver, a USB driver, a key pad driver, a WiFi driver, an audio driver, or an inter-process communication driver. The system resource manager 121-2 may include at least one of a process management unit, a memory management unit, and a file system management unit. The system resource manager 121-2 may perform a function such as control, allocation, or withdrawal of a system resource, The middleware 122 may include a plurality of modules that are configured in advance to provide a function required for various applications in common. The middleware 122 may provide a function via an API 123 so that the application 124 may efficiently use resources in the device 100C. The middleware 122 may include at least one of a plurality of modules such as an application manager 122-1, a window manager 122-2, a multimedia manager 122-3, a resource manager 122-4, a power manager 122-5, a database manager 122-6, a package manager 122-7, a connection manager 122-8, a notification manager 122-9, a location manager 122-10, a graphic manager 122-11, and a security manager 122-12.

The application manager 122-1 may manage a life cycle of at least one application selected from t application 124. The window manager 122-2 may manage a graphics user interface (GUI) resource used on a screen. The multimedia manager 122-3 may determine a format for playing various multimedia files, and encode or decode a multimedia file by using a codec appropriate for the format. The resource manager 122-4 may manage a resource such as a source code, a memory, or a storage space of at least one application selected from the group consisting of the application 124. The power manager 122-5 may operate with a basic input/output system (BIOS) to manage a battery or a power source and provide power information for operation. The database manager 122-6 may manage generation of, search for, and change of a database to be used for at least one application of the application 124. The package manager 122-7 may manage installation or update of an application distributed in the form of a package file. The connection manager 122-8 may manage, for example, wireless connection such as WiFi or Bluetooth. The notification manager 122-9 may display or notify an event such as an arrival message, an appointment, or proximity notification to a user by using an uninterruptible method. The location manager 122-10 may manage location information of the device 100C. The graphic manager 122-1 may manage a graphic effect to be provided to the user and a UI related thereto. The security manager 122-12 may provide various security functions required for system security or user authentication. If the device 100C has a phone call function, the middleware 122 may further include a phone call manager (not shown) for managing voice or video phone call functions for a user.

The middleware 122 may further include a runtime library 122-13 or other library modules (not shown). The runtime library 122-13 is a library module used by a compiler so as to add a new function through a programming language while an application is being executed. For example, the runtime library 122-13 may perform a function of input/output, memory management, or an arithmetic function. The middleware 122 may generate and use a new middleware module through various combinations of functions of the modules described above. The middleware 122 may provide a specialized module according to a type of an operating system so as to provide a differentiated function. The middleware 122 may dynamically delete some of the elements or add new elements. According to an exemplary embodiment, elements described above may not be included, other elements may be further included, or elements may be substituted by other elements that have a similar function but a different name.

The API 123 is a group of API programming functions, and may be substituted by a different element according to an operating system. If a case of Android or iOS, for example, an API set be provided for each platform. In a case of Tizen, for example, two or more API sets may be provided.

The application 124 may include a preloaded application installed at default or a third party application that may be installed and used by a user while the user is using the device 100C. The application 124 may include, for example, at least one of a home application 124-1 for returning to a home screen, a dialer application 124-2 for having a phone call with another party, a text message application 124-3 for receiving a message from another party that may be identified by using a phone number, an instant message (IM) application 124-4, a browser application 124-5, a camera application 124-6, an alarm application 124-7, a phonebook application 124-8 for managing a phone number or an address of another party, a call log application 124-9 for managing a phone call log of a user, a log of text message transmission/reception, or a missed-call log, an e-mail application 124-10 for receiving a message from another party that is identified through an e-mail, a calendar application 124-11, a media play application 124-12, an album application 124-13, and a clock application 124-14. According to an exemplary embodiment, software may include at least one selected from the elements described above. Alternatively, some of the above-described elements may not be included, or other additional elements may be further included.

Figure 38:
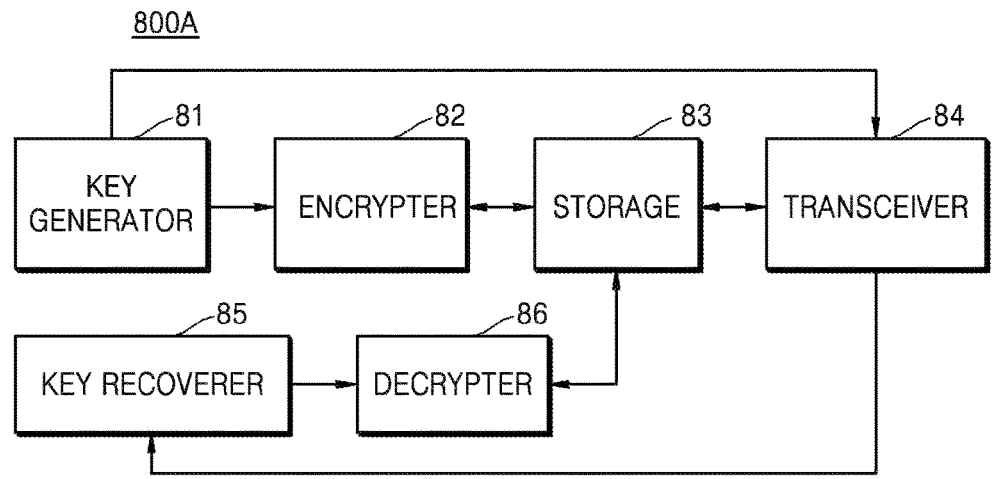
FIG. 38 illustrates a block diagram of a server according to an exemplary embodiment.

FIG. 38 illustrates a block diagram of a server 800A according to an exemplary embodiment.

Referring to FIG. 38, the server 800A may include a key generator 81, an encrypter 82, a storage 83, a transceiver 84, a key recoverer 85, and a decrypter 86. The device 800A may encrypt content that may be shared in a virtual space by a security group which includes a plurality of devices, and decrypt the encrypted content.

The server 800A may be applied to the server 800 described with reference to FIG. 26. Additionally, the server 800A may perform the method of encrypting content and the method of decrypting content described with reference to the FIGS. 1 through 33. Accordingly, a detailed description about operations of content encryption and decryption, performed by the server 800A, may not be repeated.

The key generator 81 may generate an encryption key and a plurality of partial keys with respect to certain content. According to an exemplary embodiment, if the asymmetric encryption method is employed, the key generator 81 may generate an encryption key that includes a key pair consisting of a public key and a private key. The key generator 81 may generate a plurality of partial keys by splitting the public key or the private key. According to another exemplary embodiment, if the symmetric encryption method is employed, the key generator 81 may generate an encryption key that includes a symmetric key. The key generator 81 may generate a plurality of partial keys by splitting the symmetric key.

The encrypter 82 may encrypt content by using the generated encryption key. In detail, the encrypter 82 may encrypt content by using a session key, and encrypt the session key by using the encryption key. Additionally, the encrypter 82 may encrypt the generated plurality of partial keys. Additionally, if one of a plurality of devices, located at a proximity spacing from each other, gets out of the proximate spacing, the encrypter 82 may re-encrypt the content that is being played.

According to an exemplary embodiment, if the asymmetric encryption method is employed, the encrypter 82 may encrypt content by using the public key. In detail, the encrypter 13 may encrypt content by using the session key, and encrypt the session key by using the public key. According to another exemplary embodiment, if the symmetric encryption method is employed, the encrypter 82 may encrypt content by using the symmetric key. In detail, the encrypter 82 may encrypt content by using the session key, and encrypt the session key by using the symmetric key.

The storage 83 may store encrypted content and/or decrypted content. Additionally, the storage 83 may further store an encryption key and/or a decryption key. According to an exemplary embodiment, the storage 83 may be implemented as a security zone such as TrustZone or other hardware-based security architecture. After the content is encrypted by the encrypter 82, the encryption key may be deleted.

The transceiver 84 may receive a detection signal indicating that devices amounting to a value equal to or greater than a threshold value, from a plurality of devices, are located within a proximate spacing from each other so that they may recognize each other, from the at least one of the plurality of devices. Additionally, the transceiver 84 may transmit a plurality of partial keys, generated by the key generator 81, to respective devices included in a security group. According to another exemplary embodiment, the transceiver 84 may transmit the plurality of partial keys, encrypted by the encrypter 82, to the respective devices included in the security group. Additionally, the transceiver 84 may transmit the encrypted content, stored in the storage 83, to at least one of the devices included in the security group.

If a detection signal is received from the transceiver 84, that is, if devices amounting to a value equal to or greater than a threshold value, from among the plurality of devices included in a security group, are located within a proximate spacing of each other, the key recoverer 85 may recover a decryption key from the plurality of partial keys stored in each of the devices amounting to the value equal to or greater than the threshold value. The decryption key may correspond to an encryption key generated by the key generator 81.

The decrypter 86 may decrypt the encrypted content by using the recovered decryption key. According to an exemplary embodiment, the decrypter 86 may decrypt the encrypted session key by using the recovered decryption key, and decrypt the encrypted content by using the decrypted session key. Additionally, after the encrypted content is decrypted, the decryption key and/or the decrypted content may be deleted.

In the current exemplary embodiment, if at least one of the plurality of devices located within a proximate spacing of each other goes outside of the proximate spacing (i.e., one of the devices is no longer within a proximate spacing of the other devices), the key recoverer 85 and/or the decrypter 86 may stop operation, and the encrypter 82 may re-encrypt the decrypted content.

In the current exemplary embodiment, the key generator 81, the encrypter 82, the key recoverer 85, and the decrypter 86 may be implemented as a plurality of programs, and stored in a memory in the server 800A. Then, a control unit included in the server 800A may access the memory, and thus, execute operations such as key generation, encryption, key recovery, and decryption. In other exemplary embodiments, however, the key generator 81, the encrypter 82, the key recoverer 85, and the decrypter 86 may be implemented in hardware, software, or as a combination of hardware and software. Additionally, in the current exemplary embodiment, the storage 83 may be implemented as a part of an area of the memory in the server 800A. Additionally, in the current embodiment, the transceiver 84 may be implemented as a part of a communication unit included in the server 800A. Hereinafter, an exemplary embodiment of hardware of the device is described with reference to FIG. 39.

Figure 39:
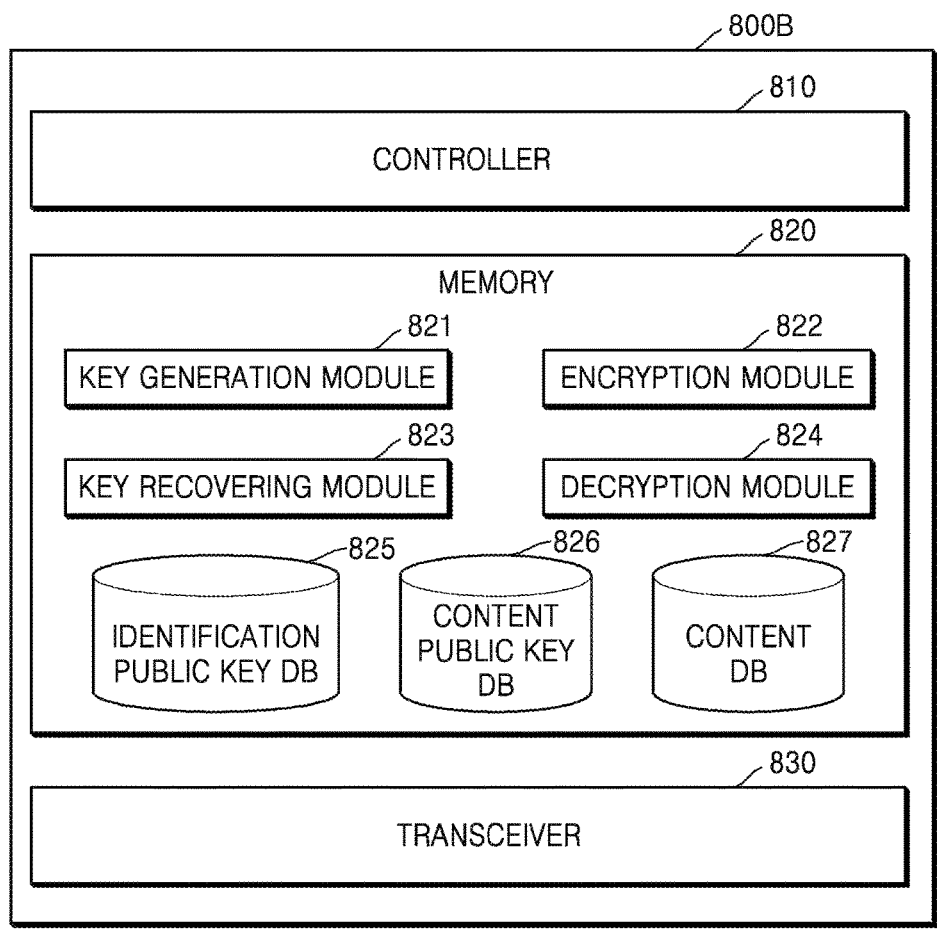
FIG. 39 illustrates a block diagram of a server according to an exemplary embodiment.

FIG. 39 illustrates a block diagram of a server 800B according to an exemplary embodiment.

Referring to FIG. 39, in the current embodiment, the server 800B may include a controller 810, a memory 820, and a transceiver 830. However, the elements, shown in FIG. 39, are not essential elements. The server 800B may be implemented by using more elements than those shown in FIG. 39. The server 800B, if implemented as a cloud server, may be implemented by using less elements than those shown in FIG. 39. Hereinafter, the elements are sequentially described.

The controller 810 may control all operations of the server 800B. For example, at least one piece of content received from a device may be encrypted/decrypted by executing programs (or modules) stored in the memory 820. In detail, if first through third devices included in the security group are located within a proximate spacing of each other so that they may recognize each other, the controller 810 may control to generate an encryption key and a plurality of partial keys, and encrypt the content. Additionally, if all the first through third devices approve decryption of the encrypted content or if devices amounting to a value equal to or greater than a preset threshold value, from among the first through third devices, approve decryption of the encrypted content, the controller 810 may control to recover a decryption key from encrypted partial keys and decrypt the encrypted content by using the recovered decryption key.

The memory 820 may store a program for processing and controlling the controller 810, or store input/output data, for example, content received from a device, information about a device, analysis information about content, or the like. The programs stored in the memory 820 may be classified into a plurality of modules according to a function. For example, the programs may be classified into a key generation module 821, an encryption module 822, a key recovering module 823, a decryption module 824, an identification public key database (DB) 825, a content public key DB 826, or a content DB 827.

The transceiver 830 may include one or more elements for allowing communication between the server 800B and the plurality of devices. In detail, the transceiver 830 may transmit encrypted content, decrypted content, and/or encrypted partial keys to the plurality of devices. Additionally, the transceiver 830 may receive a detection signal indicating that devices amounting to a value equal to or greater than a threshold value, from among the plurality of devices, are located within a proximate spacing of each other so that the devices may recognize each other, from at least one of the plurality of devices.

In addition, other exemplary embodiments can also be implemented through computer readable code/instructions in/on a medium, e.g., a computer readable medium, to control at least one processing element to implement any of the exemplary embodiments. The medium can correspond to any medium/media permitting the storage and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more exemplary embodiments. The media may also be a distributed network, so that the computer readable code is stored/transferred and executed in a distributed fashion. Furthermore, the processing element could include a processor or a computer processor, and processing elements may be distributed and/or included in a single device.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A mobile device comprising:
a communicator configured to communicate with at least one external device;
a controller configured to generate a plurality of partial keys based on an encryption key for encrypting content, control the communicator to distribute a first partial key, among the plurality of partial keys, to the at least one external device, allocate, to the mobile device, a second partial key, among the plurality of partial keys, and determine whether the mobile device is located within a proximate spacing of the at least one external device; and
a storage configured to store the second partial key,
wherein, in response to determining that the mobile device is located within the proximate spacing, the controller is further configured to control the communicator to receive the first partial key from the at least one external device and perform an operation of recovering a decryption key corresponding to the encryption key, the operation of recovering comprising calculating the decryption key based on the first partial key received from the at least one external device and the second partial key stored in the storage, and, in response to the determining that the mobile device becomes located outside the proximate spacing during a time period when the operation of recovering the decryption key proceeds, the controller is further configured to stop the operation of recovering the decryption key,
wherein, in response to the determining that the mobile device is located within the proximate spacing and the decryption key has been recovered, the controller is further configured to perform an operation of decrypting encrypted content that is shared by the mobile device and the at least one external device, and, in response to the determining that the mobile device becomes located outside the proximate spacing during a time period when the operation of decrypting the encrypted content proceeds, the controller is further configured to stop the operation of decrypting the encrypted content and re-encrypt the decrypted content.

2. The mobile device of claim 1, further comprising a user input unit,
wherein the controller is further configured to encrypt the content to generate the encrypted content in response to receiving a user input for sharing the content with the at least one external device.

3. The mobile device of claim 2, wherein the storage is further configured to store the encrypted content.

4. The mobile device of claim 2, wherein the controller is further configured to store the encrypted content in an external server.

5. The mobile device of claim 2, wherein the communicator is further configured to transmit the encrypted content to the at least one external device.

6. The mobile device of claim 2, wherein the controller is further configured to generate the encryption key for encrypting the content.

7. The mobile device of claim 6, wherein the controller is further configured to encrypt the first partial key, and control the communicator to distribute the encrypted first partial key to the at least one external device.

8. The mobile device of claim 6, wherein the storage is further configured to store the encryption key.

9. The mobile device of claim 1, further comprising a user input unit,
wherein the at least one external device is a first device or a second device, and
the controller is further configured to encrypt the content in response to receiving a user input for sharing the content with the first device and the second device via the user input unit, and to decrypt the encrypted content in response to determining that the first device and the second device are located within the proximate spacing from the mobile device.

10. The mobile device of claim 1, wherein the communicator comprises a short-range wireless communication module that includes at least one among a near field communication module, a Bluetooth module, a WiFi module, and a ZigBee module configured to determine whether the mobile device is located within the proximate spacing of the at least one external device.

11. The mobile device of claim 1, further comprising:
at least one among a touch sensor and a proximity sensor configured to determine whether the mobile device is located within the proximate spacing of the at least one external device.

12. The mobile device of claim 1, further comprising at least one among a display and a speaker,
wherein the controller is further configured to output the decrypted content via the at least one among the display and the speaker.

13. The mobile device of claim 1, wherein the first partial key corresponds to a first portion of the encryption key, and
the second partial key corresponds to a second portion of the encryption key, the second portion being a remainder of a value of the encryption key.

14. A method of sharing content in a security group that includes a plurality of devices, the method comprising:
generating a plurality of partial keys based on an encryption key for encrypting content;
distributing the plurality of partial keys to the plurality of devices;
determining whether a number of the plurality of devices, which are located within a proximate spacing of each other, is equal to or greater than a threshold value; and
decrypting encrypted content that is shared by the plurality of devices, the decrypting the encrypted content comprising:
in response to the determining that the number of the plurality of devices located within the proximate spacing of each other is equal to or greater than the threshold value, receiving the plurality of partial keys from the plurality of devices, and performing an operation of recovering a decryption key corresponding to the encryption key, the operation of recovering comprising calculating the decryption key based on the plurality of partial keys received from the plurality of devices,
in response to the determining that the number of the plurality of devices located within the proximate spacing becomes less than the threshold value during a time period when the operation of recovering the decryption key proceeds, stopping the operation of recovering the decryption key,
in response to the determining that the number of the plurality of devices located within the proximate spacing of each other is equal to or greater than the threshold value and the decryption key has been recovered, performing an operation of decrypting the encrypted content by using the decryption key, and
in response to the determining that the number of the plurality of devices located within the proximate spacing becomes less than the threshold value during a lime period when the operation of decrypting the encrypted content proceeds, stopping the operation of decrypting the encrypted content and re-encrypting the decrypted content.

15. The method of claim 14, further comprising encrypting the content to generate the encrypted content in response to receiving a user input for sharing the content between the plurality of devices.

16. The method of claim 15, further comprising storing the encrypted content in at least one of the plurality of devices.

17. The method of claim 15, further comprising storing the encrypted content in an external server.

18. The method of claim 15, wherein the encrypting the content further comprises:
generating the encryption key for encrypting the content.

19. The method of claim 18, wherein the encrypting the content further comprises encrypting the plurality of partial keys, and
the distributing the plurality of partial keys comprises distributing the encrypted plurality of partial keys to the plurality of devices, respectively.

20. The method of claim 19, further comprising storing the encryption key and the plurality of partial keys in at least one security zone of the plurality of devices.

21. The method of claim 14, wherein the determining whether the number of the plurality of devices, which are located within the proximate spacing of each other, is equal to or greater than the threshold value comprises:
determining whether the plurality of devices are located within the proximate spacing via a short-range wireless communication module that includes at least one among a near field communication module, a Bluetooth module, a WiFi module, and a ZigBee module.

22. The method of claim 14, wherein the determining whether the number of the plurality of devices, which are located within the proximate spacing of each other, is equal to or greater than the threshold value comprises:
determining whether the plurality of devices are located within the proximate spacing with at least one among a touch sensor and a proximity sensor.

23. A non-transitory computer-readable recording storage medium having stored thereon a computer program, which when executed by a computer, causes the computer to perform a method comprising:
generating a plurality of partial keys based on an encryption key for encrypting content;
distributing the plurality of partial keys to a plurality of devices;
determining whether a number of the plurality of devices, which are located within a proximate spacing of each other, is equal to or greater than a threshold value; and
decrypting encrypted content that is shared by the plurality of devices, the decrypting the encrypted content comprising:
in response to the determining that the number of the plurality of devices located within the proximate spacing of each other is equal to or greater than the threshold value, receiving the plurality of partial keys from the plurality of devices, and performing, an operation of recovering a decryption key corresponding to the encryption key, the operation of recovering comprising calculating the decryption key based on the plurality of partial keys received from the plurality of devices, in response to the determining that the number of the plurality of devices located within the proximate spacing becomes less than the threshold value during a time period when the operation of recovering the decryption key proceeds, stopping the operation of recovering the decryption key, in response to the determining that the number of the plurality of devices located within the proximate spacing of each other is equal to or greater than the threshold value and the decryption key has been recovered, performing an operation of decrypting the encrypted content by using the decryption key, and in response to the determining that the number of the plurality of devices located within the proximate spacing becomes less than the threshold value during a time period when the operation of decrypting the encrypted content proceeds, stopping the operation of decrypting the encrypted content and re-encrypting the decrypted content.

24. A method of sharing content, the method comprising:
determining whether a user device is located within a proximate spacing of at least one other user device;
generating a first partial key and a second partial key based on an encryption key for encrypting content;
distributing the first partial key to the at least one other user device;
allocating, to the user device, the second partial key;
encrypting the content stored on the user device in response to the determining that the user device is located within the proximate spacing of the at least one other user device;
distributing the encrypted content to the at least one other user device; and
decrypting the encrypted content, the decrypting comprising:
  in response to the determining that the user device is located within the proximate spacings, receiving the first partial key from the at least one other user device, and performing an operation of recovering a decryption key corresponding to the encryption key, the operation of recovering comprising calculating the decryption key based on the first partial key received from the at least one other user device and the second partial key of the user device,
  in response to the determining that the user device becomes located outside the proximate spacing during a time period when the operation of recovering the decryption key proceeds, stopping the operation of recovering the decryption key,
  in response to the determining that the user device is located within the proximate spacing and the decryption key has been recovered, performing an operation of decrypting the encrypted content with the decryption key, and
  in response to the determining that the user device becomes located outside the proximate spacing during a time period when the operation of decrypting the encrypted content proceeds, stopping the operation of decrypting the encrypted content and re-encrypting the decrypted content.

25. The method of claim 24, further comprising storing, at the user device, the second partial key.

26. The method of claim 25, wherein the first partial key distributed to the at least one other user device and the second partial key stored at the user device are partial keys which are different from one another.

27. A user device comprising:
a communicator;
a controller configured to generate a first partial key and a second partial key based on an encryption key for encrypting content, allocate, to the user device, the second partial key, control the communicator to distribute the first partial key to at least one other user device, and determine whether the user device is located within a proximate spacing of the at least one other user device; and
a storage configured to store the second partial key,
wherein, in response to determining that the user device is located within the proximate spacing, the controller is further configured to encrypt the content stored on the user device, control the communicator to distribute the encrypted content to the at least one other user device, control the communicator to receive the first partial key from the at least one other user device, and perform an operation of recovering a decryption key corresponding to the encryption key, the operation of recovering comprising calculating the decryption key based on the first partial key received from the at least one other user device and the second partial key stored in the storage,
wherein, in response to the determining that the user device becomes located outside the proximate spacing during a time period when the operation of recovering the decryption key proceeds, the controller is further configured to stop the operation of recovering the decryption key,
wherein, in response to the determining that the user device is located within the proximate spacing and the decryption key has been recovered, the controller is further configured to perform an operation of decrypting the encrypted content, and
wherein, in response to the determining that the user device becomes located outside the proximate spacing during a time period when the operation of decrypting the encrypted content proceeds, the controller is further configured to stop the operation of decrypting the encrypted content and re-encrypt the decrypted content.

28. The user device of claim 27, wherein the first partial key distributed to the at least one other user device and the second partial key stored in the storage of the user device are partial keys which are different from one another.

* * * * *